United States Patent
Tajima et al.

(10) Patent No.: US 7,636,629 B2
(45) Date of Patent: Dec. 22, 2009

(54) MAP INFORMATION DISPLAY APPARATUS AND METHOD THEREOF

(75) Inventors: Takashi Tajima, Osaka (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/178,156

(22) Filed: Jul. 23, 2008

(65) Prior Publication Data

US 2008/0275634 A1    Nov. 6, 2008

Related U.S. Application Data

(60) Division of application No. 12/170,962, filed on Jul. 10, 2008, which is a continuation of application No. PCT/JP2007/064857, filed on Jul. 30, 2007.

(30) Foreign Application Priority Data

Aug. 1, 2006    (JP)    ............... 2006-210108

(51) Int. Cl.
*G08G 1/123*    (2006.01)
(52) U.S. Cl. ............... 701/200; 340/995.1; 340/995.26; 340/995.27; 701/201
(58) Field of Classification Search ............... 340/995.1, 340/995.14, 995.24, 995.26, 995.27; 701/200, 701/201, 208, 213
See application file for complete search history.

(56) References Cited

U.S. PATENT DOCUMENTS 6,009,403 A    12/1999  Sato
6,064,941 A    5/2000   Nimura et al.
6,282,493 B1 *  8/2001   Kitagawa et al. ............ 701/211

FOREIGN PATENT DOCUMENTS

| EP | 0 944 032 | 9/1999 |
|----|-----------|--------|
| JP | 10-153449 | 6/1998 |
| JP | 2000-207686 | 7/2000 |
| JP | 2002-74403 | 3/2002 |
| JP | 2004-286456 | 10/2004 |
| JP | 2005-207781 | 8/2005 |
| JP | 2006-23149 | 1/2006 |
| JP | 2006-53132 A * | 2/2006 |
| WO | 97/06522 | 2/1997 |
| WO | 99/01855 | 1/1999 |

OTHER PUBLICATIONS

International Search Report (in the English language) issued Oct. 23, 2007.

* cited by examiner

*Primary Examiner*—Thomas G Black
*Assistant Examiner*—Ce Li
(74) *Attorney, Agent, or Firm*—Wenderoth, Lind & Ponack, L.L.P.

(57) ABSTRACT

A map information display apparatus that displays a map for a mobile object includes: a grouping unit (111) that divides a map included in an image displayed by a map display unit (115) into a plurality of areas; a display position determination unit (113) that selects, for each of the plurality of areas, at most a predetermined number of points as points for displaying estimated transit times, the predetermined number being equal to or larger than 1; a time calculation unit (114) that calculates the estimated transit times of the selected points; and the map display unit (115) that displays an image including the map and the estimated transit times.

9 Claims, 63 Drawing Sheets

FIG. 2

| ID | Position (longitude) | Position (latitude) | Time |
|---|---|---|---|
| 001 | 134.5.28.9 | 34.5.15.7 | 9/20 7:00:00 |
| 002 | 134.5.28.9 | 34.5.15.7 | 9/20 7:00:01 |
| 003 | 134.5.28.9 | 34.5.15.7 | 9/20 7:00:02 |
| 004 | 134.5.28.9 | 34.5.15.7 | 9/20 7:00:03 |
| 005 | 134.5.28.9 | 34.5.15.7 | 9/20 7:00:04 |
| 006 | 134.5.28.10 | 34.5.15.7 | 9/20 7:00:05 |
| 007 | 134.5.28.11 | 34.5.15.7 | 9/20 7:00:06 |
| 008 | 134.5.28.12 | 34.5.15.7 | 9/20 7:00:07 |
| 009 | 134.5.28.13 | 34.5.15.7 | 9/20 7:00:08 |
| 010 | 134.5.28.14 | 34.5.15.7 | 9/20 7:00:09 |

| Type | Detection method | Event occurrence position |
|---|---|---|
| Stop | Stop at same position for 1 second to 5 minutes | Stop position |
| Parking | Stop at same position for longer than 5 minutes | Stop position |
| Right turn / left turn | Direction of change of position (travel direction of mobile object) changes 30 degrees or more | Direction change position |
| U-turn | Direction of change of position (travel direction of mobile object) changes 180 degrees | Direction change position |
| Abrupt acceleration | Position change (speed) with respect to time varies 30 km/h or more | Speed change position |
| Tunnel transit | Structure at position changes from tunnel to other than tunnel | Structure position |
| Bridge transit | Structure at position changes from bridge to other than bridge | Structure position |
| Tollbooth transit | Structure at position changes from tollbooth to other than tollbooth | Structure position |
| Two lanes → one lane | Number of lanes at position changes from 2 to 1 | Lane count change position |
| One lane → two lanes | Number of lanes at position changes from 1 to 2 | Lane count change position |
| Three lanes → one lane | Number of lanes at position changes from 3 to 1 | Lane count change position |
| One lane → three lanes | Number of lanes at position changes from 1 to 3 | Lane count change position |
| Intersection (national road→national road) transit | Position changes from intersection of national roads to other position | Intersection position |
| Intersection (prefectural road→prefectural road) transit | Position changes from intersection of prefectural roads to other position | Intersection position |
| ... | ... | ... |

| Node ID | Node position (longitude) | Node position (latitude) | Connected node ID |
|---|---|---|---|
| 001 | 134.3.0.9 | 34.6.3.6 | 002、003、004、005 |
| 002 | 134.3.0.9 | 34.5.30.0 | 001、005、006 |
| 003 | 134.3.0.9 | 34.6.36.0 | 001、007、008 |
| 004 | 134.4.10.9 | 34.6.3.6 | 001、006、009、010 |
| 005 | 134.2.20.9 | 34.6.3.6 | 001、011、012 |
| 006 | 134.4.10.9 | 34.5.30.0 | 002、004、013、014 |
| ... | ... | ... | ... |

(b)

104b

| Link ID | Beginning node ID | End node ID | Travel duration (seconds) | Lane count (one way) | Road type | Structure |
|---|---|---|---|---|---|---|
| 001 | 001 | 002 | 90 | 2 | Prefectural road | None |
| 002 | 001 | 003 | 100 | 2 | National road | None |
| 003 | 001 | 004 | 400 | 1 | National road | Tunnel |
| 004 | 001 | 005 | 110 | One lane each way | Town road | None |
| 005 | 006 | 006 | 300 | 1 | National road | Bridge |
| ... | ... | ... | ... | ... | ... | ... |

| ID | Event occurrence position (longitude) | Event occurrence position (latitude) | Event type |
|---|---|---|---|
| 001 | 134.3.0.9 | 34.6.3.6 | Stop |
| 002 | 134.4.10.9 | 34.6.3.6 | Tunnel transit |
| 003 | 134.3.0.9 | 34.5.30.0 | Stop |
| 004 | 134.3.0.9 | 34.6.3.6 | Stop |
| 005 | 134.2.20.9 | 34.6.3.6 | Right turn / left turn |
| 006 | 134.4.10.9 | 34.5.30.0 | Parking |
| ... | | | ... |

(a) 106a

| ID | Event occurrence position (longitude) | Event occurrence position (latitude) | Event type |
|---|---|---|---|
| 001 | 134.3.0.9 | 34.6.3.6 | Stop |
| 002 | 134.4.10.9 | 34.6.3.6 | Tunnel transit |
| 003 | 134.3.0.9 | 34.5.30.0 | Stop |
| 004 | 134.3.0.9 | 34.6.3.6 | Stop |
| 005 | 134.2.20.9 | 34.6.3.6 | Right turn / left turn |
| 006 | 134.4.10.9 | 34.5.30.0 | Parking |
| 007 | 134.3.0.9 | 34.6.3.6 | Right turn / left turn |

(b)

| Position (longitude) | Position (latitude) | Event type | Number of event occurrences |
|---|---|---|---|
| 134.3.0.9 | 34.6.3.6 | Stop | 2 |
| 134.3.0.9 | 34.6.3.6 | Right turn / left turn | 1 |
| 134.4.10.9 | 34.6.3.6 | Tunnel transit | 1 |
| 134.3.0.9 | 34.5.30.0 | Stop | 1 |
| 134.2.20.9 | 34.6.3.6 | Right turn / left turn | 1 |
| 134.4.10.9 | 34.5.30.0 | Parking | 1 |

(a) 106a

| ID | Event occurrence position (longitude) | Event occurrence position (latitude) | Event type |
|---|---|---|---|
| 001 | 134.3.0.9 | 34.6.3.6 | Stop |
| 002 | 134.4.10.9 | 34.6.3.6 | Tunnel transit |
| 003 | 134.3.0.9 | 34.5.30.0 | Stop |
| 004 | 134.3.0.9 | 34.6.3.6 | Stop |
| 005 | 134.2.20.9 | 34.6.3.6 | Right turn / left turn |
| 006 | 134.4.10.9 | 34.5.30.0 | Parking |
| 007 | 134.3.0.9 | 34.6.3.6 | Right turn / left turn |

(b)

| Event type | Number of event occurrence positions |
|---|---|
| Stop | 2 |
| Right turn / left turn | 2 |
| Tunnel transit | 1 |
| Parking | 1 |

| Group ID | Position |
|---|---|
| 001 | East longitudes 134. 4. 59. 9 to 134. 5. 59. 9<br>North latitudes 34. 5. 15. 6 to 34. 6. 15. 6 |
| 002 | East longitudes 134. 4. 59. 9 to 134. 5. 59. 9<br>North latitudes 34. 4. 15. 6 to 34. 5. 15. 6 |
| 003 | East longitudes 134. 5. 59. 9 to 134. 6. 59. 9<br>North latitudes 34. 5. 15. 6 to 34. 6. 15. 6 |
| 004 | East longitudes 134. 5. 59. 9 to 134. 6. 59. 9<br>North latitudes 34. 4. 15. 6 to 34. 5. 15. 6 |

(a)

| Position (longitude) | Position (latitude) | Impression value | |
|---|---|---|---|
| 134.5.0.9 | 34.6.3.6 | 1.5 | Group 001 |
| 134.5.30.0 | 34.6.3.6 | 1 | |
| 134.5.0.9 | 34.5.30.0 | 0.5 | |
| 134.5.0.9 | 34.4.30.0 | 1 | 002 |
| 134.6.10.9 | 34.5.30.0 | 1 | Group 003 |
| 134.6.10.9 | 34.6.0.0 | 1.5 | |
| 134.6.10.9 | 34.6.3.6 | 1 | |
| 134.6.30.0 | 34.4.30.0 | 2 | Group 004 |
| 134.4.20.9 | 34.6.3.6 | 0.5 | |

(c)

| Group ID | Position (longitude) | Position (latitude) |
|---|---|---|
| 001 | 134.5.0.9 | 34.6.3.6 |
| 002 | 134.5.0.9 | 34.4.30.0 |
| 003 | 134.6.10.9 | 34.6.0.0 |
| 004 | 134.6.10.9 | 34.4.30.0 |

| Position (longitude) | Position (latitude) | Impression value | Group |
|---|---|---|---|
| 134.5.0.9 | 34.6.3.6 | 1 | Group 001 |
| 134.5.30.0 | 34.6.3.6 | 2 | |
| 134.5.0.9 | 34.5.30.0 | 2 | |
| 134.5.0.9 | 34.4.30.0 | 1 | 002 |
| 134.6.10.9 | 34.5.30.0 | 2 | Group 003 |
| 134.6.10.9 | 34.6.0.0 | 1 | |
| 134.6.10.9 | 34.6.3.6 | 2 | |
| 134.6.30.0 | 34.4.30.0 | 1 | Group 004 |
| 134.4.20.9 | 34.6.3.6 | 3 | |

(b)

| Group ID | Position |
|---|---|
| 001 | East longitudes 134. 4. 59. 9 to 134. 5. 59. 9<br>North latitudes 34. 5. 15. 6 to 34. 6. 15. 6 |
| 002 | East longitudes 134. 4. 59. 9 to 134. 5. 59. 9<br>North latitudes 34. 4. 15. 6 to 34. 5. 15. 6 |
| 003 | East longitudes 134. 5. 59. 9 to 134. 6. 59. 9<br>North latitudes 34. 5. 15. 6 to 34. 6. 15. 6 |
| 004 | East longitudes 134. 5. 59. 9 to 134. 6. 59. 9<br>North latitudes 34. 4. 15. 6 to 34. 5. 15. 6 |

(c)

| Group ID | Position (longitude) | Position (latitude) |
|---|---|---|
| 001 | 134.5.0.9 | 34.6.3.6 |
| 002 | 134.5.0.9 | 34.4.30.0 |
| 003 | 134.6.10.9 | 34.6.0.0 |
| 004 | 134.6.10.9 | 34.4.30.0 |

| Position |
|---|
| East longitudes 134. 4. 59. 9 to 134. 6. 59. 9<br>North latitudes 34. 4. 15. 6 to 34. 6. 15. 6 |

(a)

| Position (longitude) | Position (latitude) | Impression value |
|---|---|---|
| 134.5.0.9 | 34.6.3.6 | 1.5 |
| 134.5.30.0 | 34.6.3.6 | 1.2 |
| 134.5.0.9 | 34.5.30.0 | 0.5 |
| 134.5.0.9 | 34.4.30.0 | 1.2 |
| 134.6.10.9 | 34.5.30.0 | 1.2 |
| 134.6.10.9 | 34.6.0.0 | 1.5 |
| 134.6.10.9 | 34.6.3.6 | 1 |
| 134.6.10.9 | 34.4.30.0 | 2 |
| 134.6.30.0 | 34.4.30.0 | 1 |
| 134.4.20.9 | 34.6.3.6 | 3 |

Within display screen area (c)

| Position (longitude) | Position (latitude) | Impression value |
|---|---|---|
| 134.6.10.9 | 34.4.30.0 | 2 |
| 134.5.0.9 | 34.6.3.6 | 1.5 |
| 134.6.10.9 | 34.6.0.0 | 1.5 |
| 134.5.30.0 | 34.6.3.6 | 1.2 |
| 134.5.0.9 | 34.4.30.0 | 1.2 |
| 134.6.10.9 | 34.5.30.0 | 1.2 |

(a)

| Position (longitude) | Position (latitude) |
|---|---|
| 134.6.10.9 | 34.4.30.0 |
| 134.5.0.9 | 34.6.3.6 |
| 134.6.10.9 | 34.6.0.0 |
| 134.5.30.0 | 34.6.3.6 |
| 134.5.0.9 | 34.4.30.0 |
| 134.6.10.9 | 34.5.30.0 |

(b)

| Position (longitude) | Position (latitude) |
|---|---|
| 134.6.10.9 | 34.4.30.0 |
| 134.5.0.9 | 34.6.3.6 |
| 134.6.10.9 | 34.6.0.0 |
| 134.5.30.0 | 34.6.3.6 |

(c)

| Position (longitude) | Position (latitude) |
|---|---|
| 134.6.10.9 | 34.4.30.0 |
| 134.5.0.9 | 34.6.3.6 |
| 134.6.10.9 | 34.6.3.6 |
| 134.5.0.9 | 34.4.30.0 |

FIG. 38
| Type | Detection method | Event occurrence position | Icon |
|---|---|---|---|
| Parking | Stop at same position for longer than 5 minutes | Stop position |  |
| Tunnel transit | Structure at position changes from tunnel to other than tunnel | Structure position | 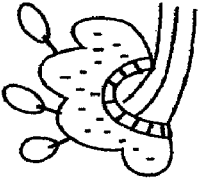 |
| Bridge transit | Structure at position changes from bridge to other than bridge | Structure position |  |
| ... | ... | ... | ... |

| ID | Event occurrence position (longitude) | Event occurrence position (latitude) | Event type |
|---|---|---|---|
| 001 | 134.3.0.9 | 34.6.3.6 | Stop |
| 002 | 134.4.10.9 | 34.6.3.6 | Tunnel transit |
| 003 | 134.3.0.9 | 34.5.30.0 | Stop |
| 004 | 134.3.0.9 | 34.6.3.6 | Stop |
| 005 | 134.2.20.9 | 34.6.3.6 | Right turn / left turn |
| 006 | 134.4.10.9 | 34.5.30.0 | Parking |
| 007 | 134.3.0.9 | 34.6.3.6 | Right turn / left turn |

Display screen area (rows 001–004)
Display screen area (row 007)

(b)
Display screen area
East longitudes 134. 2. 59. 9 to 134. 4. 59. 9
North latitudes 34. 4. 15. 6 to 34. 6. 15. 6

(c)

| Event type | Number of event occurrence positions |
|---|---|
| Stop | 2 |
| Right turn / left turn | 1 |
| Tunnel transit | 1 |
| Parking | 1 |

| Position (longitude) | Position (latitude) | Event type | Number of event occurrences |
|---|---|---|---|
| 134.3.0.9 | 34.6.3.6 | Stop | 2 |
| 134.3.0.9 | 34.6.3.6 | Right turn / left turn | 1 |
| 134.4.10.9 | 34.6.3.6 | Tunnel transit | 1 |
| 134.3.0.9 | 34.5.30.0 | Stop | 1 |
| 134.2.20.9 | 34.6.3.6 | Right turn / left turn | 1 |
| 134.4.10.9 | 34.5.30.0 | Parking | 1 |

(b)

| Event type | Number of event occurrence positions on display screen | Number of event occurrence positions |
|---|---|---|
| Stop | 2 | 2 |
| Right turn / left turn | 1 | 2 |
| Tunnel transit | 1 | 1 |
| Parking | 1 | 1 |

(c)

| Position (longitude) | Position (latitude) | Impression value calculation method | Icon display event | Impression value |
|---|---|---|---|---|
| 134.3.0.9 | 34.6.3.6 | 1/2(Impression value of stop event is 0) | Right turn / left turn | 0.5 |
| 134.4.10.9 | 34.6.3.6 | 1/1 | Tunnel transit | 1 |
| 134.3.0.9 | 34.5.30.0 | 0(Impression value of stop event is 0) | None | 0 |
| 134.2.20.9 | 34.6.3.6 | 1/2 | Right turn / left turn | 0.5 |
| 134.4.10.9 | 34.5.30.0 | 1/1 | Parking | 1 |

FIG. 49

Table 6006a:

| ID | Event occurrence position (longitude) | Event occurrence position (latitude) | Event type |
|---|---|---|---|
| 03001 | 134.3.0.9 | 34.6.3.6 | Stop |
| 03002 | 134.4.10.9 | 34.6.3.6 | Tunnel transit |
| 03003 | 134.3.0.9 | 34.5.30.0 | Stop |
| 03004 | 134.3.0.9 | 34.6.3.6 | Stop |
| 03005 | 134.2.20.9 | 34.6.3.6 | Right turn / left turn |
| 03006 | 134.4.10.9 | 34.5.30.0 | Parking |
| ... | ... | ... | ... |

Table 6006b:

| ID | Departure position (longitude) | Departure position (latitude) | Event occurrence ... |
|---|---|---|---|
| 0200 | 134.3.0.9 | 34.5.30.0 | |
| 0200 | | | |
| 0200 | | | |
| 0200 | | | |
| 0200 | | | |
| 0200 | | | |
| ... | | | |

Table 6006c:

| ID | Departure position (longitude) | Departure position (latitude) | Event occurrence |
|---|---|---|---|
| 0100 | 134.4.10.9 | 34.5.30.0 | |
| 0100 | | | |
| 0100 | | | |
| 0100 | | | |
| 0100 | | | |
| 0100 | | | |
| ... | | | |

MAP INFORMATION DISPLAY APPARATUS AND METHOD THEREOF

CROSS REFERENCE TO RELATED APPLICATION

This is a divisional application of Ser. No. 12/170,962, filed Jul. 10, 2008, which is a continuation application of PCT application No. PCT/JP2007/064857 filed, Jul. 30, 2007, designating the United States of America.

BACKGROUND OF THE INVENTION (1) Field of the Invention

The present invention relates to a map information display apparatus and method for displaying a map for a mobile object, and especially relates to a map information display apparatus and method for displaying, together with a map, an estimated transit time of a point on the map.

(2) Description of the Related Art

Nowadays, a map display apparatus such as a car navigation apparatus or a mobile terminal navigation apparatus of a mobile phone and the like displays an arrival time at a final destination which is set by a user. Displaying the arrival time allows the user to know whether or not the user can be in time at the final destination, and travel without worry. Moreover, the arrival time can be utilized by the user to decide whether or not to stop off somewhere on the way to the final destination.

In cases such as where there is a long distance to the final destination, the final destination has not been determined yet, or the user wants to stop at a place, such as a service area, other than the final destination, it is equally effective to display a transit time of a position other than the final destination. Even though the position for which the transit time is displayed is different from the final destination, the transit time display is effective because the user can estimate a transit time of a neighborhood of the transit time display position based on the displayed transit time.

For example, a vehicle navigation apparatus described in Japanese Unexamined Patent Application Publication No. 2004-286456 (hereinafter referred to as Patent Reference 1) displays, when a final destination is set by a user, transit times of main intersections on a travel route to the final destination on a map. Further, the navigation apparatus changes positions for which transit times are displayed, according to a scale of the displayed map.

When displaying images or characters on a map, it is important to make the display easy to view. For example, a vehicle navigation apparatus described in Japanese Patent Application Publication No. 10-153449 (hereinafter referred to as Patent Reference 2) limits, when displaying landmarks on a map, the number of landmarks displayed on the map to a predetermined number, to make the display easily viewable.

However, for instance, the navigation apparatus described in Patent Reference 1 has a problem of not displaying the transit times unless the user sets the final destination.

Furthermore, even in the case where the user wants to stop off somewhere away from the travel route to the final destination, the navigation apparatus described in Patent Reference 1 displays only the transit times on the travel route to the final destination. On the other hand, if transit times of all main intersections on the map are displayed, the number of displayed transit times increases and display positions become dense, which hinders the user's understanding. Even when the number of positions for which transit times are displayed is limited to a predetermined number as in the vehicle navigation apparatus described in Patent Reference 2, another problem arises when displaying transit times. That is, merely limiting the number can result in concentration of transit time display positions as shown in FIG. 62.

Usually, the user can estimate a transit time of a neighborhood of a transit time display position, based on a road distance. However, when transit time display positions concentrate northwest of a current position as shown in FIG. 62, the user cannot know a transit time of a position other than northwest. Such a display is useless. Therefore, it is necessary to display transit times in a more scattered manner, as shown in FIG. 63.

In view of this, the present invention has an object of providing a map information display apparatus and method that can provide an easily viewable display to a user.

SUMMARY OF THE INVENTION

To solve the above problems, a map information display apparatus according to the present invention is a map information display apparatus that displays a map for a mobile object, the map information display apparatus including: a display unit that displays an image that includes the map and an estimated transit time of a point on the map; a candidate obtainment unit that obtains a plurality of candidate points each of which is a candidate for displaying an estimated transit time; a selection unit that selects at most a predetermined number of candidate points from among candidate points, of the plurality of candidate points, whose spatial density in a part of a map area of the map displayed by the display unit is high enough to meet a predetermined condition; an estimated time calculation unit that calculates an estimated transit time of each of the selected candidate points; and a display control unit that causes the display unit to display the image that includes the map and a combination of the each of selected candidate points and the estimated transit time calculated for the each of selected candidate points.

Preferably, the selection unit may set a plurality of group areas or a plurality of representative points in the map area of the map displayed by the display unit, and either select, for each of the plurality of group areas, at most the predetermined number of candidate points included in the each of plurality of group areas from among the plurality of candidate points, or select, for each of the plurality of representative points, at most the predetermined number of candidate points in increasing order of distance from the each of plurality of representative points, from among the plurality of candidate points.

In this way, the map information display apparatus according to the present invention divides the map area displayed by the display unit into the plurality of group areas, and limits the number of estimated transit time display points in each group area to no more than the predetermined number. Alternatively, the map information display apparatus according to the present invention sets the plurality of representative points in the map area displayed by the display unit, and limits the number of estimated transit time display points in a neighborhood of each representative point to no more than the predetermined number, in increasing order of distance from the representative point. This makes it possible to prevent a situation where estimated transit time display points concentrate in one part of the map area displayed by the display unit. As a result, map information is displayed with improved viewability, and the user can easily recognize the correspondence between a display point and an actual position on a road.

Moreover, the map information display apparatus according to the present invention may select transit time display points so that at least one point for which an estimated transit time is calculated is included in each group area. This enables the user to easily estimate a transit time of any point on the map from a current position, based on estimated transit times of points which are distributed over the plurality of group areas. Hence the user can adequately set or change a schedule upon traveling, whenever necessary.

Preferably, the division unit divides the map area of the map displayed by the display unit into the plurality of group areas so that at least a predetermined gap is provided between the plurality of group areas and at least one of the plurality of group areas includes a part of a road on which the mobile object is currently located, the part of the road being situated in the travel direction of the mobile object.

In this way, the division unit divides the map area so that the plurality of group areas are separated from each other by at least a predetermined gap. As a result, for example, even when two closest display points are selected from adjacent group areas, these display points are apart from each other by at least the predetermined gap. Thus, concentration of transit time display points can be avoided. Accordingly, the user can easily recognize the correspondence between a display point and an actual position on a road, and the viewability can be improved.

Further preferably, the map information display apparatus further includes an other image display position obtainment unit that obtains a display area of an image displayed on the map other than the estimated transit time, and the division unit divides an area which excludes the display area obtained by the other image display position obtainment unit from the map area of the map displayed by the display unit, into the plurality of group areas.

Usually, images other than a transit time, such as a touch panel button, a map scale, a current time, and VICS text information, are often displayed on a map information display apparatus screen. This being the case, the map is divided into the plurality of group areas so that a display position of such an other image is not included in any group area. As a result, a situation where a display position of a transit time overlaps with a display position of an other image can be avoided, with it being possible to prevent a decrease in viewability of the transit time or the other image. Hence an easily viewable display screen can be presented to the user.

Further preferably, the candidate obtainment unit includes an event history storage unit in which event history information is stored, the event history information associating types of events with points at which the types of events occurred, each of the types of events being a predetermined change occurring as the mobile object travels, and each of the points being a candidate for displaying an estimated transit time, wherein the selection unit further includes an impression value calculation unit that calculates, for each of the points, an impression value which shows a degree of impression a user receives from the each of points, using the event history information, and the selection unit selects, for each of the plurality of group areas, at most the predetermined number of points in decreasing order of impression value from among points that are included in the each of plurality of group areas, each as a point for displaying an estimated transit time.

In this way, the map information display apparatus according to the present invention calculates the impression value. As a result, a point which leaves a strong impression on the user can be prioritized as a transit time display point. The user can easily recognize the correspondence between a display point and an actual position on a road, if the user remembers the point well. This contributes to improved viewability.

Further preferably, the impression value calculation unit includes: an event-specific impression value counting unit that counts, for each of the types of events, the number of event occurrence points at which the each of types of events occurred and the number of event occurrences of the each of types of events at each event occurrence point, using the event history information, and counts, for each of the points, the number of event occurrences of each type of event that occurred at the each of points and whose number of event occurrence points is 1; and an addition unit that calculates the impression value by calculating, for each of the points, a sum of the numbers of event occurrences counted by the event-specific impression value counting unit for all types of events that occurred at the each of points.

In this way, the map information display apparatus according to the present invention selects a display point, from points at which events whose number of event occurrence points is 1 occurred. This allows the user to specify a type of event which occurred at the display position, without confusing it with other events. Hence the viewability can be improved.

Further preferably, the candidate obtainment unit includes an event history storage unit in which event history information is stored, the event history information associating types of events with points at which the types of events occurred, each of the types of events being a predetermined change occurring as the mobile object travels, and each of the points being a candidate for displaying an estimated transit time, wherein the selection unit further includes a rare point extraction unit that counts, for each of the types of events, the number of event occurrence points at which the each of types of events occurred using the event history information, and extracts each point at which a type of event whose number of event occurrence points is equal to or smaller than a predetermined threshold occurred, and the selection unit, when any of the plurality of group areas obtained by the division unit includes a larger number of points extracted by the rare point extraction unit than a predetermined number, calculates, for each combination of the predetermined number of points in the group area, a minimum distance between points included in each combination, and selects the predetermined number of points included in a combination corresponding to a largest minimum distance, each as a point for displaying an estimated transit time.

In this way, the map information display apparatus according to the present invention sets points at which rare events occurred as display point candidates, and selects a combination of a predetermined number of points having a largest distance between points, from among the display point candidates. As a result, transit time display points are distanced from each other, with it being possible to avoid concentration of display points. Therefore, the user can easily recognize the correspondence between a display point and an actual position on a road, and the viewability can be improved.

Further preferably, the map information display apparatus further includes a departure position detection unit that detects a departure point of the mobile object in current travel, wherein the event history storage unit stores event history information that associates the types of events, the points at which the types of events occurred, and a departure point of travel in which the types of events occurred, with each other, and the impression value calculation unit calculates an impression value of each of the points, using the event history information relating to a same departure point as the departure point detected by the departure position detection unit.

In this way, the map information display apparatus according to the present invention calculates the impression value from the event history corresponding to the current departure point of the mobile object. There are cases when, even at the same current position, the user has different impressions when going to and returning from somewhere. Accordingly, by taking the departure point into consideration, the impression value can be calculated appropriately according to the circumstance.

Further preferably, the map information display apparatus further includes a rule storage unit in which event rule information is stored, the event rule information associating the types of events with icon image data elements showing the types of events, and the display control unit causes the display unit to display the image that includes the estimated transit time associated with the point for which the estimated transit time is calculated, by causing the display unit to display, in a predetermined area which is a part of the image displayed by the display unit, an image that shows combinations of estimated transit times of points selected by the selection unit and icon image data elements showing types of events which occurred at the selected points, in order of estimated transit time.

In this way, the map information display apparatus according to the present invention displays, in addition to a transit time, an icon showing a point corresponding to the transit time. This allows the user to recognize the point easily, with it being possible to improve viewability.

With the provision of the map information display apparatus according to the present invention, it is possible to avoid a situation where estimated transit times concentrate in one part of the map area displayed by the display unit. As a result, the user can easily recognize the correspondence between a map position for which an estimated transit time is displayed on a screen of the map information display apparatus, and an actual position on a road. Thus, the viewability can be improved. Moreover, the user can easily estimate a transit time. Accordingly, the user can adequately set or change a schedule upon traveling, whenever necessary.

FURTHER INFORMATION ABOUT TECHNICAL BACKGROUND TO THIS APPLICATION

The disclosure of Japanese Patent Application No. 2006-210108 filed on Aug. 1, 2006 including specification, drawings and claims is incorporated herein by reference in its entirety.

The disclosure of PCT application No. PCT/JP2007/064857 filed, Jul. 30, 2007, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 shows an example of a travel history stored in a travel history storage unit.

FIG. 3 shows an example of an event rule stored in a rule storage unit.

FIGS. 4(a) and 4(b) show an example of road information stored in a map information storage unit.

FIG. 5 shows an example of an event history stored in an event history storage unit.

FIGS. 11(a), 11(b), and 11(c) show an example where a display position determination unit determines a transit time display position.

FIGS. 17(a), 17(b), and 17(c) show an example where a display position determination unit determines a transit time display position.

FIGS. 34(a), 34(b), and 34(c) show an example where a rare position obtainment unit extracts a high impression position.

FIG. 38 shows an example of an event rule including an icon.

FIGS. 41(a), 41(b), and 41(c) show an example of calculating the number of event occurrence positions in a display screen area.

FIGS. 42(a), 42(b), and 42(c) show an example where an impression value calculation unit calculates an impression value.

FIG. 49 shows an example of an event history stored in an event history storage unit.

DESCRIPTION OF THE PREFERRED EMBODIMENT

Figure 1:
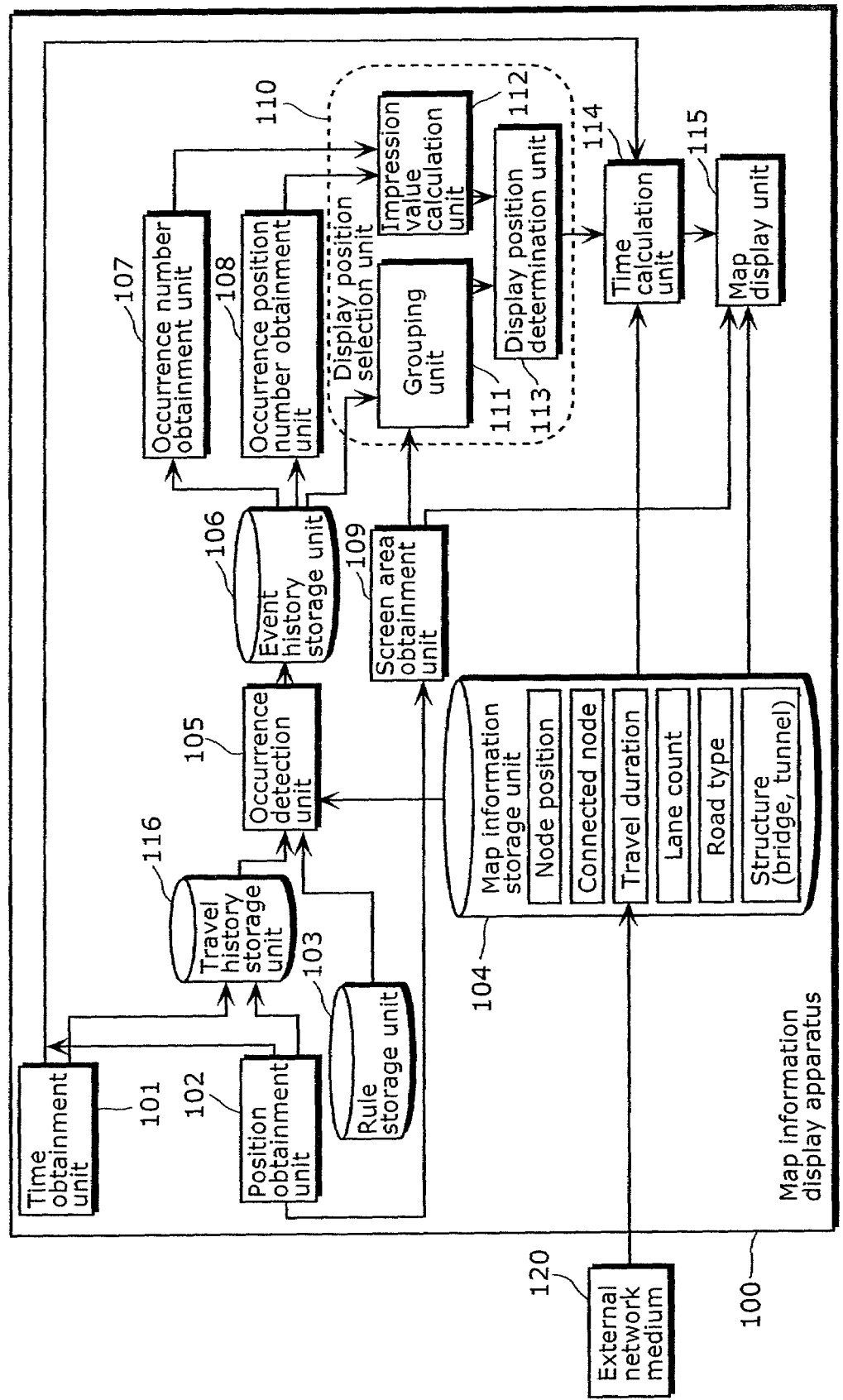
FIG. 1 is a block diagram showing a structure of a map information display apparatus in an embodiment of the present invention.

First, a concept of map information display in a map information display apparatus according to the present invention is described below.

When display positions of transit times concentrate at one or more parts on a map, a user may have a difficulty of recognizing which position a displayed transit time corresponds to, or a difficulty of viewing as the transit times overlap each other on the display. To solve these display viewability problems, it is necessary to distribute transit time display positions scatteredly on the map.

Even when the number of transit time display positions is limited for improved viewability, if the transit time display positions are appropriately distributed, the user can estimate, based on a transit time on the display, a transit time of a neighborhood of a position for which the transit time is displayed. Accordingly, reducing the number of display positions does not cause any inconvenience on the user, but rather contributes to improved viewability.

In view of this, to appropriately distribute transit time display positions, grouping of event occurrence positions is performed according to display positions on a map display screen, and a transit time display position is determined from among event occurrence positions for each group.

Moreover, even in the case of displaying a transit time of a same main intersection or landmark, an impression of that position is different depending on the user. Especially in a wide-area map having a small scale, the user cannot understand or is slow to understand which position on an actual road corresponds to the position on the map for which the transit time is displayed. In the case of a car navigation apparatus, in particular, the user is not allowed to keep his/her eye on the display for a long time during driving, and so the user is required to recognize the transit time display position quickly.

In view of this, to display transit times that are easily viewable by the user, it is desirable to limit the number of transit time display positions and distribute the transit time display positions, and also to select such transit time display positions that enable the user to easily recognize the correspondence between map positions and actual positions.

A position that enables the user to easily recognize the correspondence between a map position and an actual position is an occurrence position of a rare event, that is, an occurrence position of an event that does not occur at many positions. The user tends to clearly remember a position of an event which does not occur at many positions, so that the user can easily recognize the correspondence between a map position and an actual position. However, if the occurrence position of the rare event is a position which the user seldom passes, it is difficult for the user to recognize the correspondence between the map position and the actual position. Therefore, it is also important that the event occurring at the position has high repetitiveness. In other words, a position that enables the user to easily recognize the correspondence between a map position and an actual position is a position where a rare event occurred, and also where the rare event occurred many times. Setting such a position as a transit time display position facilitates the user's understanding, since the position tends to leave a strong impression on the user.

An event is a predetermined change occurring as the user travels. In detail, events include not only an event, such as "right turn/left turn, stop, abrupt acceleration, abrupt slowdown, or U-turn", which is detected from the user's operation specified by a position or a time, but also an event, such as "transit through a road structure such as a tunnel or a bridge" or "a change in number of lanes of a road, or a change in type of road such as a national road, a prefectural road, and an expressway", which is detected using map information. Furthermore, "a change of a road or scenery as seen by the user" is an event, too.

Rarity of each event is calculated by detecting the number of event occurrence positions of the event. By detecting the number of event occurrence positions of each point and the number of occurrences of the event at each position, it is possible to specify positions that have a high possibility of leaving a strong impression on the user. Thus, positions which are effective for transit time display can be obtained.

FIG. 1 is a block diagram showing a structure of a map information display apparatus in an embodiment of the present invention. A map information display apparatus 100 shown in FIG. 1 includes a time obtainment unit 101, a position obtainment unit 102, a travel history storage unit 116, a rule storage unit 103, a map information storage unit 104, an occurrence detection unit 105, an event history storage unit 106, an occurrence number obtainment unit 107, an occurrence position number obtainment unit 108, a screen area obtainment unit 109, a display position selection unit 110, a grouping unit 111, an impression value calculation unit 112, a display position determination unit 113, a time calculation unit 114, and a map display unit 115. The following first describes each component with reference to drawings, and then describes an operation of the map information display apparatus 100.

The time obtainment unit 101 obtains current time information using a clock inside the map information display apparatus 100 or a Global Positioning System (GPS) antenna. For example, the time obtainment unit 101 obtains the current time information in year, month, day, hour, minute, and second, such as "2006 Apr. 20 11:13:20".

The position obtainment unit 102 detects a current position of a mobile object using the GPS antenna, an IC tag, base station communication, image recognition, and the like. For example, the position obtainment unit 102 detects information about a longitude and a latitude of the mobile object, such as east longitude "134. 5. 59. 9" and north latitude "34. 5. 15. 6".

This position obtainment unit 102 is one example of a departure position detection unit that detects a departure point of a mobile object in current travel.

The travel history storage unit 116 stores a history of the current position obtained by the position obtainment unit 102 and the current time obtained by the time obtainment unit 101, as a travel history. For instance, the travel history storage unit 116 stores current position information per second, as shown in FIG. 2. As one example, a record of an ID "001" in FIG. 2 shows that the mobile object was at a position of east longitude "134. 5. 28. 9" and north latitude "34. 5. 15. 7", at a time "9/20 7:00:00" (September 20, 7 o'clock).

The rule storage unit 103 stores an event rule for detecting an occurrence of an event and a type of the event, from the travel history stored in the travel history storage unit 116 and map information stored in the map information storage unit 104. Suppose the rule storage unit 103 stores an event rule shown in FIG. 3. For example, an occurrence of an event of a type "stop" is detected when the mobile object stops at a same position for a duration of one second to five minutes, and the position of stop is set as an event occurrence position. In detail, let Pt be a position of the mobile object at time t (seconds).

[Expression 1]

$$|P_t - P_{t-1}| \leq \epsilon \ (n \leq t \leq n+T, \text{ and } \epsilon \text{ is a small value}) \quad (1).$$

[Expression 2]

$$|P_{n+T+1} - P_{n+T}| > \epsilon, \ |P_n - P_{n-1}| > \epsilon \quad (2).$$

[Expression 3]

$$1 \leq T \leq 300 \quad (3).$$

When time n (seconds) and time T (seconds) that satisfy the above expressions exist, the "stop" event is detected, and the event occurrence position is position Pn of the mobile object at time n (seconds).

This rule storage unit 103 is one example of a rule storage unit in which event rule information is stored, the event rule information associating types of events with icon image data elements showing the types of events.

The map information storage unit 104 stores road information about node positions, connected nodes, link travel durations between nodes, lane counts, road types, and structures. A structure referred to here is a structure on a road, such as "bridge", "tunnel", "tollbooth", and "elevated structure". For instance, node positions, connected nodes, link travel durations between nodes are stored as shown in FIGS. 4(a) and 4(b). As one example, FIG. 4(a) shows that a node of a node ID "001" is positioned at longitude "134. 3. 0. 9" and latitude "34. 6. 3. 6", and is connected with nodes of node IDs "002", "003", "004", and "005". Further, FIG. 4(b) shows that a link of a link ID "001" connects a beginning node of a node ID "001" and an end node of a node ID "002", and has a travel duration "90 seconds", a lane count "two lanes each way", a road type "prefectural road", and a road structure "none".

Note here that a travel duration may be obtained from an external network medium 120 such as Vehicle Information and Communication System (VICS). By obtaining from the external network medium 120, a latest travel duration which is most suitable for the current circumstance can be attained.

The occurrence detection unit 105 detects an occurrence of an event and obtains a type and an occurrence position of the event, from the travel history stored in the travel history storage unit 116 and the map information stored in the map information storage unit 104 according to the event rule stored in the rule storage unit 103. Basically, the event occurrence position is the current position where the occurrence of the event is detected. Suppose, when the event rule shown in FIG. 3 is stored in the event rule storage unit 103, the current position was longitude "134. 3. 0. 9" and latitude "34. 6. 3. 6" for three minutes and then changed to longitude "134. 3. 0. 9" and latitude "34. 6. 3. 4". In such a case, the occurrence detection unit 105 obtains the position of longitude "134 .3. 0. 9" and latitude "34. 6. 3. 6" at which the mobile object stopped for three minutes as an event occurrence position, and the type "stop" as an event type.

The event history storage unit 106 stores the occurrence position and type of the event detected by the event detection unit 105, as a history. For instance, when the event history storage unit 106 stores an event history as shown in FIG. 5, a record of an ID "001" shows that a "stop" event occurred once at a position of longitude "134. 3. 0. 9" and latitude "34. 6. 3. 6".

This event history storage unit 106 is one example of an event history storage unit in which event history information is stored, the event history information associating types of events and points at which the types of events occurred, where each of the types of events is a predetermined change occurring as the mobile object travels.

The occurrence number obtainment unit 107 obtains, for each event occurrence position, the number of event occurrences of each type of event, from the event history stored in the event history storage unit 106.

A method whereby the occurrence number obtainment unit 107 obtains the number of event occurrences is described below, with reference to drawings.

Figure 6:
FIGS. 6(a) and 6(b) show an example where an occurrence number obtainment unit calculates the number of event occurrences.

As one example, when an event history 106*a* shown in FIG. 6(*a*) is stored in the event history storage unit 106, the number of event occurrences of the "stop" event at the position of longitude "134. 3. 0. 9" and latitude "34. 6. 3. 6" is calculated as follows. Since records of IDs "001" and "004" in the event history show the occurrence of the "stop" event at the position of longitude "134. 3. 0. 9" and latitude "34. 6. 3. 6", the number of event occurrences of the "stop" event at the position is 2, as shown in FIG. 6(*b*).

Figure 7:
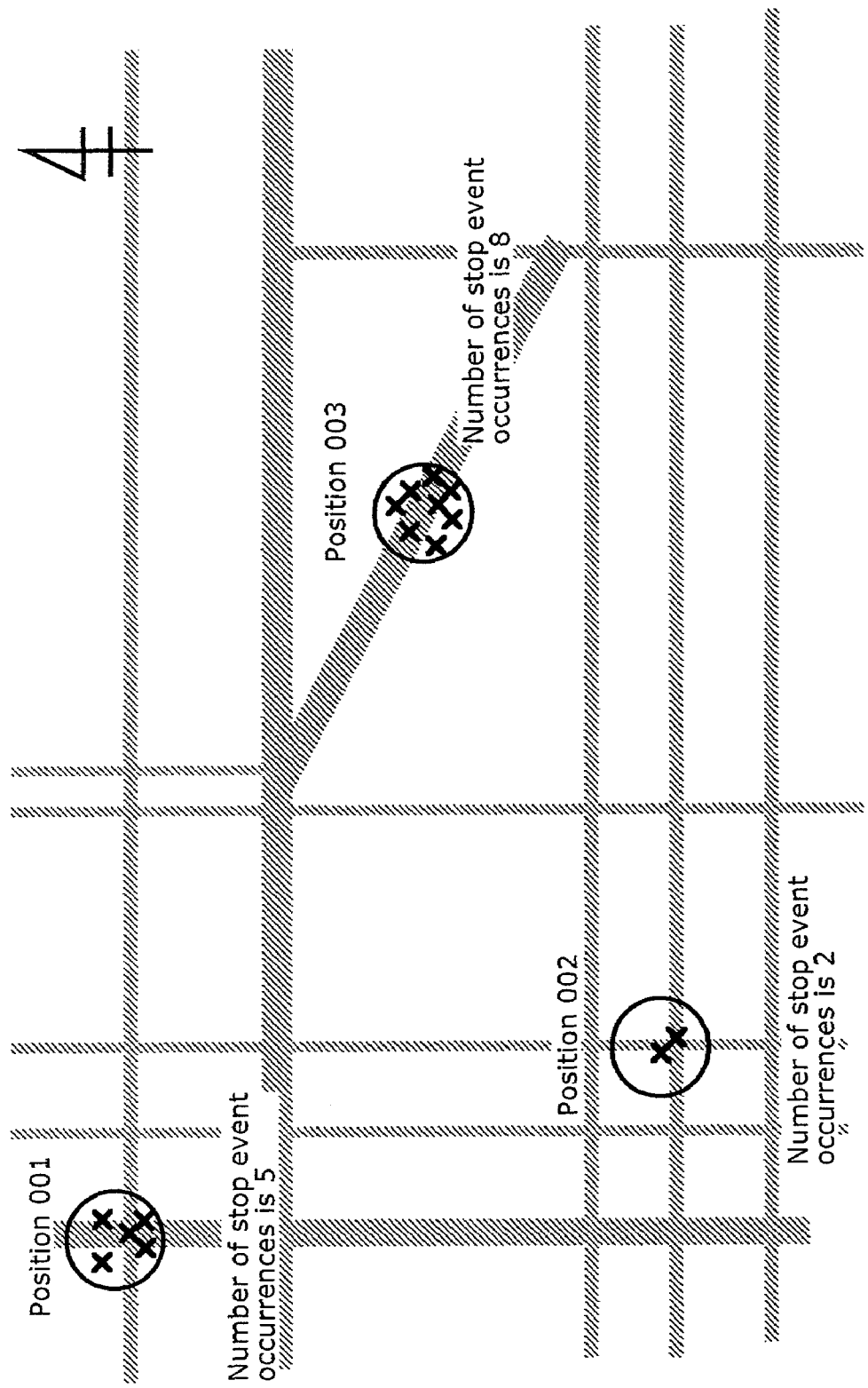
FIG. 7 shows an example of calculating the number of event occurrences and the number of event occurrence positions for a stop event.

As another example, when events occurred as shown in FIG. 7, that is, an event history of the events shown in FIG. 7 is stored in the event history storage unit 106, the number of event occurrences of the "stop" event is calculated as follows. The number of event occurrences of the "stop" event at position 001 is "5", since the "stop" event occurred 5 times at position 001.

The occurrence position number obtainment unit 108 obtains the number of event occurrence positions of each type of event, from the event history stored in the event history storage unit 106.

A method whereby the occurrence position number obtainment unit 108 obtains the number of event occurrence positions is described below, with reference to drawings.

Figure 8:
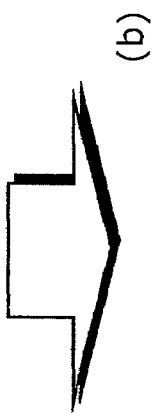
FIGS. 8(a) and 8(b) show an example where an occurrence position number obtainment unit calculates the number of event occurrence positions.

As one example, when an event history shown in FIG. 8(*a*) is stored in the event history storage unit 106, the number of event occurrence positions of the "stop" event is calculated as follows. Since records of IDs "001", "003", and "004" in the event history show the occurrence of the "stop" event at two positions, i.e., the position of longitude "134. 3. 0. 9" and latitude "34. 6. 3. 6" and the position of longitude "134. 3. 0. 9" and latitude "34. 5. 30. 0", the number of event occurrence positions of the "stop" event is 2, as shown in FIG. 8(*b*).

As another example, when events occurred as shown in FIG. 7, that is, an event history of the events shown in FIG. 7 is stored in the event history storage unit 106, the number of event occurrence positions of the "stop" event is calculated as follows. The number of event occurrence positions of the "stop" event is "3", since the "stop" event occurred at three positions of position 001, position 002, and position 003.

The screen area obtainment unit 109 obtains a display screen area representing a map area displayed by the map display unit 115, based on the current position obtained from the position obtainment unit 102 and a scale set according to a user operation.

Suppose the scale has been set to display up to "±0.1. 0. 0" centering on the current position. For example, when the current position is east longitude "134. 5. 59. 9" and north latitude "34. 5. 15. 6", the screen area obtainment unit 109 obtains a display screen area representing a rectangular area of east longitude "134. 4. 59. 9" to east longitude "134. 6. 59. 9" and north latitude "34. 4. 15. 6" to north latitude "34. 6. 15. 6".

The display position selection unit 110 selects and determines transit time display positions from among event occurrence positions, using the event history stored in the event history storage unit 106, the number of event occurrences obtained by the occurrence number obtainment unit 107, the number of event occurrence positions obtained by the occurrence position number obtainment unit 108, and the display screen area obtained by the screen area obtainment unit 109. The display position selection unit 110 includes the grouping unit 111, the impression value calculation unit 112, and the display position determination unit 113.

The grouping unit 111 divides the map area represented by the display screen area obtained by the screen area obtainment unit 109, into a plurality of group areas. The grouping unit 111 groups each event occurrence position in the event history stored in the event history storage unit 106, into a group area in which the event occurrence position is included.

Here, to distance the transit time display positions from each other for enhanced viewability, the grouping unit 111 divides the map area so that each group area has at least a predetermined size. For example, the predetermined size is a circle whose diameter is 1/10 of a distance of one side of the map area, so that transit times can be sufficiently separated from one another on the display screen.

Figure 9:
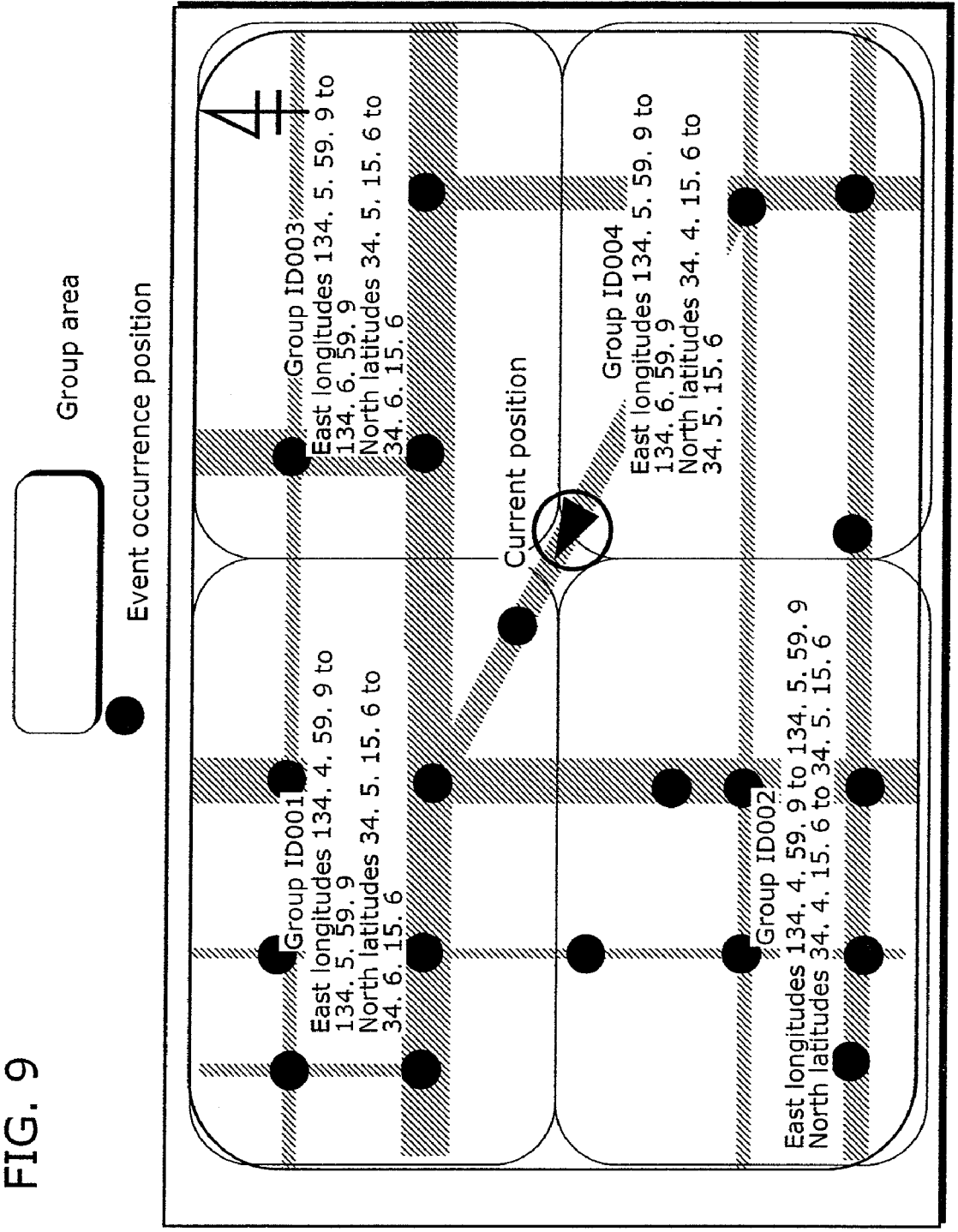
FIG. 9 shows an example where a grouping unit performs grouping.

A specific example is given below. When the map area represented by the display screen area is east longitude "134. 4. 59. 9" to east longitude "134. 6. 59. 9" and north latitude "34. 4. 15. 6" to north latitude "34. 6. 15. 6", the grouping unit 111 evenly divides the map area by 2 in a longitude direction and by 2 in a latitude direction into four group areas, and groups event occurrence position by using the group areas, as shown in FIG. 9. In this grouping, a size of each group area is a rectangle whose one side is ½ of a distance of one side of the map area, which is larger than a circle whose diameter is 1/10 of the distance of one side of the map area.

In the case of FIG. 9, the map area is divided into the four group areas. A group area of a group ID "001" is a rectangular area of east longitude "134.4. 59.9" to east longitude "134. 5. 59. 9" and north latitude "34. 5. 15. 6" to north latitude "34. 6. 15. 6". A group area of a group ID "002" is a rectangular area of east longitude "134. 4. 59. 9" to east longitude "134. 5. 59. 9" and north latitude "34. 4. 15. 6" to north latitude "34. 5. 15. 6". A group area of a group ID "003" is a rectangular area of east longitude "134. 5. 59. 9" to east longitude "134. 6. 59.9" and north latitude "34. 5. 15. 6" to north latitude "34. 6. 15. 6". A group area of a group ID "004" is a rectangular area of east longitude "134. 5. 59. 9" to east longitude "134. 6. 59. 9" and north latitude "34. 4. 15. 6" to north latitude "34. 5. 15. 6". Each event occurrence position belongs to a group of a group area in which the event occurrence position is included.

Figure 12:
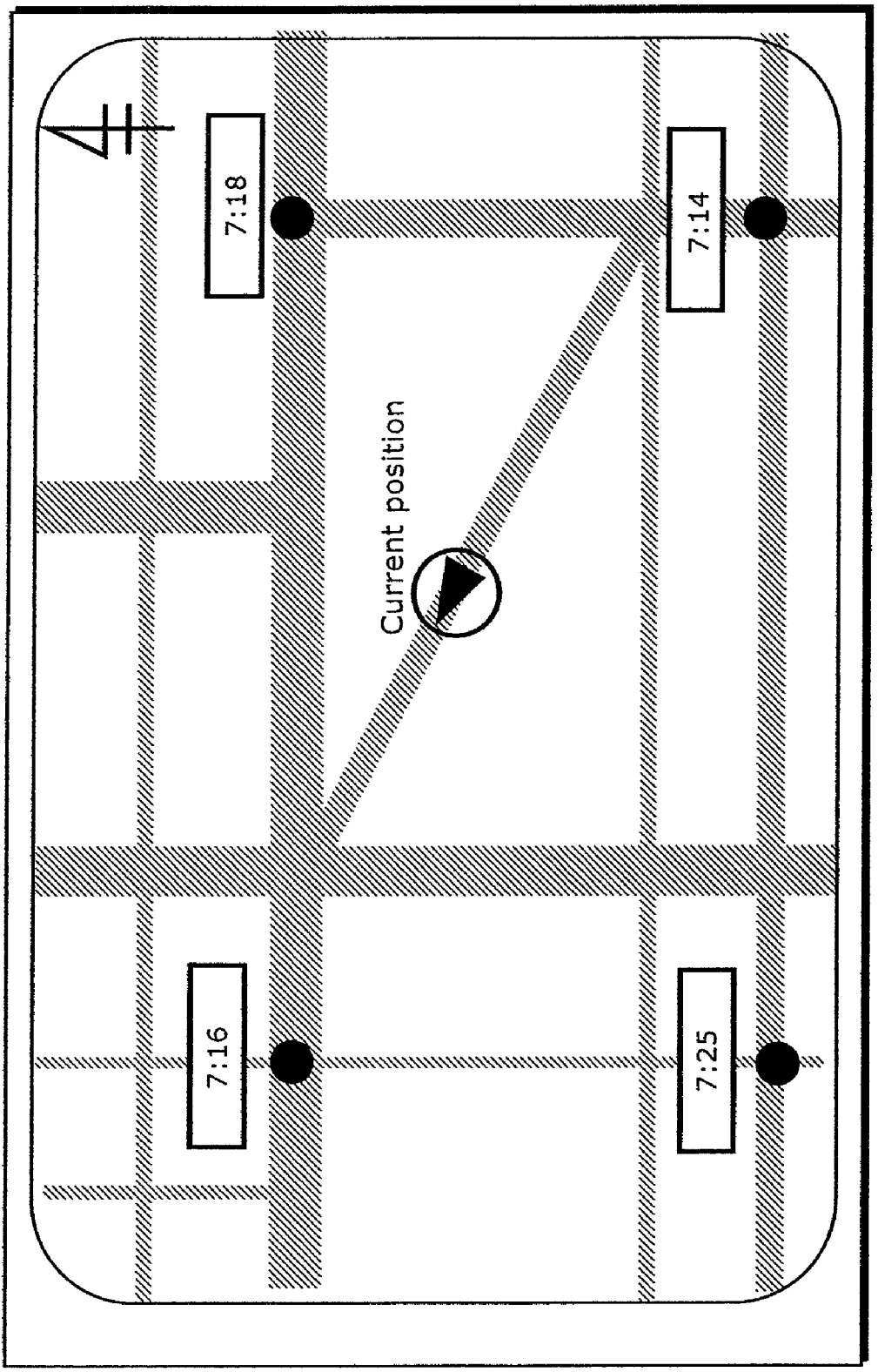
FIG. 12 shows an example where a transit time display unit displays a transit time.

Note that the predetermined size that defines a minimum size of each group area may be a circle whose diameter is a distance that requires, for the mobile object to travel, at least a smallest unit of time of a displayed transit time. When the map display unit displays a transit time such as "7:16" (16 minutes past 7 o'clock) as shown in FIG. 12, the smallest unit of time is 1 minute.

In the case where a time required to travel from end to end of a group area, that is, a time required for the mobile object to travel across a dimension of the group area, is less than 1 minute, irrespective of which position in the group area is determined as a transit time display position, there is a possibility that an estimated transit time of the determined position has only a difference of less than 1 minute from an estimated transit time of a transit time display position in its adjacent group area.

This can cause the same estimated transit time to be displayed at a plurality of points in the same direction from the current position. Such display of the same estimated transit time at a plurality of points provides no useful information to the user, and only worsens the viewability.

In view of this, the size of each group area is determined so that the time required for the mobile object to travel across the group area in any direction is no less than the smallest unit of time of the transit time. In detail, the size of each group area is determined so as to contain a circle whose diameter is a distance which requires at least the smallest unit of time of the transit time to travel. For example, when the smallest unit of time is 1 minute and a maximum speed of a car per hour is 60 km/h, a minimum distance from end to end of each group area is 1 km (=60/60). That is, the minimum size of each group area is a circle with a diameter of 1 km.

The use of such group areas increases the possibility that different transit times are displayed at a plurality of points in the same direction. Hence useful information can be provided to the user. This is particularly effective in cases such as detail display of a map, where transit times hardly differ if the predetermined size is a circle whose diameter is 1/10 of a distance of one side of the map area.

This grouping unit 111 is one example of a division unit that divides a displayed map area into a plurality of group areas.

The impression value calculation unit 112 calculates an impression value of each event occurrence position obtained by the occurrence number obtainment unit 107. The impression value is calculated from the number of event occurrences obtained by the occurrence number obtainment unit 107 and the number of event occurrence positions obtained by the occurrence position number obtainment unit 108. In more detail, an impression value of a position is a sum of impression values of all types of events occurring at the position. An impression value of an event at a position is calculated from the number of event occurrences of the event at the position and the number of event occurrence positions of the event. An impression value relating to a position is increased when the number of event occurrences at the position is larger, because the event has high repetitiveness at the position. Moreover, an impression value relating to a position is increased when the number of event occurrence positions of an event is smaller, because the event has high rarity. For example, an impression value of a position is shown by the following expression.

[Expression 4]

$$\left(\begin{array}{c}\text{Impression}\\ \text{value of positon } x\end{array}\right) = \sum_{\text{type } e} \frac{\left(\begin{array}{c}\text{number of event}\\ \text{occurrences of}\\ \text{type } e \text{ at position } x\end{array}\right)}{\left(\begin{array}{c}\text{number of event}\\ \text{occrrence positions}\\ \text{of type } e\end{array}\right)}. \quad (4)$$

Figure 10:
FIGS. 10(a), 10(b), and 10(c) show an example where an impression value calculation unit calculates an impression value.

For example, when the number of event occurrences and the number of event occurrence positions are calculated for every event occurrence position as shown in FIGS. 10(a) and 10(b), an impression value of a position of east longitude "134. 3. 0. 9" and north latitude "34. 6. 3. 6" is calculated as follows. Since types of events occurring at east longitude "134. 3. 0. 9" and north latitude "34. 6. 3. 6" are "stop" and "right turn/left turn", the calculation of (number of event occurrences)/(number of event occurrence positions) is performed for each of these events, and the calculation results are added together. The number of event occurrence positions of the "stop" event is "2", and the number of event occurrence positions of the "right turn/left turn" event is "2". Meanwhile, the number of event occurrences of the "stop" event at east longitude "134. 3. 0. 9" and north latitude "34. 6. 3. 6" is "2", and the number of event occurrences of the "right turn/left turn" event at east longitude "134. 3. 0. 9" and north latitude "34. 6. 3. 6" is "1". Accordingly, the impression value is (2/2+1/2=) "1.5", as shown in FIG. 10(c).

This impression value calculation unit 112 is one example of an impression value calculation unit that calculates, for each point, an impression value which shows a degree of impression a user receives from the point, using event history information.

The display position determination unit 113 determines transit time display positions from among event occurrence positions, using the impression value calculated for each event occurrence position by the impression value calculation unit 112 and the area of each group calculated by the grouping unit 111. In detail, the display position determination unit 113 determines one event occurrence position having a highest impression value in each group, as a transit time display position.

For instance, when the impression value of each event occurrence position is calculated as shown in FIG. 11(a) and the area of each group is calculated as shown in FIG. 11(b), a transit time display position in an area of a group ID "001" is calculated as follows. Event occurrence positions included in the area of the group ID "001" of east longitude "134. 4. 59. 9" to east longitude "134. 5. 59. 9" and north latitude "34. 5. 15. 6" to north latitude "34. 6. 15. 6" are a position of east longitude "134. 5. 0. 9" and north latitude "34. 6. 3. 6" having an impression value "1.5", a position of east longitude "134. 5. 30. 0" and north latitude "34. 6. 3. 6" having an impression value "1", and a position of east longitude "134. 5. 0. 9" and north latitude "34. 5. 30. 0" having an impression value "0.5". Of these positions, the position of east longitude "134. 5. 0. 9" and north latitude "34. 6. 3. 6" having the impression value "1.5" has a highest impression value. Accordingly, the position of east longitude "134. 5. 0. 9" and north latitude "34. 6. 3. 6" is determined as a transit time display position in the area of the group ID "001", as shown in FIG. 11(c). A transit time display position for each of the other group IDs is determined in the same way as above.

It should be noted here that, instead of determining one position having a highest impression value as a transit time display position, a predetermined number of positions may be determined as transit time display positions in decreasing order of impression value.

This display position determination unit 113 is one example of a selection unit that selects, for each division area, at most a predetermined number of points each as a point for displaying an estimated transit time, where the predetermined number is equal to or more than 1.

The time calculation unit 114 calculates an earliest transit time of each transit time display position determined by the display position determination unit 113, from the current time obtained by the time obtainment unit 101, the current position obtained by the position obtainment unit 102, and the road information stored in the map information storage unit 104 and in particular the link travel duration information. Suppose the road information is stored as shown in FIG. 4, the current time is "2006 Apr. 20 11:13:20", the current position is east longitude "134. 3. 0. 9" and north latitude "34. 6. 3. 6", and the transit time display position is east longitude "134. 2. 20. 9" and north latitude "34. 6. 3. 6". The time calculation unit 114 calculates a shortest travel duration of a section, based on connected nodes and link travel duration. In this example, a link travel duration from east longitude "134. 3. 0. 9" and north latitude "34. 6. 3. 6" to east longitude "134. 2. 20. 9" and north latitude "34. 6. 3. 6" is "110 seconds", so that the travel duration is "110 seconds". Since the transit time is a sum of the current time and the travel duration, the transit time is "2006 Apr. 20 11:15:10".

This time calculation unit 114 is one example of an estimated time calculation unit that calculates an estimated transit time of a selected point.

The map display unit 115 displays the map information stored in the map information storage unit 104, for the screen area obtained by the screen area obtainment unit 109. When doing so, the map display unit 115 also displays the transit time calculated by the time calculation unit 114, at a position on the map corresponding to each transit time display position determined by the map position determination unit 113. For example, the map display unit 115 displays transit times of transit time display positions on a map, as shown in FIG. 12.

This map display unit 115 is one example of a display unit that displays an image which includes a map and an estimated transit time of a point on the map, and a display control unit that causes the display unit to display the image which includes the map and the estimated transit time associated with the point for which the estimated transit time is calculated.

Figure 13:
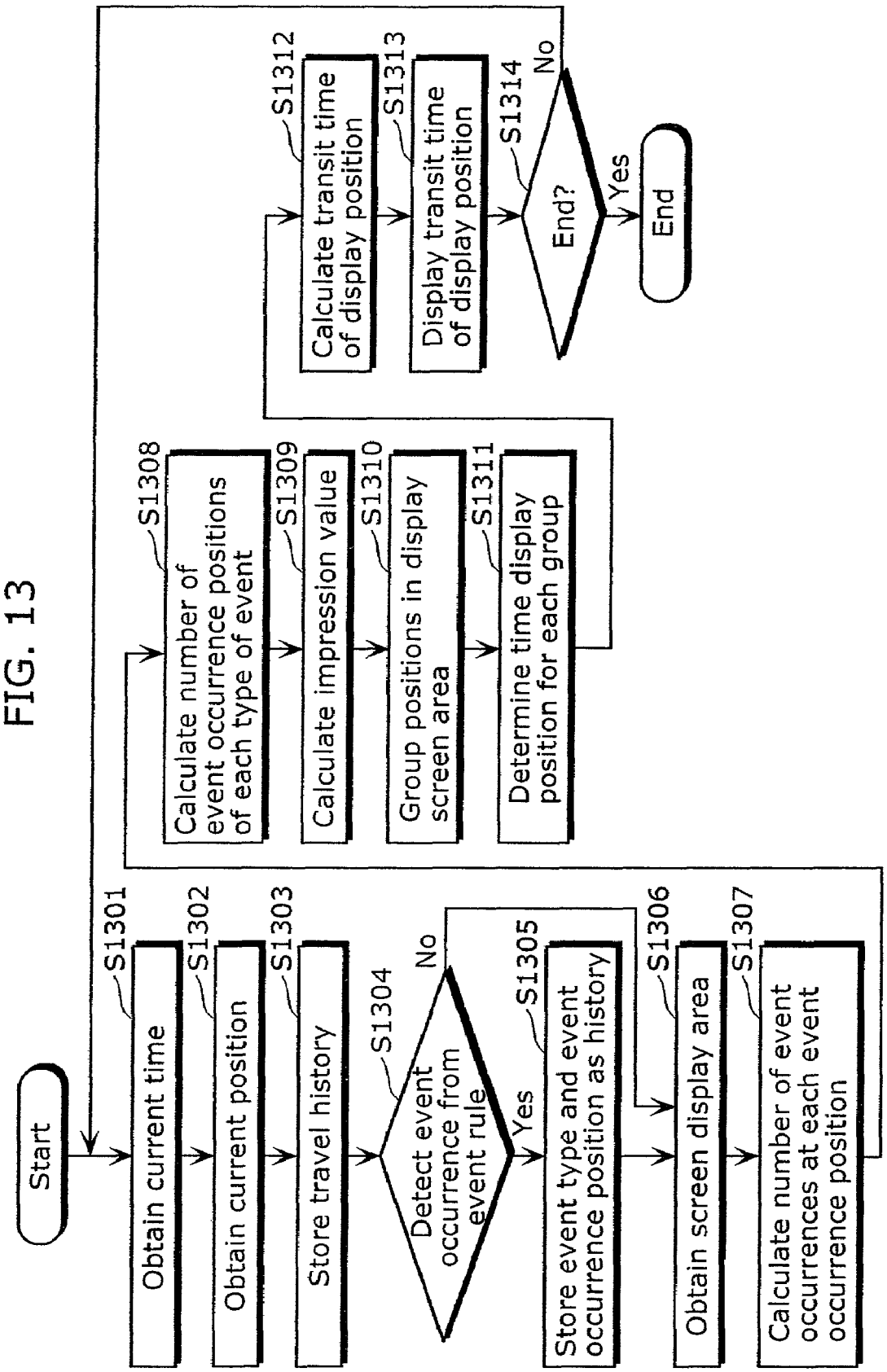
FIG. 13 is a flowchart showing an example operation of the map information display apparatus in the embodiment of the present invention.

A flowchart of this embodiment is described below, with reference to FIG. 13.

The time obtainment unit 101 obtains a current time (Step S1301). The position obtainment unit 102 obtains a current position (Step S1302). The travel history storage unit 116 stores the current time obtained by the time obtainment unit 101 and the current position obtained by the position obtainment unit 102, as a travel history (Step S1303).

The occurrence detection unit 105 judges whether or not an event occurred, based on the travel history stored in the travel history storage unit 116, the map information stored in the map information storage unit 104, and the event rule stored in the rule storage unit (Step S1304). When an event occurrence is detected (S1304: Yes), the flow proceeds to Step S1304. When no event occurrence is detected (S1304: No), the flow proceeds to Step S1306. When an event occurrence is detected, a type and occurrence position of the detected event are stored in the event history storage unit 106 (Step S1305).

The screen area obtainment unit 109 obtains a display screen area representing a map area displayed by the map display unit 115, according to the current position obtained by the position obtainment unit 102 (Step S1306). The occurrence number obtainment unit 107 obtains, for each event occurrence position, the number of event occurrences of each type of event, from the event history stored in the event history storage unit 106 (Step S1307).

The occurrence position number obtainment unit 108 calculates, for each type of event, the number of event occurrence positions, from the event history stored in the event history storage unit 106 (Step S1308). The impression value calculation unit 112 calculates an impression value of each event occurrence position, from the number of event occurrences of each type of event which is calculated by the occurrence number obtainment unit 107 for each event occurrence position and the number of event occurrence positions which is calculated by the occurrence position number obtainment unit 108 for each type of event (Step S1309).

The grouping unit 111 groups event occurrence positions stored in the event history, using the display screen area obtained by the screen area obtainment unit 109 (Step S1310).

The display position determination unit 113 determines, from among the event occurrence positions grouped by the grouping unit 111, a position having a highest impression value calculated by the impression value calculation unit 112 in each group, as a transit time display position (Step S1311).

The time calculation unit 114 calculates a transit time of each transit time display position determined by the display position determination unit, using the current time obtained by the time obtainment unit 101, the current position obtained by the position obtainment unit 102, and the map information stored in the map information storage unit (Step S1312).

The map display unit 115 displays the map information stored in the map information storage unit 104, on a monitor (not illustrated). When doing so, the map display unit 115 also displays the transit time calculated by the time calculation unit 114, at the corresponding transit time display position on the map (Step S1313).

The judgment as to whether or not to end the flow is performed (Step S1314). When the flow is to end, the flow ends (S1314: Yes). Otherwise, the flow returns to Step S1301 (S1314: No).

(Example where the Map Information Display Apparatus of the Embodiment is a Computer)

It is to be noted that a map information display apparatus of an embodiment is a computer in many cases. An example structure of the map information display apparatus of this embodiment when implemented on a computer is shown in FIG. 14.

Figure 14:
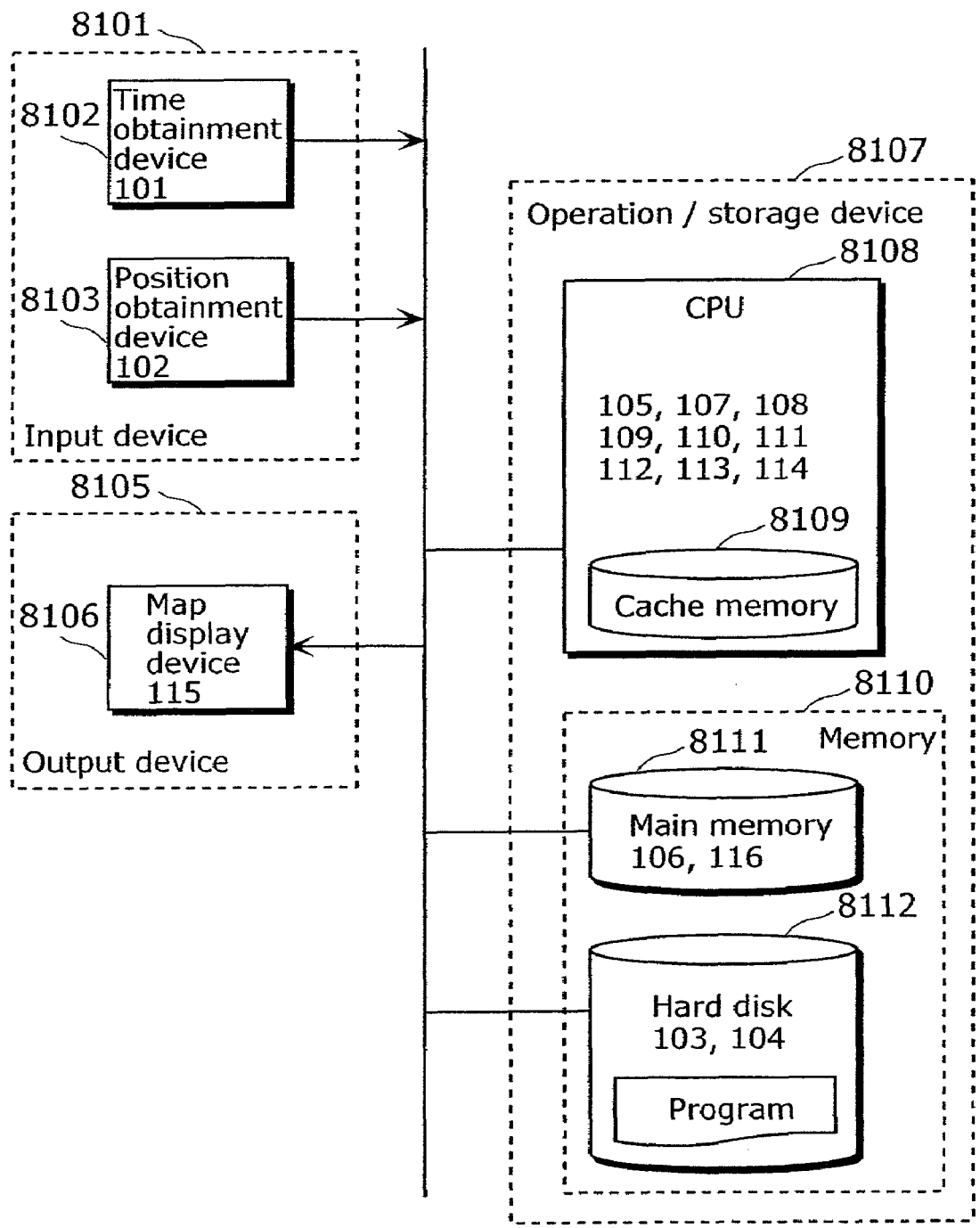
FIG. 14 is a block diagram showing a structure of a map information display apparatus in a computer in the embodiment of the present invention.

The map information display apparatus shown in FIG. 14 includes an input device 8101, an output device 8105, and an operation/storage device 8107.

The input device 8101 includes a time obtainment device 8102 and a position obtainment device 8103. The time obtainment device 8102 includes the time obtainment unit 101. The position obtainment device 8103 includes the position obtainment unit 102.

The output device 8105 includes a map display device 8106. The map display device 8106 includes the map display unit 115.

The operation/storage device 8107 includes a Central Processing Unit (CPU) 8108 which is an operation device, and a memory 8110 which is a storage device.

The CPU 8108 typically has a cache memory 8109 which is a storage device accessible at high speed, inside or outside the CPU 8108. The CPU 8108 executes a program, thereby achieving the functions of the occurrence detection unit 105, the occurrence number obtainment unit 107, the occurrence position number obtainment unit 108, the screen area obtainment unit 109, the display position selection unit 110, the grouping unit 111, the impression value calculation unit 112, the display position determination unit 113, and the time calculation unit 114.

The memory 8110 is typically composed of a main memory 8111 that is accessible at relatively high speed by the CPU 8108, and an external storage device having a large storage capacity, such as a hard disk (hard disk drive) 8112. The memory 8110 includes the event history storage unit 106, the occurrence number obtainment unit 107, the rule storage unit 103, and the map information storage unit 104. In particular, it is preferable to include the event history storage unit 106 and the occurrence number obtainment unit 107 in the main memory 8111 and the rule storage unit 103 and the map information storage unit 104 in the hard disk 8112, in order to enhance efficiency in speed and capacity. Furthermore, the program executed by the CPU 8108 is stored in the hard disk 8112, as shown in FIG. 14.

Figure 15:
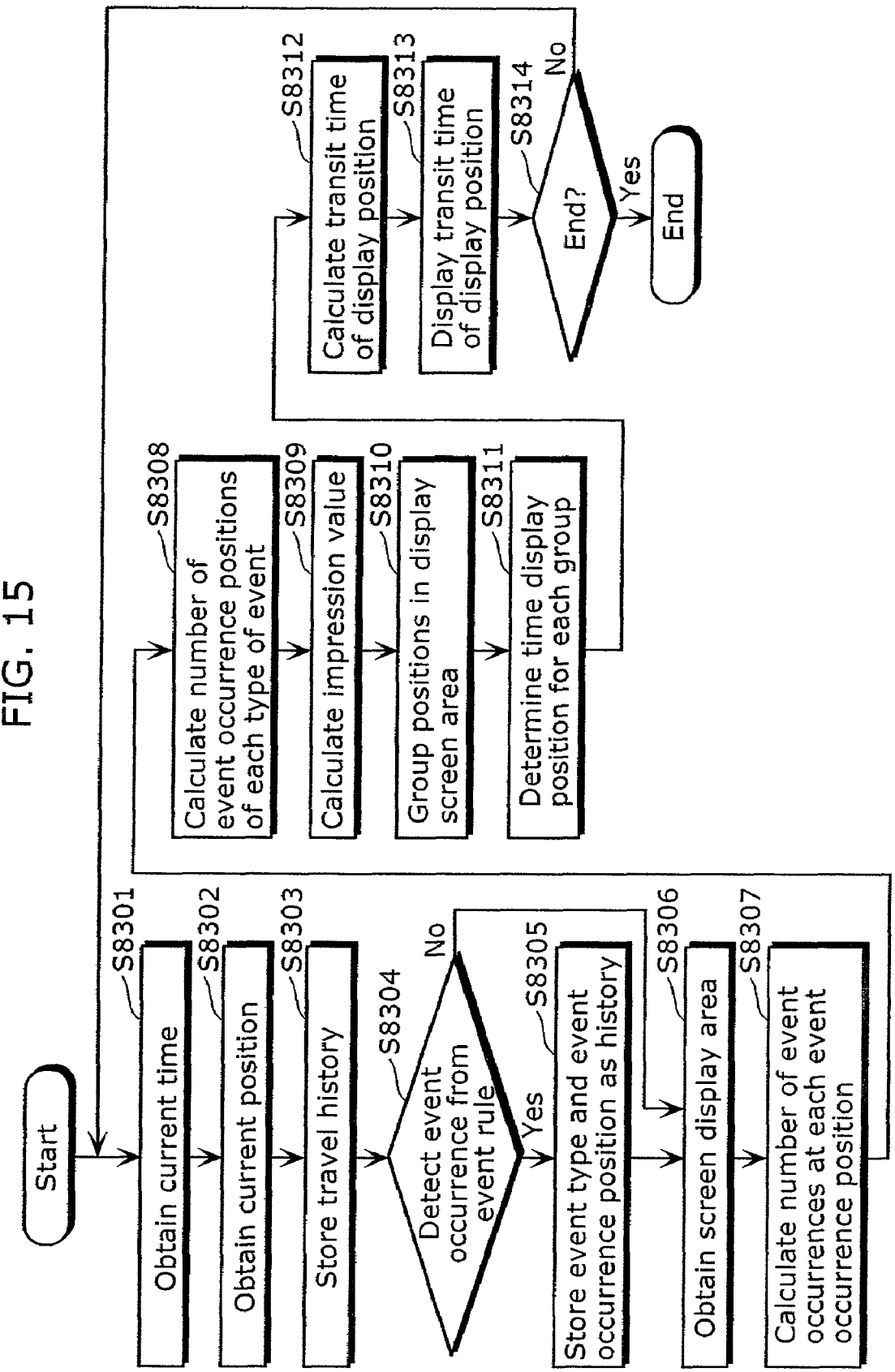
FIG. 15 is a flowchart showing an example operation of the map information display apparatus in the computer in the embodiment of the present invention.

A flowchart of this embodiment is described below, with reference to FIG. 15.

The time obtainment device 8102 obtains a current time (Step S8301). The position obtainment device 8103 obtains a current position (Step S8302). The current time obtained by the time obtainment device 8102 and the current position obtained by the position obtainment device 8103 are stored in the main memory 8111 as a travel history (Step S8303).

The CPU 8108 judges whether or not an event occurred, based on the travel history stored in the main memory 8111 and the map information and the event rule stored in the hard disk 8112 (Step S8304). When an event occurrence is detected (S8304: Yes), the flow proceeds to Step S8305. When no event occurrence is detected (S8304: No), the flow proceeds to Step S8306. When an event occurrence is detected, a type and occurrence position of the detected event are stored in the main memory 8111 (Step S8305).

The CPU 8108 obtains a display screen area representing a range of a map displayed by the map display unit 115, according to the current position obtained by the position obtainment device 8103 (Step S8306).

The CPU 8108 obtains, for each event occurrence position, the number of event occurrences of each type of event, from the event history stored in the main memory 8111 (Step S8307). The CPU 8108 calculates, for each type of event, the number of event occurrence positions, from the event history stored in the main memory 8111 (Step S8308).

The CPU 8108 calculates an impression value of each event occurrence position, from the number of event occurrences of each type of event which is calculated for each event occurrence position and the number of event occurrence positions which is calculated for each type of event (Step S8309). The CPU 8108 groups event occurrence positions stored in the event history, using the obtained display screen area (Step S8310). The CPU 8108 determines, from among the grouped event occurrence positions, a position having a highest impression value in each group, as a transit time display position (Step S8311).

The CPU 8108 calculates a transit time of each determined transit time display position, using the current time obtained by the time obtainment device 8102, the current position obtained by the position obtainment device 8103, and the map information stored in the hard disk 8112 (Step S8312). The map display device 8106 displays the map information stored in the hard disk 8112, on a monitor apparatus. When doing so, the map display device 8106 also displays the calculated transit time at the corresponding transit time display position on the map (Step S8313).

The judgment as to whether or not to end the flow is performed (Step S8314). When the flow is to end, the flow ends (S8314: Yes). Otherwise, the flow returns to Step S8301 (S8314: No).

Although the present invention has been described by way of the above embodiment, the map information display apparatus according to the present invention is not limited to the above embodiment. Variations are described below.

(Variation 1)

The above embodiment describes the case where the occurrence detection unit 105 uses the map information in the map information storage unit 104, in order to detect an event occurrence. In particular, by checking the current position against the map information to perform matching on the map, more accurate current position information can be obtained, which produces an advantage of reliably detecting even an event such as right turn/left turn of a small angle.

However, even when the map information storage unit 104 is not used, the event occurrence detection can still be performed by extracting a trajectory of the current position from the current time, though less accurately. For example, a "right turn/left turn" event can be detected when an angle of turn of the trajectory of the current position is no smaller than a predetermined value. Therefore, especially in the case where only the "right turn/left turn" event is taken into consideration, the map information in the map information storage unit 104 need not be used for the event occurrence detection.

(Variation 2)

The above embodiment describes the case where the travel history made up of the current position and the current time is stored to perform the event occurrence detection based on the travel history. However, there is an event that can be detected without storing the travel history.

Accordingly, the event occurrence detection may be performed based on the current position and the current time, without storing the travel history. As one example, in the case of detecting only an event of transiting a road structure, the "transit" event is detected when the current position matches a position of the road structure, with there being no need to store the travel history.

(Variation 3)

The above embodiment describes the case where the impression value is calculated from the number of event occurrence positions that shows the rarity of the event, and the number of event occurrences that shows the repetitiveness of the event at the position. However, in the case where the user always takes a same route, such as when the user commutes by car to and from work, the number of event occurrences is similar or sufficiently large at any position. In such a case, the repetitiveness need not be taken into consideration.

For such a user, a transit time display position may be determined by calculating the rarity of each type of event occurring at each position. Which is to say, the transit time display position may be determined based only on the number of event occurrence positions which shows the rarity of the event. In detail, when the number of event occurrence positions of an event occurring at a position is small, that position is selected as a transit time display position.

This makes it possible to determine a transit time display position that is easily recognizable by the user according to a type of event which occurred at the position.

For example, some users frequently make a right turn and a left turn but do not stop often at a traffic light and the like as they use back roads to and from work, while other users do not often make a right turn and a left turn but frequently stop at a traffic light and the like.

Even when a transit time of a "right turn/left turn" position is displayed for the user who frequently makes a right turn and a left turn, such a user has only a weak impression of the "right turn/left turn" position, and so the user cannot recognize the position for which the transit time is displayed. On the other hand, when a transit time of a "stop" position is displayed for the user, the user has a strong impression of the "stop" position because there are only a few "stop" positions, and so the user can easily recognize the position for which the transit time is displayed.

Meanwhile, for the user who does not frequently make a right turn and a left turn, it is preferable to display a transit time of a "right turn/left turn" position rather than a transit time of a "stop" position, because the "right turn/left turn" position is more easily recognizable by the user.

A method of this variation is described below.

Figure 16:
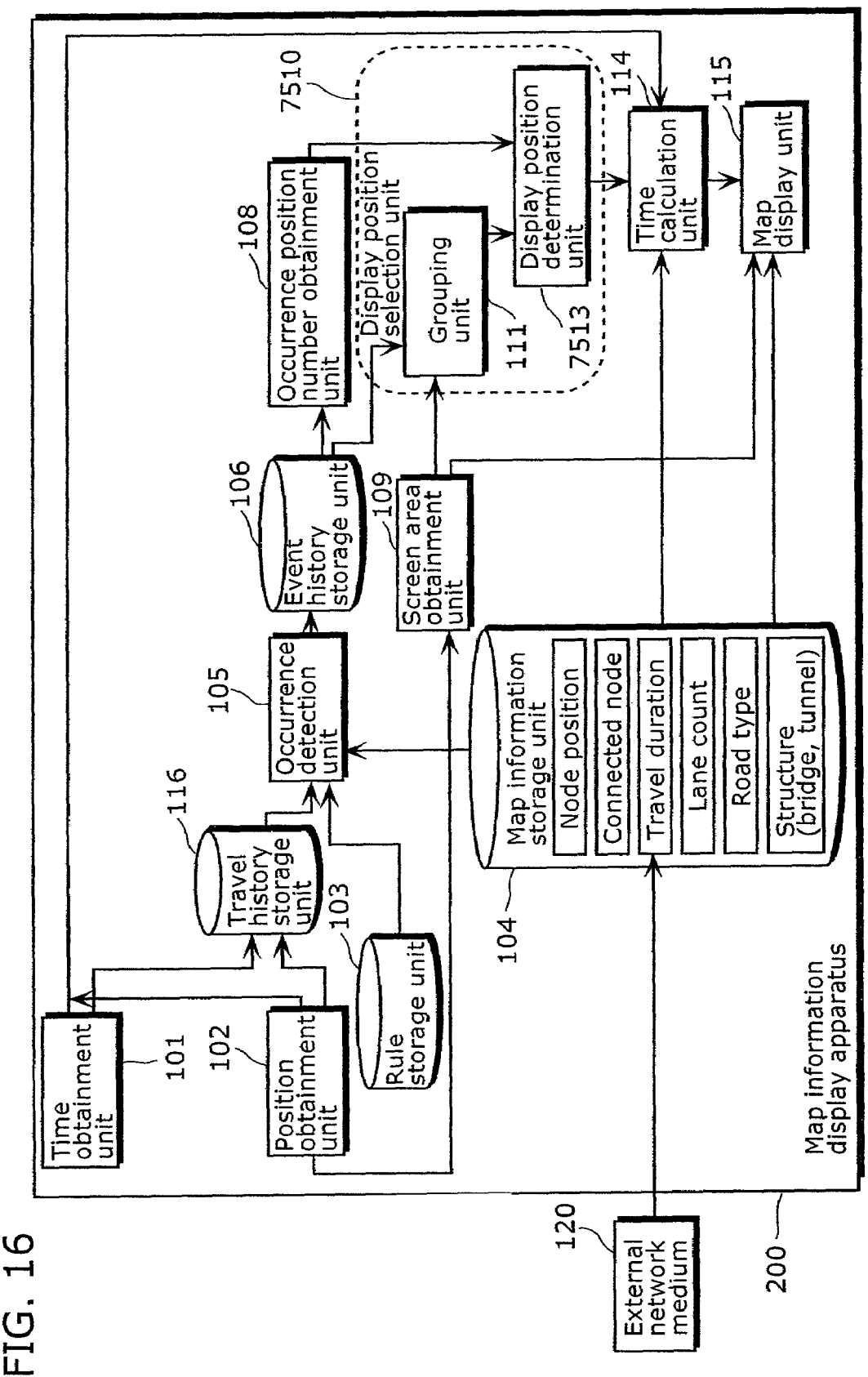
FIG. 16 is a block diagram showing a structure of a map information display apparatus in variation 3 of the present invention.

FIG. 16 shows a structure of a map information display apparatus in this example. Components shown in the above embodiment have been given the same reference numerals, and their explanation has been omitted here. The following first describes each component with reference to drawings, and then describes an operation of the map information display apparatus.

In a map information display apparatus 200 shown in FIG. 16, a display position selection unit 7510 selects and determines transit time display positions from among event occurrence positions, using the event history stored in the event history storage unit 106, the number of event occurrence positions obtained by the occurrence position number obtainment unit 108, and the display screen area obtained by the screen area obtainment unit 109. The display position selection unit 110 includes the grouping unit 111 and a display position determination unit 7513.

The display position determination unit 7513 determines a transit time display position from among event occurrence positions in each group, using the number of event occurrence positions obtained by the occurrence position number obtainment unit 108 and the area of each group calculated by the grouping unit 111.

In detail, the display position determination unit 7513 determines, from among the event occurrence positions in each group, a position at which an event with a smallest number of event occurrence positions occurred, as a transit time display position. In the case where a plurality of types of events occurred at a same position, a type of event with a smaller number of event occurrence positions is prioritized.

For example, when the event occurrence positions specified by latitude and longitude and the numbers of event occurrence positions are obtained as shown in FIG. 17(a) and group areas are obtained as shown in FIG. 17(b), a transit time display position in an area of a group ID "001" is calculated as follows. Event occurrence positions included in the area of the group ID "001" of east longitude "134. 4. 59. 9" to east longitude "134. 5. 59. 9" and north latitude "34. 5. 15. 6" to north latitude "34. 6. 15. 6" are a position of east longitude "134. 5. 0. 9" and north latitude "34. 6. 3. 6" having the number of event occurrence positions "1", a position of east longitude "134. 5. 30. 0" and north latitude "34. 6. 3. 6" having the number of event occurrence positions "2", and a position of east longitude "134. 5. 0. 9" and north latitude "34. 5. 30. 0" having the number of event occurrence positions "2". Of these positions, the position of east longitude "134. 5. 0. 9" and the north latitude "34. 6. 3. 6" having the number of event occurrence positions "1" has a smallest number of event occurrence positions. Accordingly, the position of east longitude "134. 5. 0. 9" and north latitude "34. 6. 3. 6" is determined as a transit time display position for the group ID "001".

A transit time display position for each of the other group IDs is determined in the same way as above.

Figure 18:
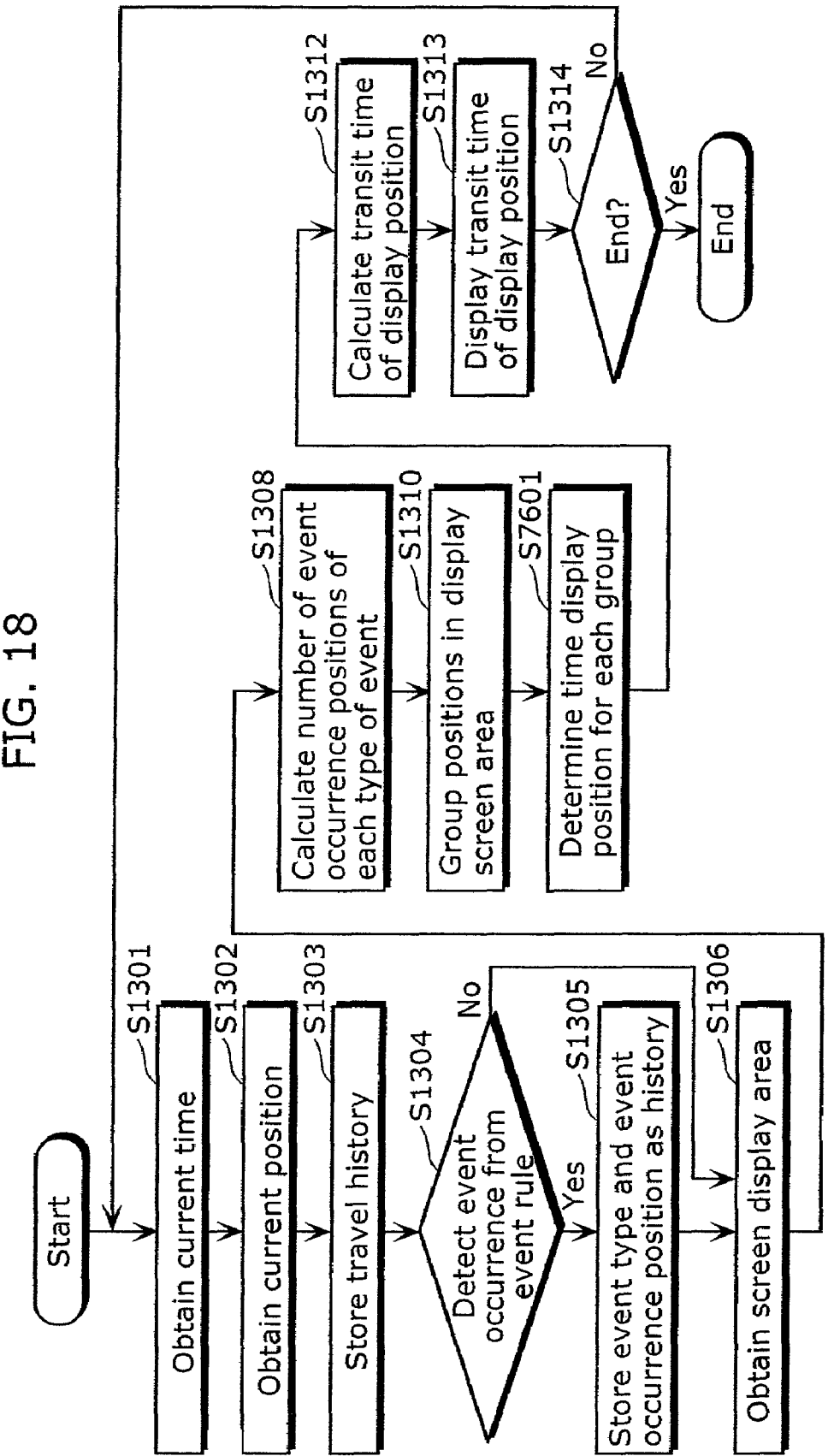
FIG. 18 is a flowchart showing an example operation of the map information display apparatus in variation 3 of the present invention.

A flowchart of this example is described below, with reference to FIG. 18. An explanation of processes shown in the above embodiment has been omitted here.

After the screen area obtainment unit 109 obtains the display screen area representing the map area displayed by the map display unit 115 as in the above embodiment (Step S1306), the occurrence position number obtainment unit 108 calculates, for each type of event, the number of event occurrence positions, from the event history stored in the event history storage unit 106 (Step S1308). The grouping unit 111 groups event occurrence positions stored in the event history, using the display screen area obtained by the screen area obtainment unit 109 (Step S1310). The display position determination unit 113 determines, from among the event occurrence positions grouped by the grouping unit 111, a position at which an event having a smallest number of event occurrence positions obtained by the occurrence position number obtainment unit 108 occurred in each group, as a transit time display position (Step S7611). The subsequent processes are the same as those of the above embodiment.

For instance, this example may be applied in the following manner. The judgment as to whether or not the user always takes a same route is made based on the travel history, and this example is applied only when the user always takes the same route. In so doing, it is possible to avoid a situation where a transit time on a route which the user seldom takes is displayed and the user cannot recognize a place for which the transit time is displayed. In more detail, this example may be used when every position stored in the travel history storage unit 116 has at least a predetermined number of records.

(Variation 4)

The above embodiment describes the case where the impression value is calculated from the number of event occurrence positions that shows the rarity of the event and the number of event occurrences that shows the repetitiveness of the event at the position. As an alternative, the impression value may be calculated only from the number of event occurrences that shows the repetitiveness of the event. In detail, the impression value is increased when the number of event occurrences at the position is larger. As one example, the number of event occurrences itself is used as the impression value. Thus, the impression value may be calculated based only on the repetitiveness, in the case of determining the transit time display position using only an event of uniform rarity, such as when determining the transit time display position using only a "parking" event.

(Variation 5)

The above embodiment describes the case where the impression value is calculated from the number of event occurrence positions that shows the rarity of the event. However, a sum of the numbers of event occurrences of the event at all positions also shows the rarity of the event. Accordingly, the impression value may be calculated from the sum of the numbers of event occurrences. In detail, the impression value is increased when the sum of the numbers of event occurrences at all positions is smaller. For example, an inverse of the sum of the numbers of event occurrences is calculated as the impression value. Suppose the sum of the numbers of event occurrences of a "tunnel transit" event is 10, and the sum of the numbers of event occurrences of a "bridge transit" event is 3. In this case, the number of times the "bridge transit" event occurred is smaller, which means the "bridge transit" event is rarer, so that a higher impression value is set for the "bridge transit" event.

Here, the number of event occurrences of an event at a position which is an impression value calculation target may be subtracted from "(the sum of the numbers of event occurrences of the event)+1". By doing so, a decrease in impression value which occurs when the impression value calculation target position has a large number of event occurrences of the event.

(Variation 6)

The above embodiment describes the case where the transit time is displayed on the map. However, a required time may be displayed instead of the transit time. In detail, the time calculation unit 114 calculates a required time from the current position to the transit time display position, using the map information. By displaying the required time, the user can easily know how long it takes until the user passes a certain position. The transit time display is effective for a place where the time of day is an important factor, such as a train station, a company, a shop with limited opening hours, a place to eat, or the like. On the other hand, the required time display is effective when the user goes to a place where the time of day is not an important factor.

(Variation 7)

Figure 19:
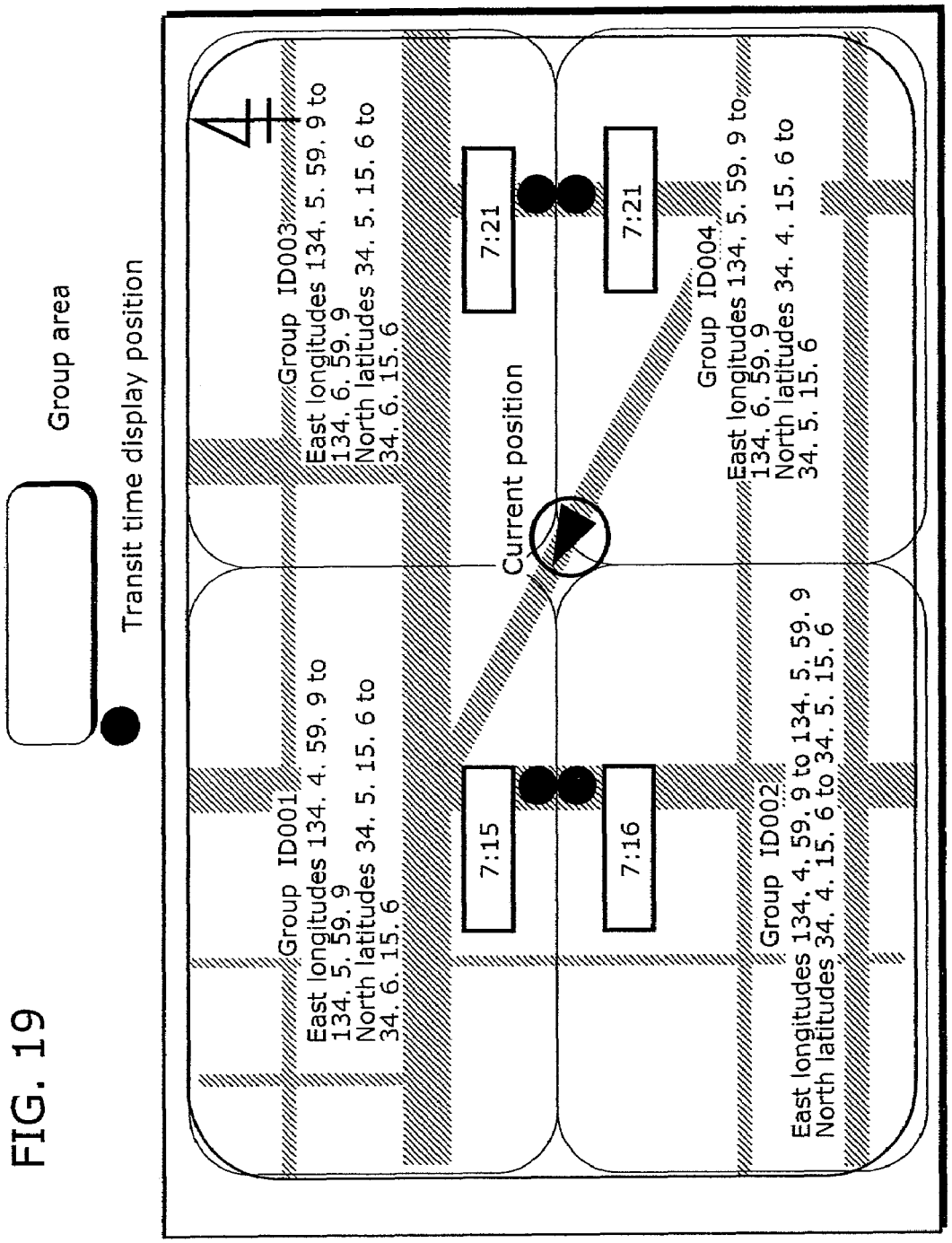
FIG. 19 shows an example of a failure in display position determination by grouping.
Figure 20:
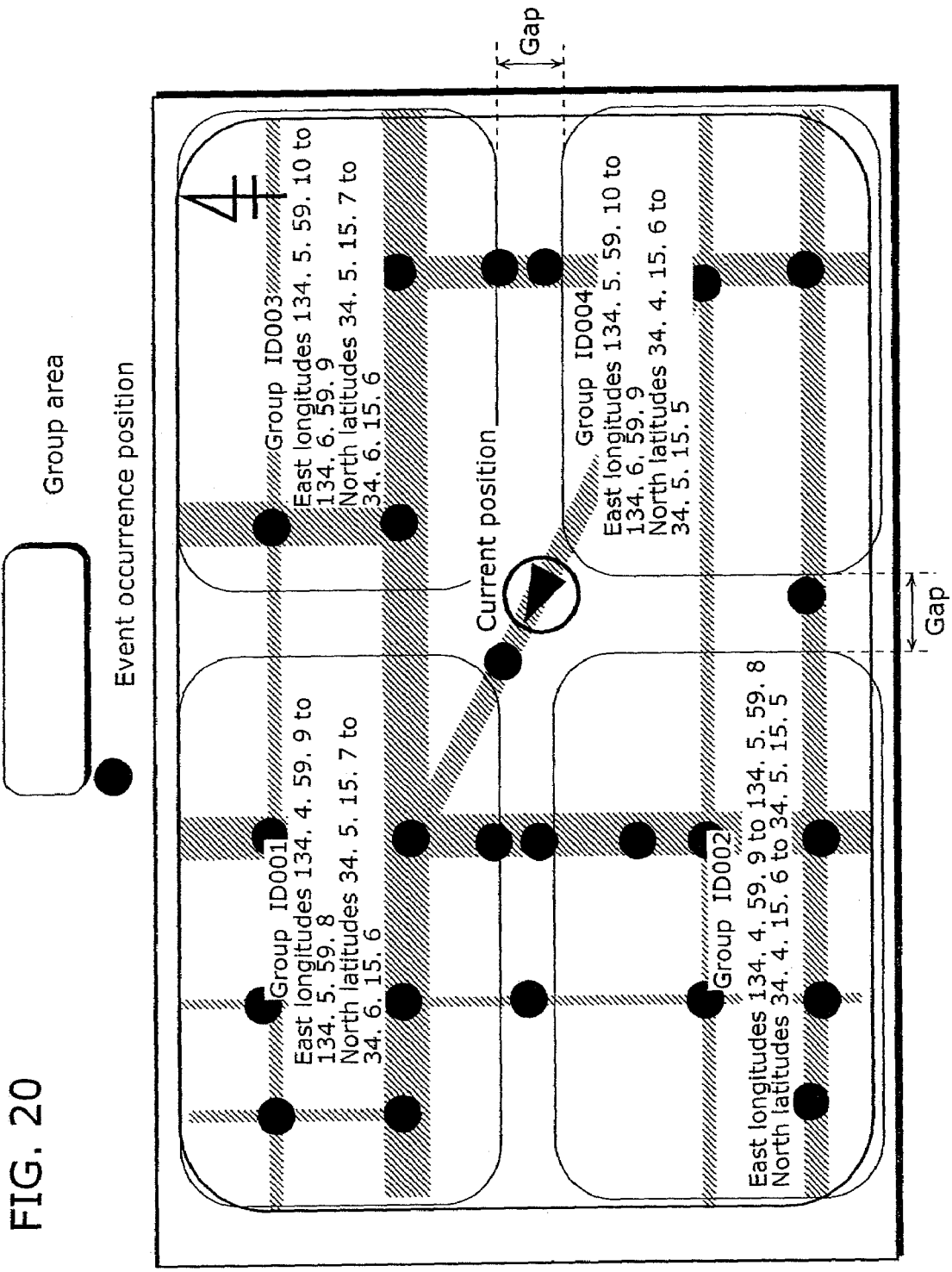
FIG. 20 shows an example of providing a gap between groups at the time of grouping.

The above embodiment describes the case where the grouping unit 111 generates the group areas by dividing the display screen area corresponding to the map area which is subject to display. However, in the case where an extremely large number of event occurrence positions exist in the screen, there is a possibility that transit time display positions are not scattered but determined on boundary lines of group areas as shown in FIG. 19, which makes the transit time display useless. In view of this, at the time of grouping, the grouping unit 111 may provide a gap area that does not belong to any group between the group areas, as shown in FIG. 20. Alternatively, the grouping unit 111 may determine transit time display positions except in the neighborhood of the boundary lines of the group areas.

Figure 21:
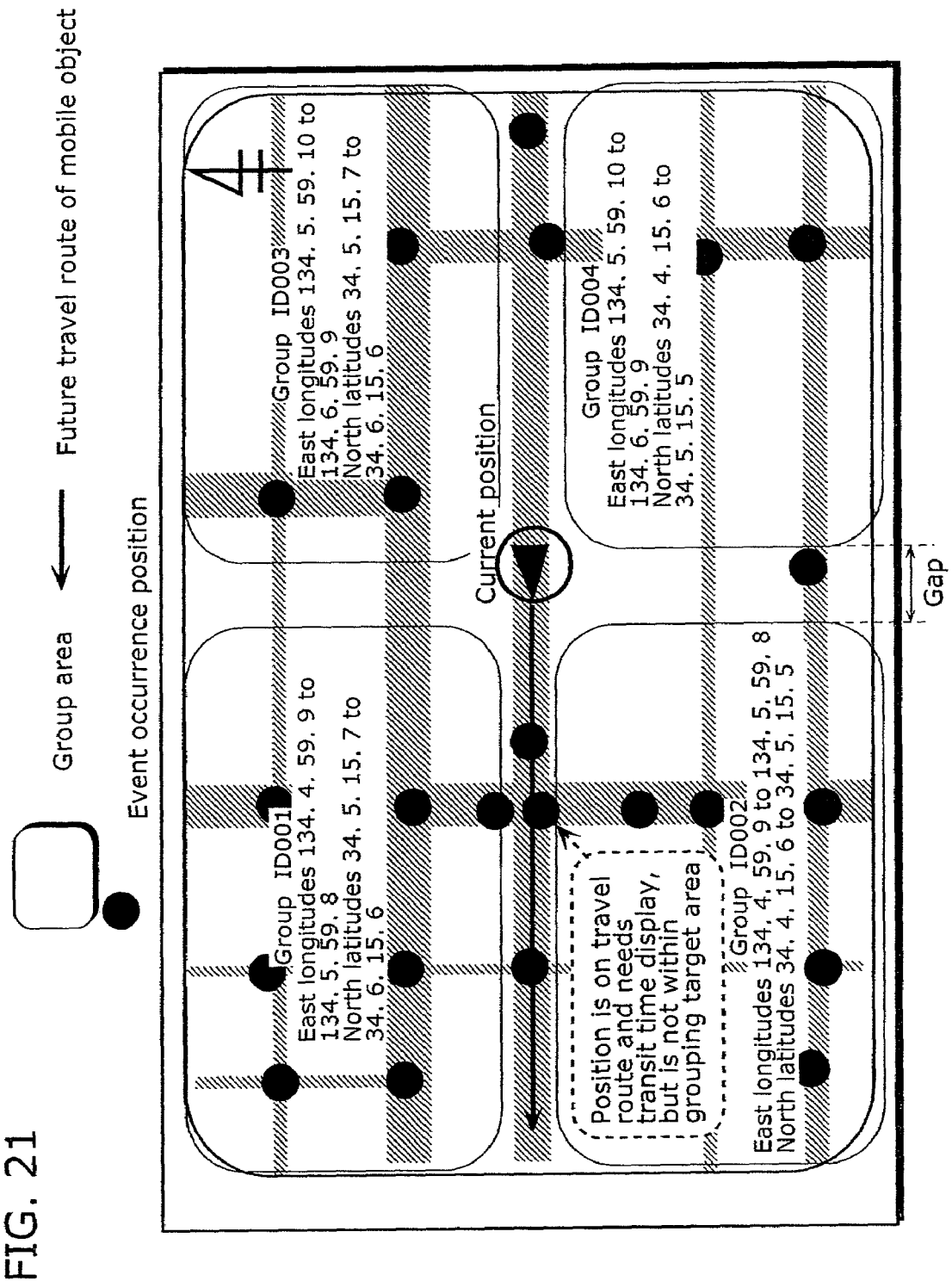
FIG. 21 shows an example of a problem that occurs when a gap is provided between groups at the time of grouping.

This makes it possible to distribute transit time display positions scatteredly. However, simply providing a gap area or avoiding displaying a transit time in a neighborhood of a boundary line may cause a state where a transit time on a travel route which the mobile object is going to take is not displayed at all as shown in FIG. 21, despite the user wanting to know the transit time on the future travel route most of all.

This problem can be solved by determining the group areas so that at least one group area includes the future travel route of the mobile object. In detail, because there is a high possibility that the mobile object continues to travel on a road where the mobile object is currently located, the grouping unit 111 determines the group areas so that at least one group area includes a part of the current road that is in the travel direction of the mobile object.

When doing so, it is desirable to determine the group areas so as to include as many event occurrence positions as possible, that is, so as to minimize the number of event occurrence positions which are left in a gap area.

A method of this variation is described below.

Figure 22:
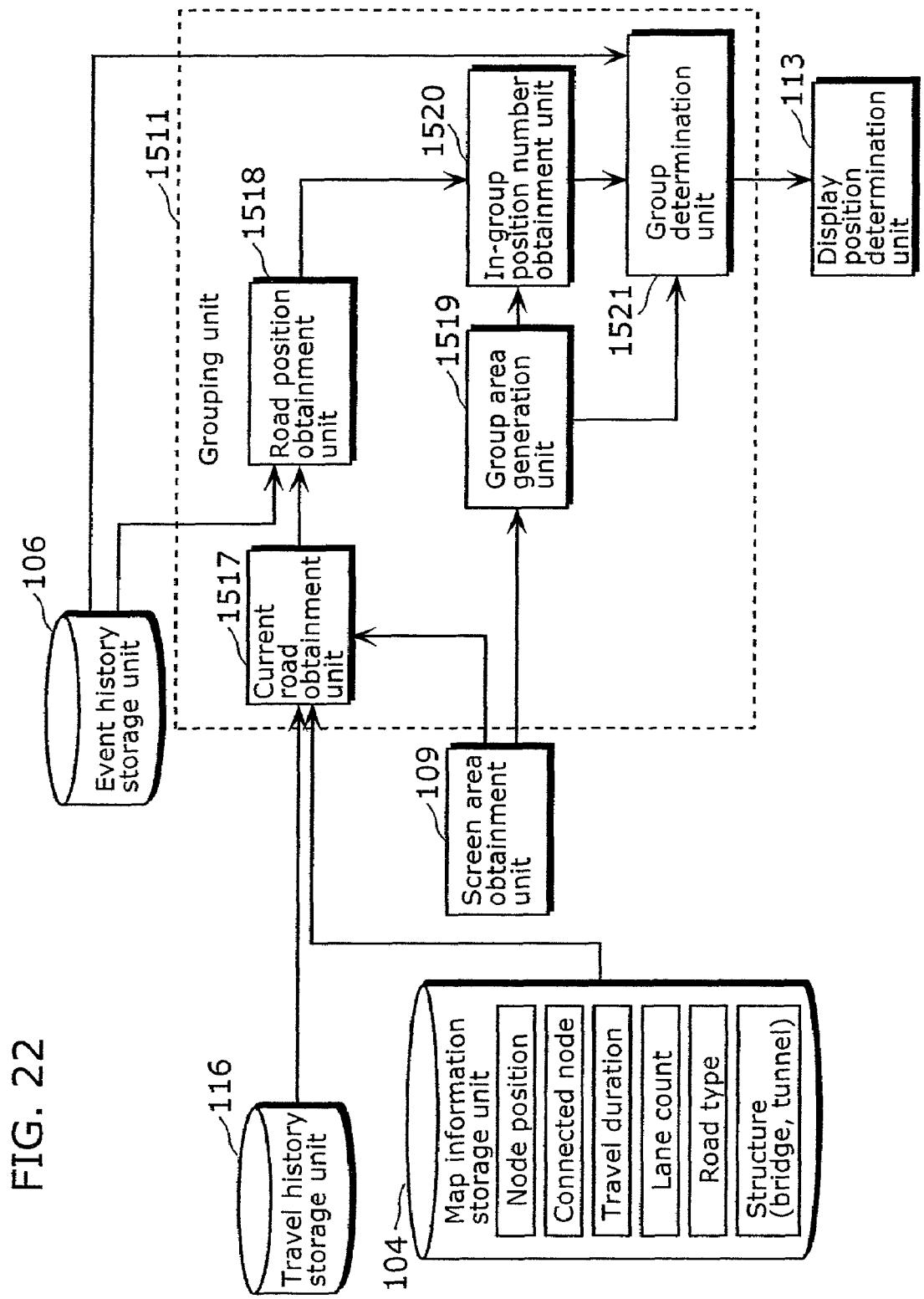
FIG. 22 is a block diagram showing a structure of a grouping unit in variation 7 of the present invention.

FIG. 22 shows a structure of a grouping unit 1511 of a map information display apparatus in this variation. A structure of the map information display apparatus other than the grouping unit 1511 is the same as that of the above embodiment, and so an explanation of the structure of the map information display apparatus other than the grouping unit 1511 has been omitted here. The following first describes each component of the grouping unit 1511 with reference to drawings, and then describes an operation of the map information display apparatus in this variation.

The grouping unit 1511 includes a current road obtainment unit 1517, a road position obtainment unit 1518, a group area generation unit 1519, an in-group position number obtainment unit 1520, and a group determination unit 1521.

The current road obtainment unit 1517 extracts a travel direction and a current position of the mobile object, from the travel history stored in the travel history storage unit 116. The current road obtainment unit 1517 then obtains, in the map area displayed by the map display unit 115, a position of a part in the travel direction of a road on which the mobile object is currently located, using the road information stored in the map information storage unit 1014 and the display screen area obtained by the screen area obtainment unit 109.

Figure 23:
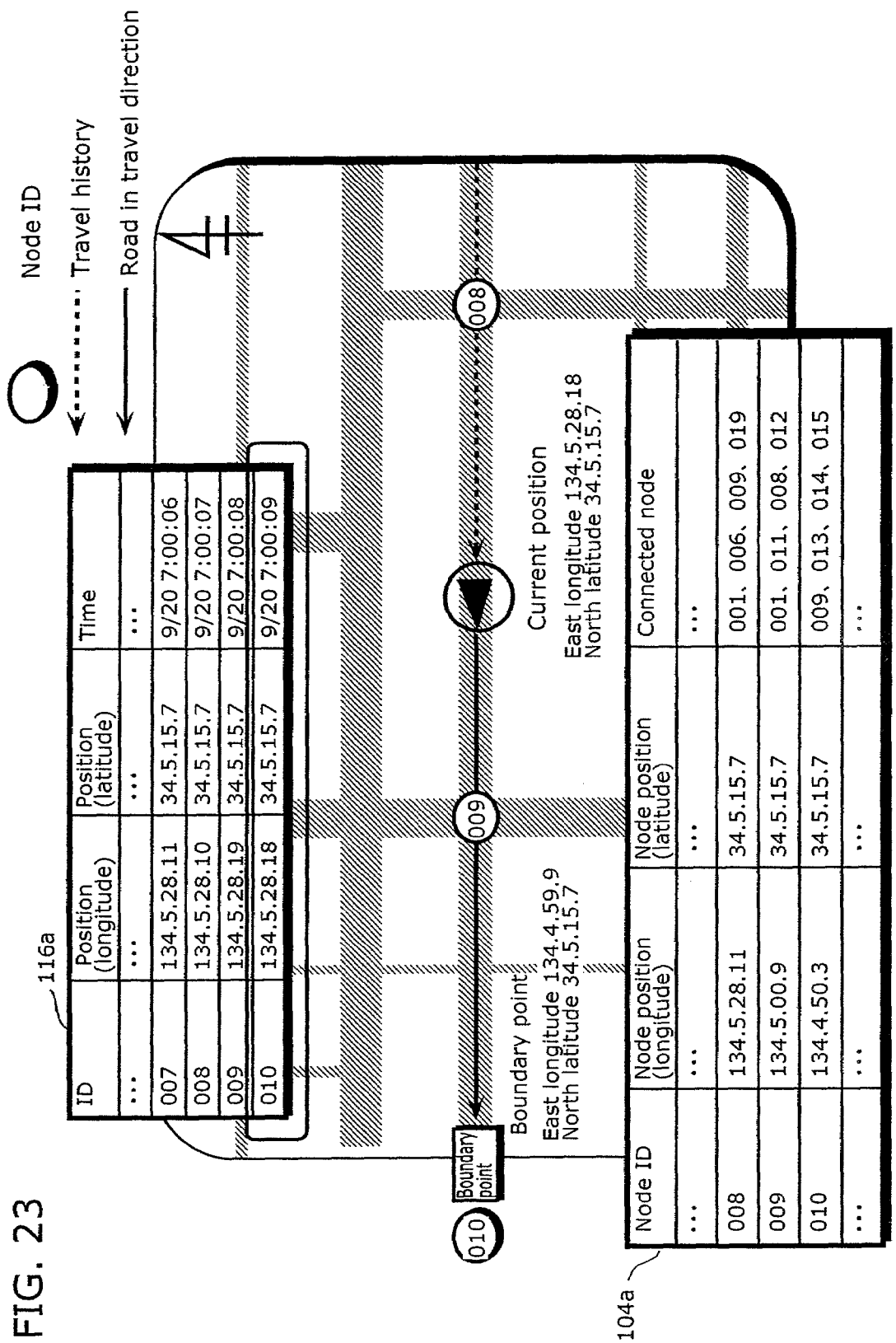
FIG. 23 shows an example of extracting a road in a travel direction of a mobile object.

For example, consider the case where the travel history and the road information are stored as shown in FIG. 23. The travel history and the road information indicates that the current position and the travel direction of the mobile object are such that the mobile object has transited a node of a node ID "008" and is traveling directly west, i.e., in a direction toward a node of a node ID "009". Since a node connected directly west of the node of the node ID "009" is a node of a node ID "010" according to the road connection information, it can be estimated that the mobile object will travel from the current position and transit the nodes of the node IDs "009" and "010".

The current road obtainment unit 1517 extracts, from the road extending from the node of the node ID "008" to the node of the node ID "010", a road from the current position to a screen edge designated as a boundary point, as a road in the travel direction. In the case of FIG. 23, a road from the current position of east longitude "134. 5. 28. 18" and north latitude "34. 5. 15. 7" to the position of east longitude "134. 4. 59. 9" and north latitude "34. 5. 15. 7" is extracted.

Figure 24:
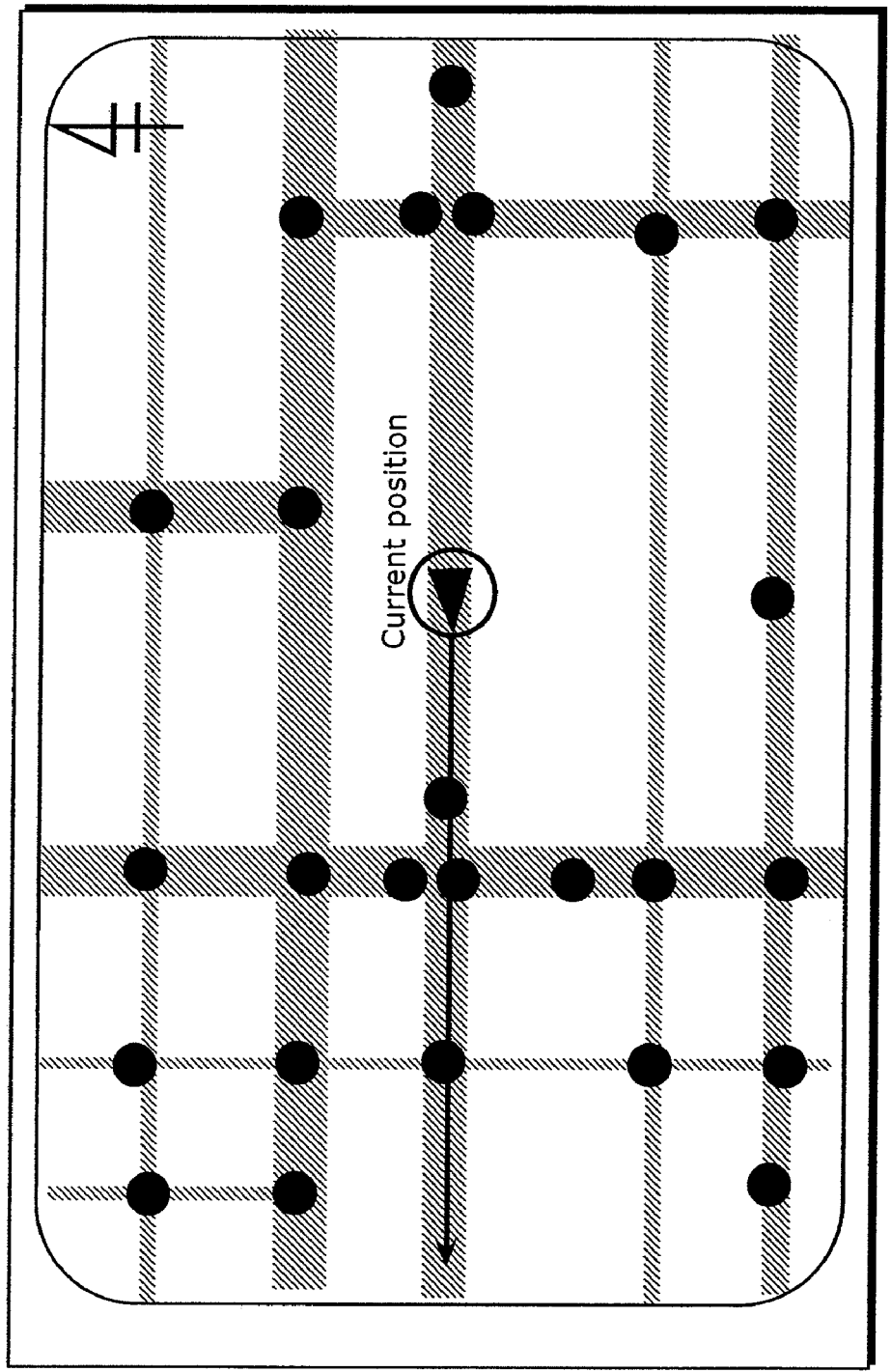
FIG. 24 shows an example of a road in the travel direction of the mobile object and event occurrence positions.
Figure 25:
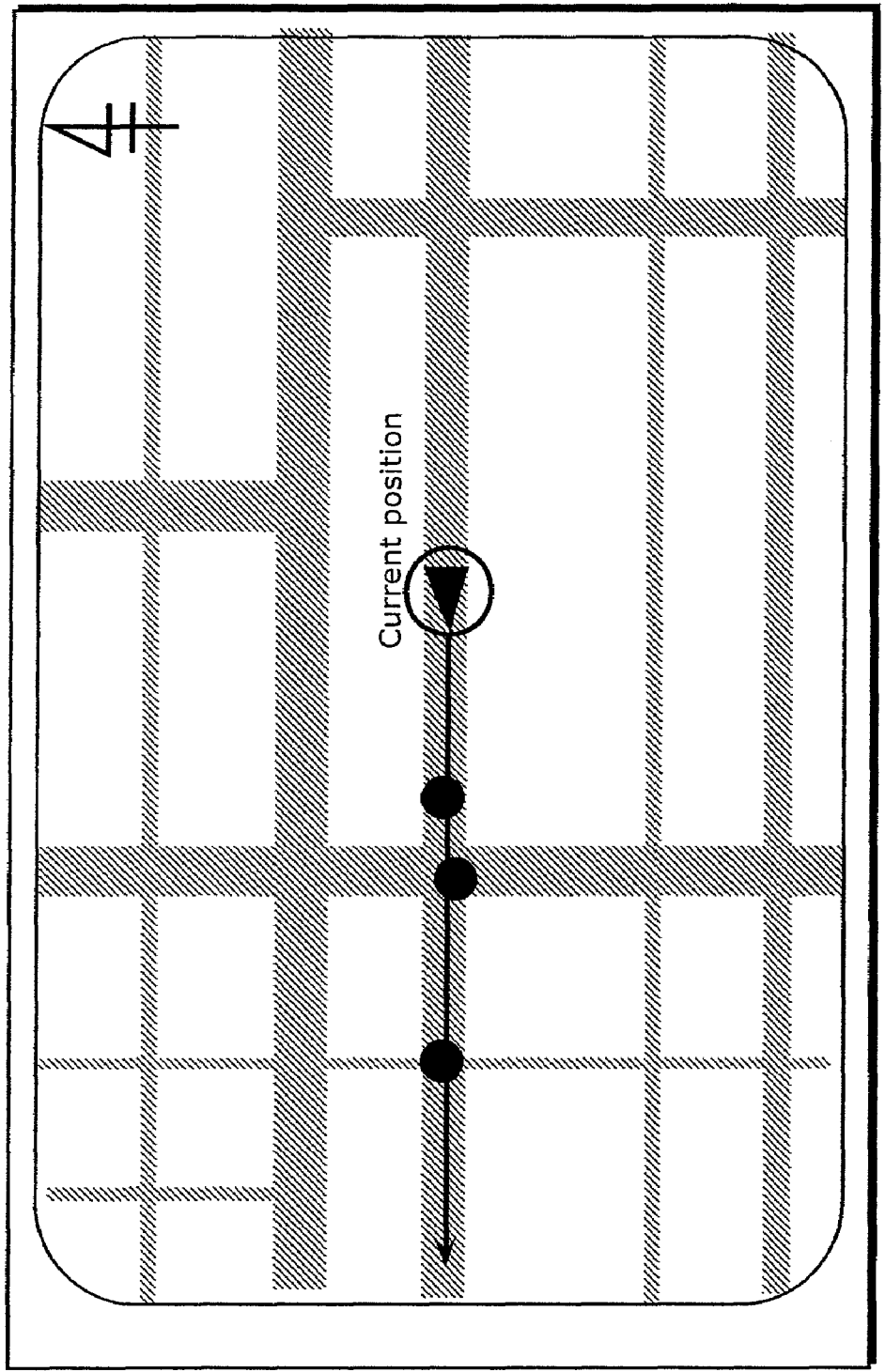
FIG. 25 shows an example of extracting an event occurrence position on a road in the travel direction of the mobile object.

The road position obtainment unit 1518 extracts, from among event occurrence positions stored in the event history storage unit 106, all event occurrence positions on the road obtained by the current road obtainment unit 1517. For example, when the event occurrence positions in the event history have a distribution shown in FIG. 24, the road position obtainment unit 1518 extracts only event occurrence positions on the road obtained by the current road obtainment unit 1517, as shown in FIG. 25.

Figure 26:
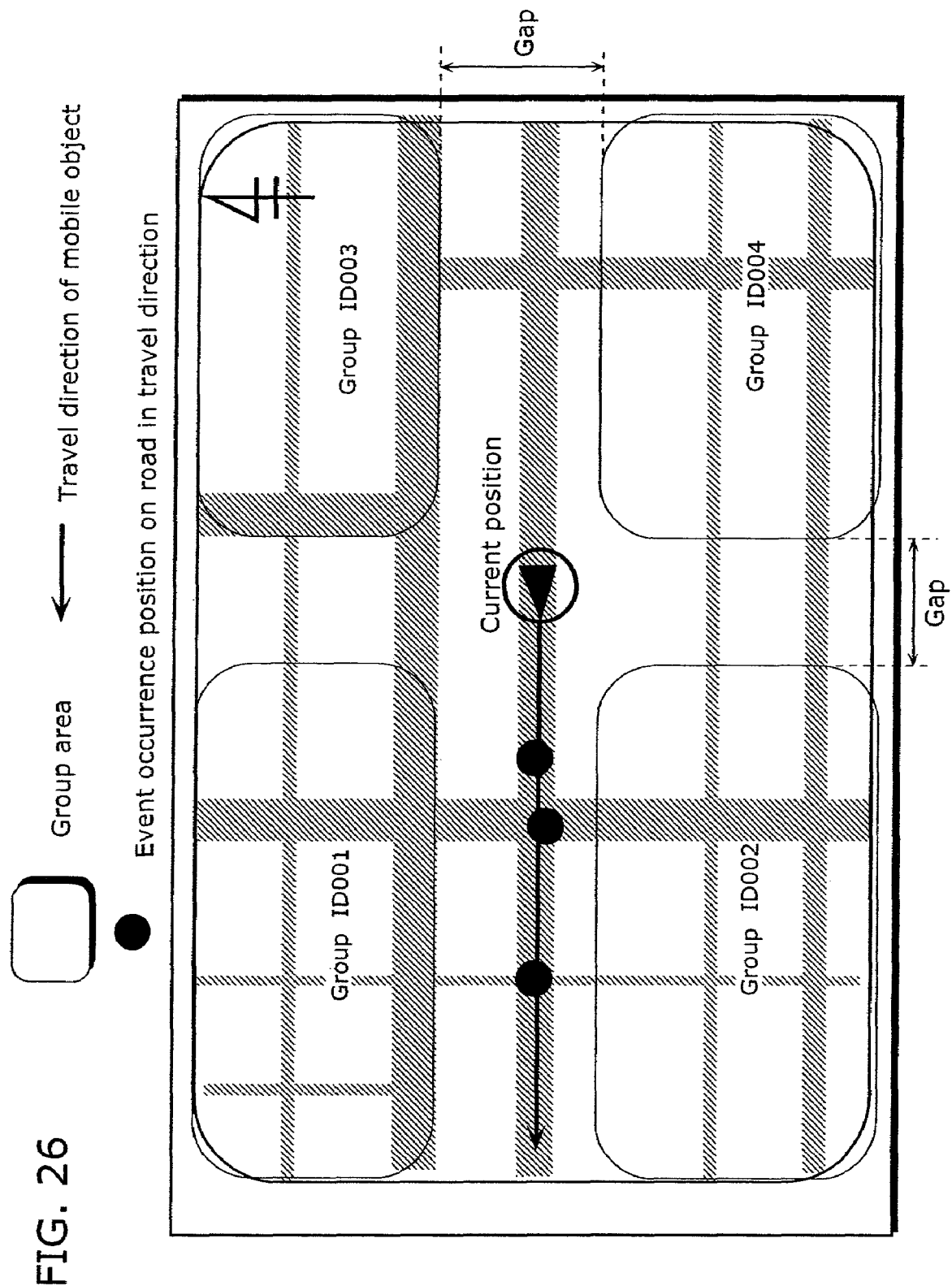
FIG. 26 shows an example where a group area generation unit generates group areas.

The group area generation unit 1519 generates group areas using the display screen area obtained by the screen area obtainment unit 109. For instance, the group area generation unit 1519 generates the group areas by dividing the map area represented by the display screen area in quarters by boundary lines passing through the center, as shown in FIG. 26. When doing so, at least a predetermined gap is provided between the group areas. That is, the group area generation unit 1519 generates the group areas by dividing a part of the map area except the gap, in quarters.

For example, a gap corresponding to a distance which requires at least a smallest unit of time of a displayed transit time to travel is provided so that different transit times are displayed. In the case when the smallest unit of time is 1 minute and the maximum speed of the car per hour is 60 km/h, a minimum distance of the gap is 1 km (=60/60).

Figure 27:
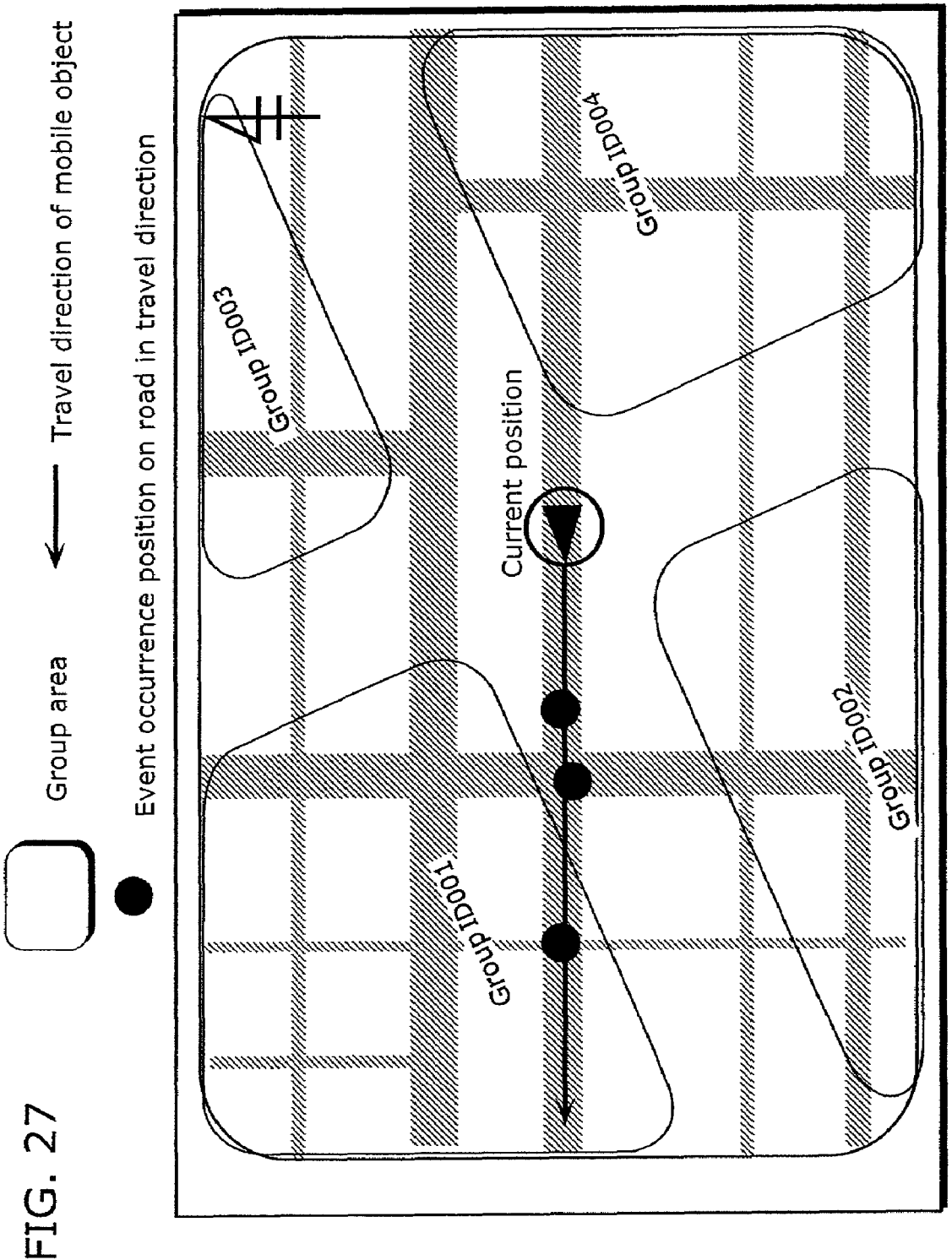
FIG. 27 shows an example where the group area generation unit generates group areas.
Figure 28:
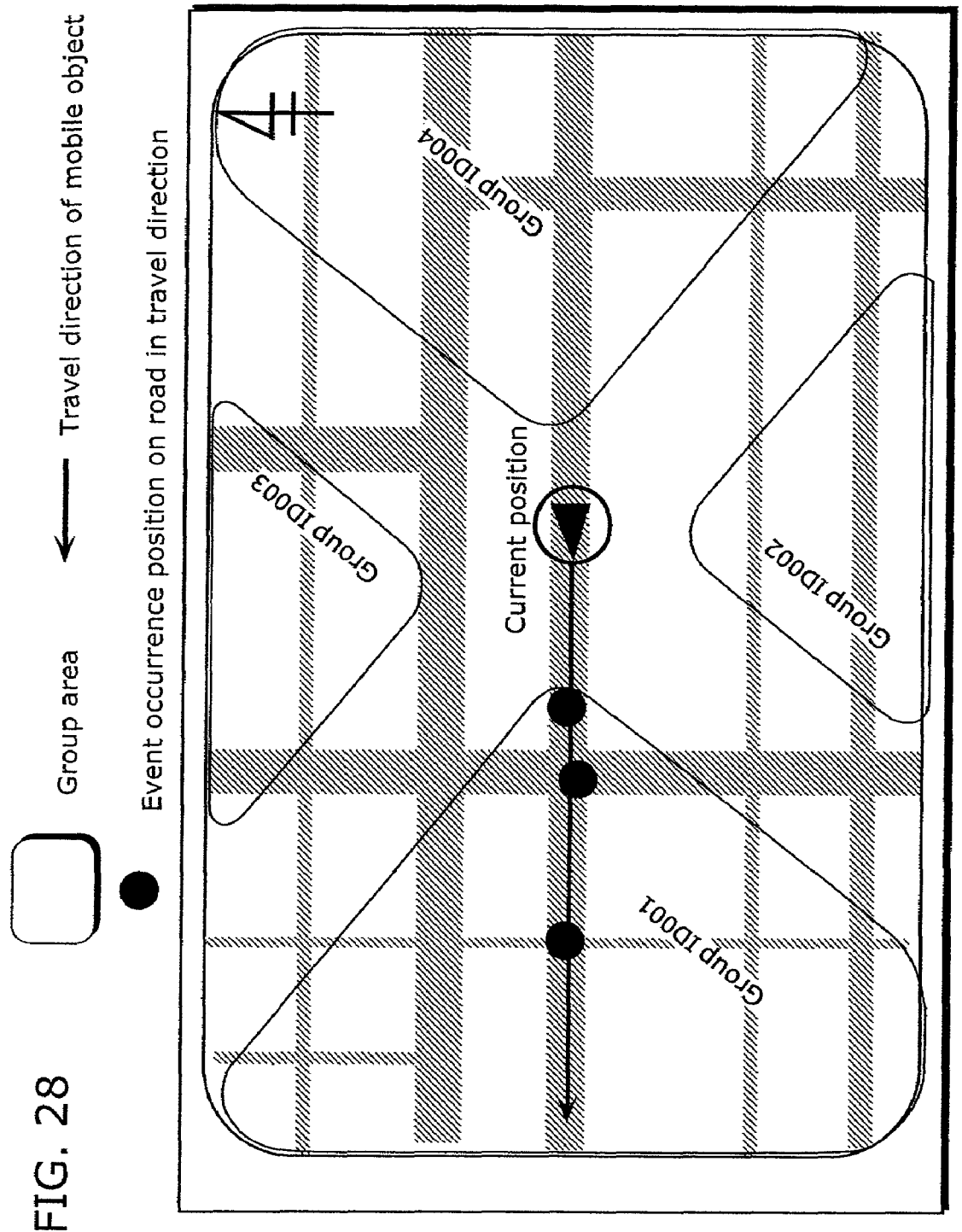
FIG. 28 shows an example where the group area generation unit generates group areas.

The group area generation unit 1519 rotates the boundary lines to generate different patterns of group areas as shown in FIGS. 27 and 28. Here, a predetermined number of boundary line variations are set beforehand. As one example, the group area generation unit 1519 divides the map area by each of eight boundary line variations which are obtained by rotating the boundary lines by 10 degrees, to generate a different pattern of group areas in each division operation.

The in-group position number obtainment unit 1520 calculates, for each group area pattern, a sum of event occurrence positions on the road in the travel direction which are included in any group area, using the event occurrence positions on the road in the travel direction obtained by the road position obtainment unit 1518 and the different group area patterns generated by the group area generation unit 1519. The calculated sum is 0 in the case of FIG. 26, 1 in the case of FIG. 27, and 3 in the case of FIG. 28.

The group determination unit 1521 determines one of the different group area patterns generated by the group area generation unit 1519, using the number of event occurrence positions obtained by the in-group position number obtainment unit 1520. The group determination unit 1521 groups event occurrence positions stored in the event history storage unit 106, according to the determined group area pattern.

In more detail, the group determination unit 1521 selects a group area pattern with a largest number of event occurrence positions obtained by the in-group position number obtainment unit 1520. Suppose the group area generation unit 1519 generates the three group area patterns of FIG. 26 (the number of event occurrence positions is 0), FIG. 27 (the number of event occurrence positions is 1), and FIG. 28 (the number of event occurrence positions is 3). In such a case, the group determination unit 1521 selects the group area pattern of FIG. 28 with the largest number of event occurrence positions, and uses the selected group area pattern for event occurrence position grouping.

Figure 29:
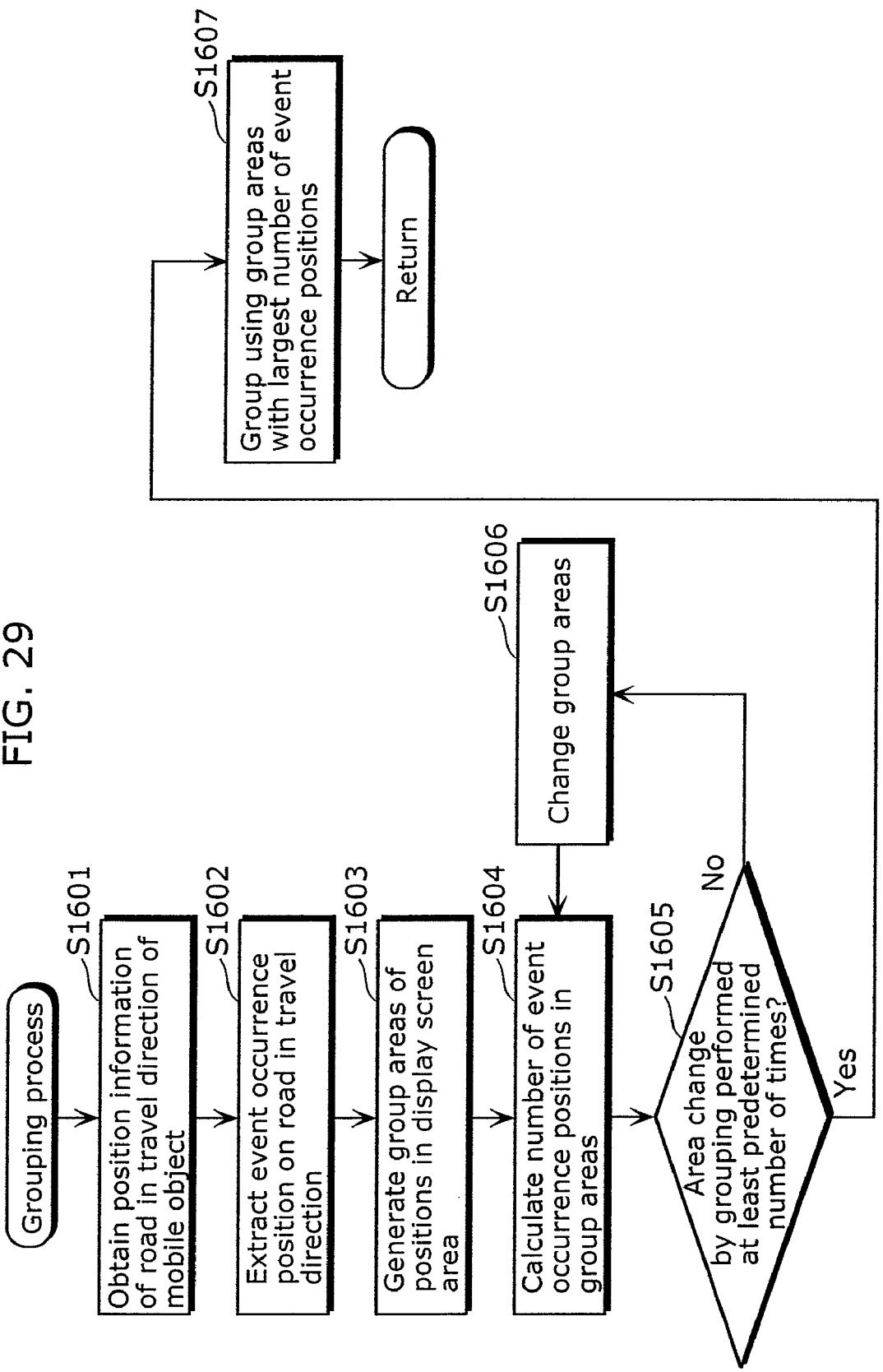
FIG. 29 is a flowchart showing an example of a grouping process executed by the map information display apparatus in variation 7 of the present invention.

A flowchart of this example is described below, with reference to FIG. 29. FIG. 29 is a flowchart showing an example of a grouping process executed by the map information display apparatus in variation 7 of the present invention. The flowchart of FIG. 29 relates to the process that is executed by the map information display apparatus of variation 7 instead of the grouping process (Step S1310) executed by the map information display apparatus of the above embodiment shown in FIG. 13. The other processes (Steps S1301 to S1309 and Steps S1311 to S1314) shown in FIG. 13 also apply to this variation, and so an explanation of these same processes has been omitted here.

After the impression value is calculated as in the above embodiment (Step S1309), the current road obtainment unit 1517 obtains position information of a road in a travel direction in the display screen area obtained by the screen area obtainment unit 109, using the travel history stored in the travel history storage unit 116 and the road information stored in the map information storage unit 104 (Step S1601). The road position obtainment unit 1518 extracts, from event occurrence positions stored in the event history storage unit 106, all event occurrence positions on the road in the travel direction, using the position information of the road in the travel direction obtained by the current road obtainment unit 1517 (Step S1602). The group area generation unit 1519 generates group areas using the display screen area obtained by the screen area obtainment unit 109 (Step S1603). The in-group position number obtainment unit 1520 calculates a sum of event occurrence positions, among the event occurrence positions obtained by the road position obtainment unit 1518, that are included in any group area generated by the group area generation unit 1519 (Step S1604). The group area generation unit 1519 judges whether or not a group area pattern change has been performed no less than a predetermined number of times (Step S1605). When judging that the group area pattern change has been performed no less than the predetermined number of times (S1605: Yes), the flow proceeds to Step S1607. When judging that the group area pattern change has not been performed no less than the predetermined number of times (S1605: No), the flow proceeds to Step S1606.

When judging that the group area pattern change has not been performed no less than the predetermined number of times (S1605: No), the group area generation unit 1519 performs the group area pattern change to generate new group areas, and then the flow returns to Step S1604 (Step S1606). When judging that the group area pattern change has been performed no less than the predetermined number of times (S1605: Yes), the group determination unit 1521 groups the event occurrence positions stored in the event history storage unit 106, using a group area pattern with a largest number of event occurrence positions calculated by the in-group position number obtainment unit 1520 from among group area patterns generated by the group area generation unit 1519 (Step S1607). Subsequently, the map information display apparatus of this variation executes the processes from the time display position determination process (Step S1311) onward, in the same manner as in the above embodiment.

Figure 30:
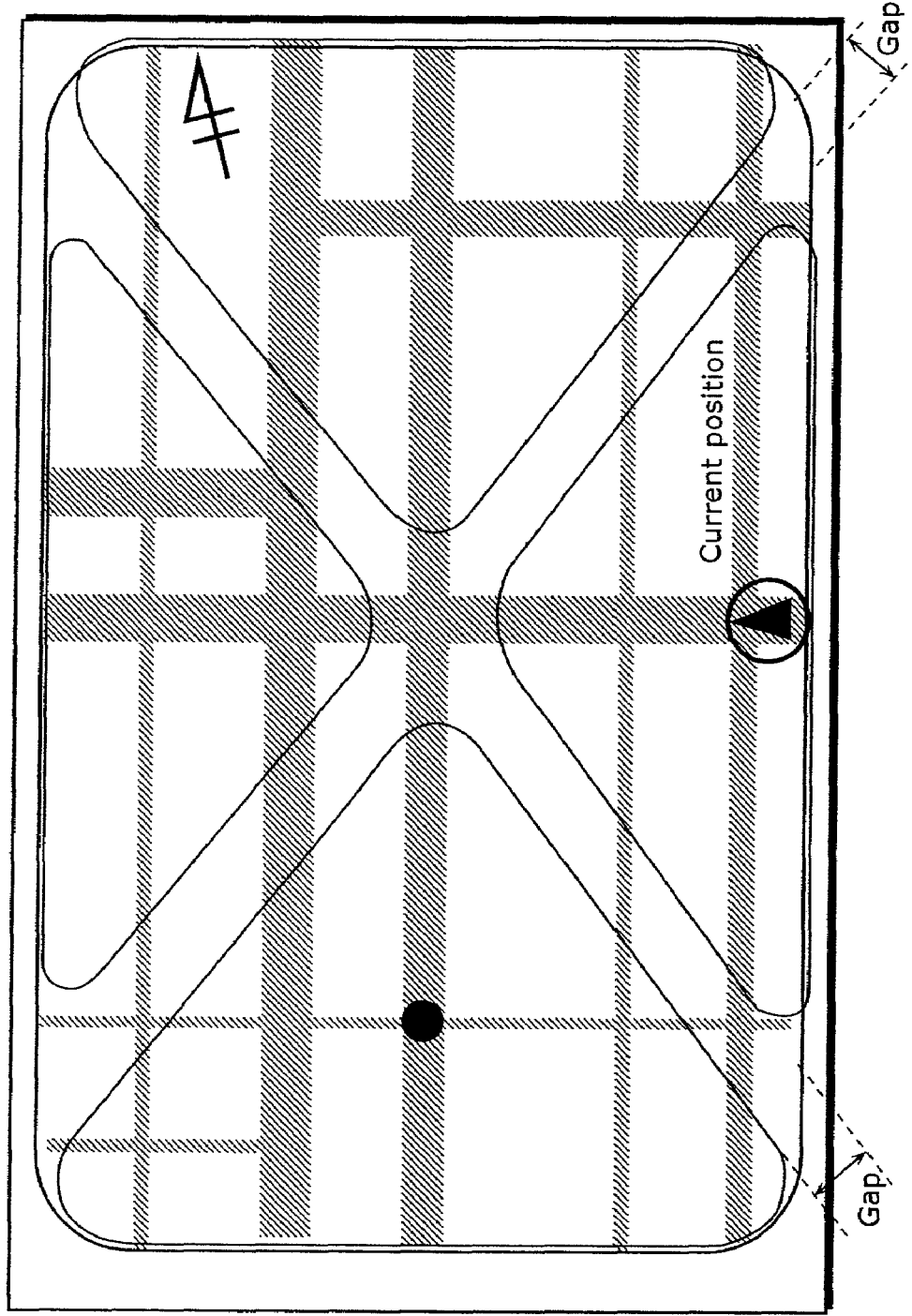
FIG. 30 shows an example of generating group areas in a heading-up mode.

Here, in the case where the map information display apparatus is a car navigation apparatus and the map display screen is in a heading-up mode, that is, in a state where the travel direction is always at the top of the map, there is no need to generate a plurality of group area patterns. In such a case, grouping is performed with the top part of the map being included in a group area, as shown in FIG. 30.

When providing a gap between group areas, there is a possibility that an event occurrence position is not included in any group area. Therefore, except in the case where a plurality of transit time display positions which are close to each other are determined as shown in FIG. 19, it is desirable to perform grouping with no gap. In view of this, this variation may be applied in the following manner. Distances between all transit time display positions are calculated in the above embodiment, and this variation is applied only when any of the distances is equal to or less than a predetermined value. This allows all event occurrence positions to be used as candidates for transit time display.

In the case where the number of transit time display position combinations whose distance is equal to or less than the predetermined value is small, too, it is desirable to perform grouping with no gap. In detail, distances between all transit time display positions are calculated in the above embodiment. When there is a combination of transit time display positions whose distance is equal to or less than the predetermined value, one of the two transit time display positions that has a lower impression value is excluded as the display position, and then grouping is performed again. This is repeated until there is no transit time display position combination whose distance is equal to or less than the predetermined value. As a result, the number of event occurrence positions not included in any group area can be further reduced.

When performing grouping with no gap, especially in the case where no transit time is displayed in the neighborhood of the boundary lines of the group areas, it is desirable to minimize a distance which the boundary lines of the group areas pass the travel direction part of the road on which the mobile object is currently located. In detail, after the current road obtainment unit 1517 obtains the travel direction part of the road on which the mobile object is currently located as in variation 7, the group area generation unit 1519 generates the group areas by using boundary lines that do not intersect at all with the travel direction part of the road or that intersect with the travel direction part of the road at an angle larger than a predetermined angle. This makes it possible to prevent a situation where the boundary lines overlap with a long section in the travel direction of the road and as a result a transit time of a point in that section cannot be displayed.

(Variation 8)

Figure 31:
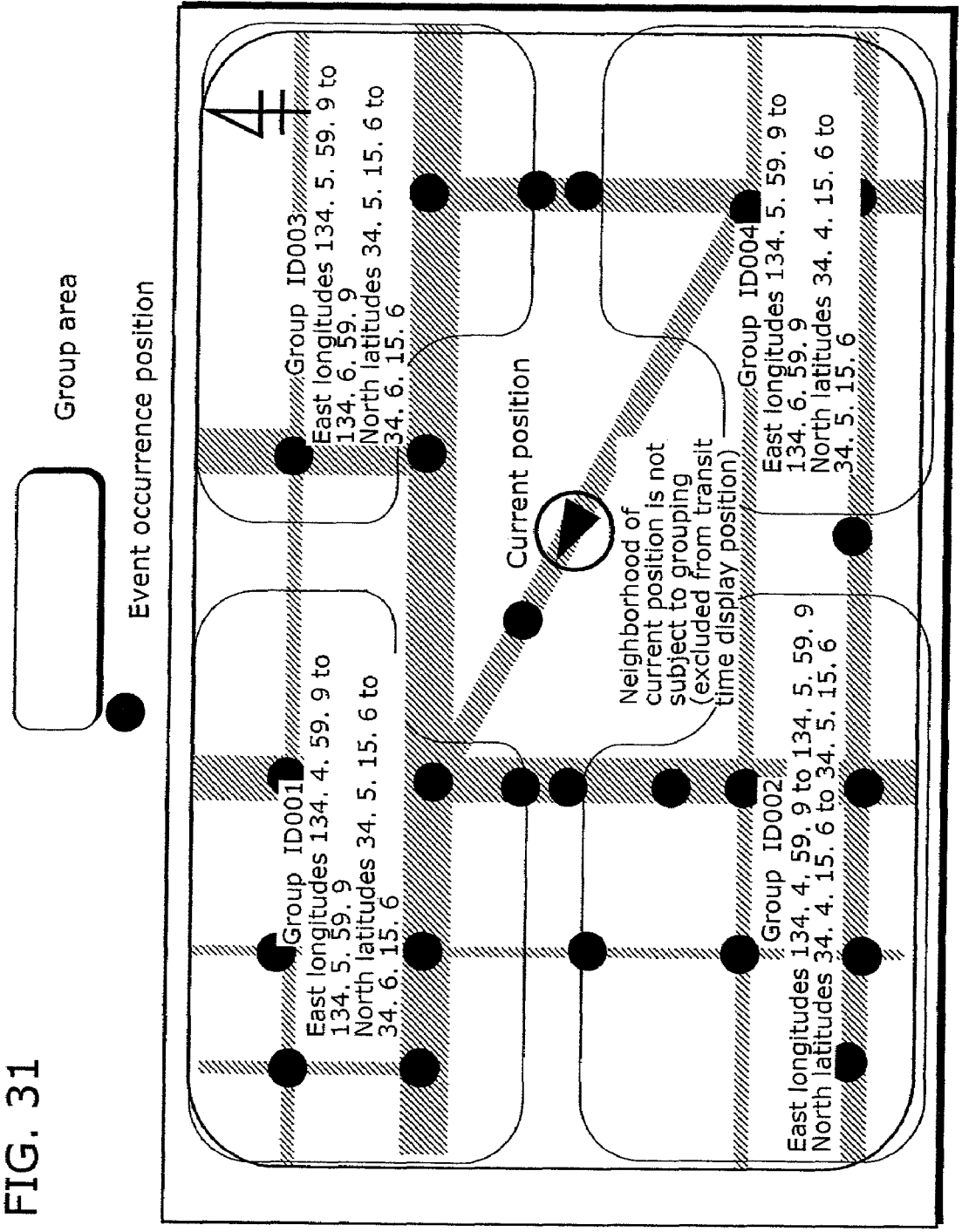
FIG. 31 shows an example of excluding a neighborhood of a current position from a grouping target, at the time of grouping.

The above embodiment describes the case where the grouping unit 111 generates the group areas by dividing the display screen area. However, there is a possibility that a transit time is displayed near the current position. Such display is useless, since the use can easily guess that a transit time of a neighborhood of the current position is little different from that of the current position. Accordingly, the display of a transit time around the current position may be avoided by excluding the neighborhood of the current position beforehand as not belonging to any group, as shown in FIG. 31.

(Variation 9)

Figure 32:
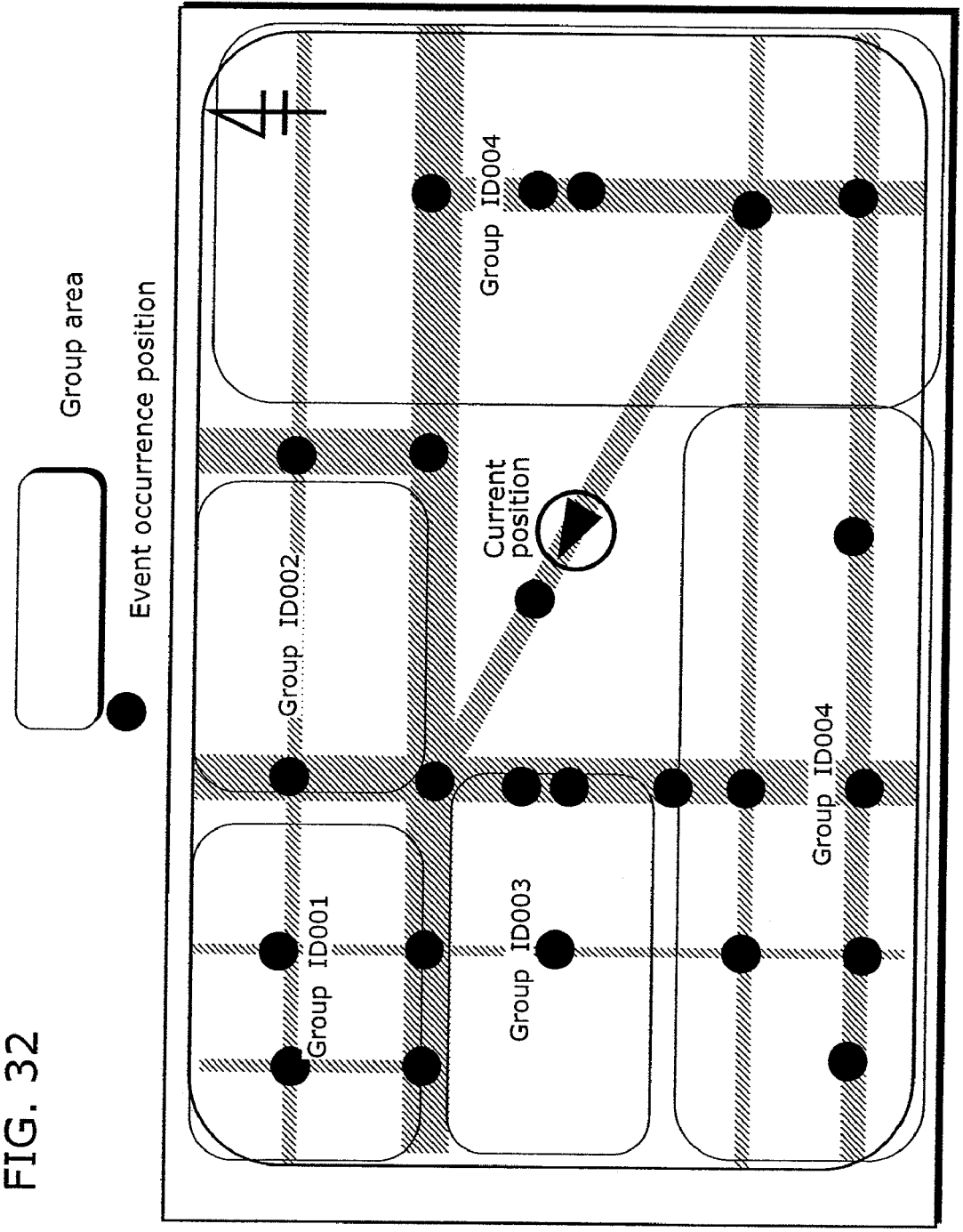
FIG. 32 shows an example of making a size of each group uneven at the time of grouping.

The above embodiment describes the case where the grouping unit 111 generates the group areas by evenly dividing the display screen area. However, a position for which the user wants to know a transit time is in an area for which the mobile object is heading. Accordingly, each group area may be generated so as to be uneven in size according to a possibility that the mobile object travels to the group area. As one example, a group area in the travel direction of the mobile object is decreased in size whereas a group area not in the travel direction of the mobile object is increased in size, as shown in FIG. 32. By doing so, more transit times can be displayed in the travel direction of the mobile object.

In this case, the number of transit time display positions in each group may be set to a predetermined number, such as one position with a highest impression value, regardless of the size of each group area. As a result, more transit times can be displayed in the travel direction of the mobile object than in an area where the mobile object is unlikely to travel to, while avoiding excessive concentration of transit time display positions.

In the case where the user has not determined the final destination yet, such as shortly after the start of the mobile object, there is a possibility that the mobile object eventually heads for an area other than in the travel direction. Therefore, it is necessary to assign such a number of transit time display positions that enables transit times to be displayed evenly on the screen, while reliably displaying transit times in the travel direction of the mobile object.

In such a case, the number of transit time display positions in each group may be changed according to the size of the group area. For example, the number of transit time display positions in each group may be changed so that the number of transit time display positions is larger when the group area has a larger size. Specific methods include a method of setting the number of transit time display positions in a smallest group area to 1 beforehand, and increasing the number of transit time display positions of each of the other group areas in proportion to the size of the group area, and a method of determining the number of transit time display positions in the whole screen beforehand and dividing the number in proportion to the size of each group area. In these cases, a fraction in the number of transit time display positions may be removed by rounding off or the like.

(Variation 10)

The above embodiment describes the case where the grouping unit 111 generates the group areas by dividing the display screen area, and the display position determination unit 113 determines a transit time display position by selecting an event occurrence position having a highest impression value in each group area.

However, what needs to be achieved is to scatter transit time display positions. To scatter transit time display positions means to separate the transit time display positions from each other as much as possible.

The method of setting the group areas has advantages of requiring only a small computation amount and efficiently selecting transit time display positions even when there are many positions for displaying transit times. However, this method has a limit in increasing the distance between transit time display positions. Especially when the number of transit time display positions to be selected in the screen is small, it is desirable to select such transit time display positions that are more distant from each other.

In view of this, instead of setting the group areas, the display position determination unit 113 may select such a combination of transit time display positions that have a largest distance therebetween. In detail, transit time display position candidates whose impression values are equal to or higher than a threshold are selected, and all combinations of a predetermined number of transit time display position candidates are obtained, where the number of transit time display positions is fixed to the predetermined number. For each combination, a minimum distance between transit time display position candidates is calculated, and a combination of transit time display position candidates having a largest minimum distance are determined as transit time display positions. In this way, transit times can be displayed in a more scattered manner.

A method of this variation is described below.

Figure 33:
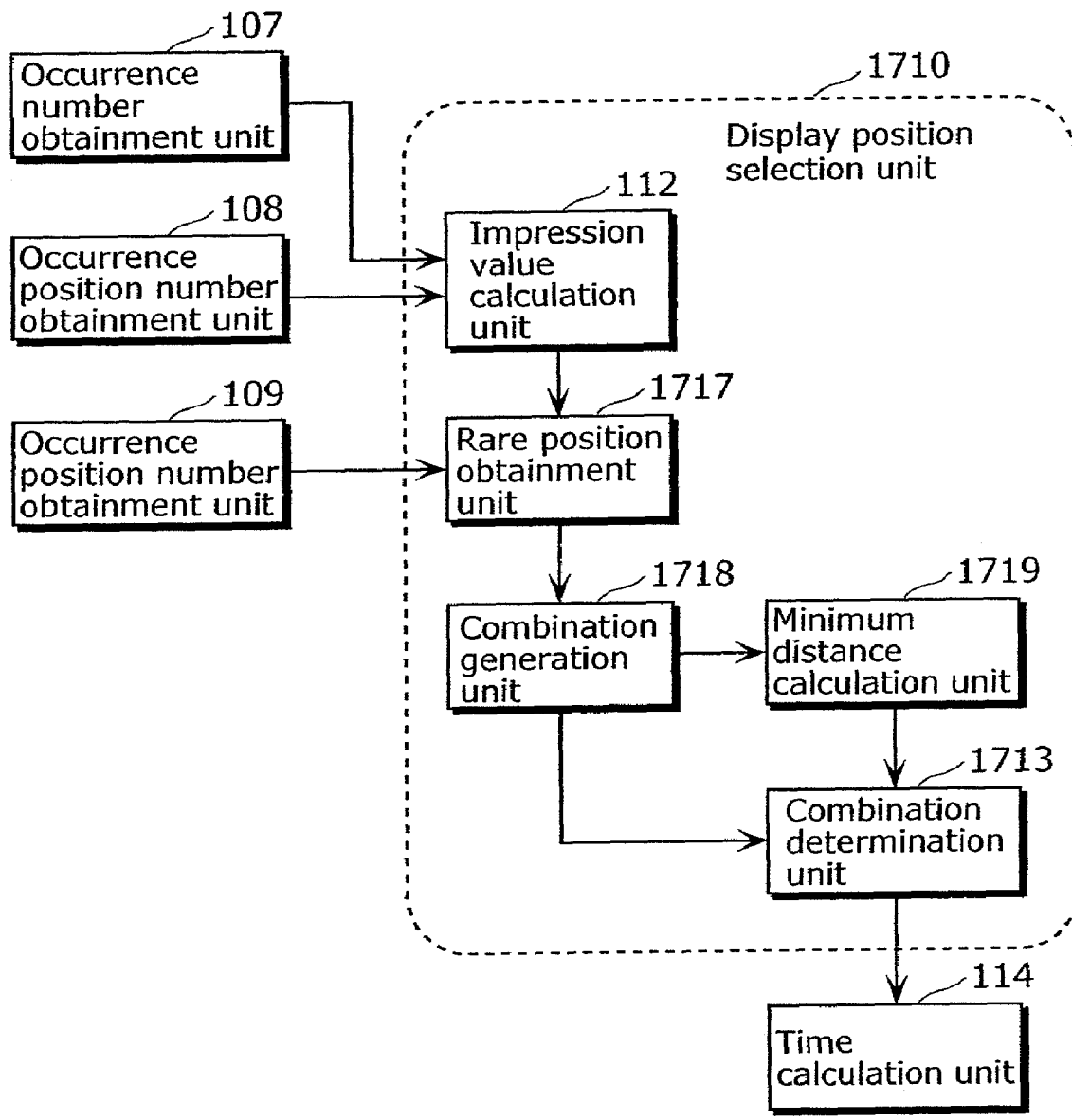
FIG. 33 is a block diagram showing a structure of a display position selection unit in variation 10 of the present invention.

FIG. 33 shows a structure of a display position selection unit 1710 in a map information display apparatus of this variation. A structure of the map information display apparatus other than the display position selection unit 1710 is the same as that of the above embodiment, and so an explanation of the components of the map information display apparatus other than the display position selection unit 1710 has been omitted here. The following first describes each component with reference to drawings, and then describes an operation of the map information display apparatus.

The display position selection unit 1710 in this variation includes the impression value calculation unit 112, a rare position obtainment unit 1717, a combination generation unit 1718, a minimum distance calculation unit 1719, and a combination determination unit 1713.

The impression value calculation unit 112 is the same as the impression value calculation unit 112 in the above embodiment, and so its explanation has been omitted here.

The rare position obtainment unit 1717 extracts event occurrence positions having high impression values, from event occurrence positions for which the impression value calculation unit 112 calculates impression values and which are included in the display screen area obtained by the screen area obtainment unit 109. In detail, the rare position obtainment unit 1717 extracts a predetermined number of event occurrence positions in decreasing order of impression value, from the event occurrence positions included in the display screen area. For example, when the impression values of the event occurrence positions are calculated as shown in FIG. 34(*a*) and the display position area is calculated as shown in FIG. 34(*b*), there are 9 event occurrence positions which are included in the display screen area. Of these event occurrence positions, a predetermined number of event occurrence positions, such as 6 event occurrence positions as shown in FIG. 34(*c*), are extracted in decreasing order of impression value.

This rare position obtainment unit 1717 is one example of a rare point extraction unit that counts, for each type of event, the number of event occurrence points at which the type of event occurred using event history information, and extracts each point at which a type of event whose number of event occurrence points is equal to or larger than a predetermined threshold occurred.

Figure 35:
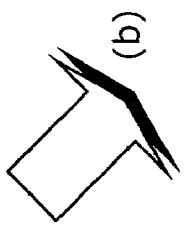
FIGS. 35(a), 35(b), and 35(c) show an example where a combination generation unit generates a combination of high impression positions.

The combination generation unit 1718 generates all combinations of a predetermined number of positions, from among all high impression positions extracted by the rare position obtainment unit 1717. Suppose 6 high impression positions are extracted as shown in FIG. 35(*a*). In the case of displaying only a predetermined number (4) of transit times, the combination generation unit 1718 generates 15 (6C4) combinations of high impression positions. FIGS. 35(*b*) and 35(*c*) are two specific examples out of the 15 combinations.

Figure 36:
FIGS. 36(a) and 36(b) show an example where a minimum distance calculation unit calculates a minimum distance.

The minimum distance calculation unit 1719 calculates, for each high impression position combination generated by the combination generation unit 1718, a minimum distance between high impression positions. For instance, in the case of a combination of high impression positions shown in FIG. 36(a), all distances between any two high impression positions in the combination are calculated. As one example, a distance between high impression position A of east longitude "134. 6. 10. 9" and north latitude "34. 4. 30. 0" and high impression position B of east longitude "134. 5. 0. 9" and north latitude "34. 4. 30. 0" in FIG. 36(a) is calculated as follows. Since 1 km corresponds to 45 seconds longitude and 30 seconds latitude, the distance is "1.56 km", according to expression (5).

[Expression 5]

$$\binom{\text{Distance between}}{\text{position } A \text{ and position } B} = \sqrt{\left(\frac{134.10.9 - 134.5.0.9}{45}\right)^2 - \left(\frac{34.4.30.0 - 34.4.3.30.0}{30}\right)^2}. \quad (5)$$

The other distances between high impression positions are calculated in the same manner, to thereby calculate a minimum distance as shown in FIG. 36(b). In FIG. 36(b), the minimum distance is "0.665 km".

The combination determination unit 1713 determines all high impression positions included in a combination whose minimum distance calculated by the minimum distance calculation unit 1719 is smallest of the high impression combinations generated by the combination generation unit 1718, as transit time display positions.

Figure 37:
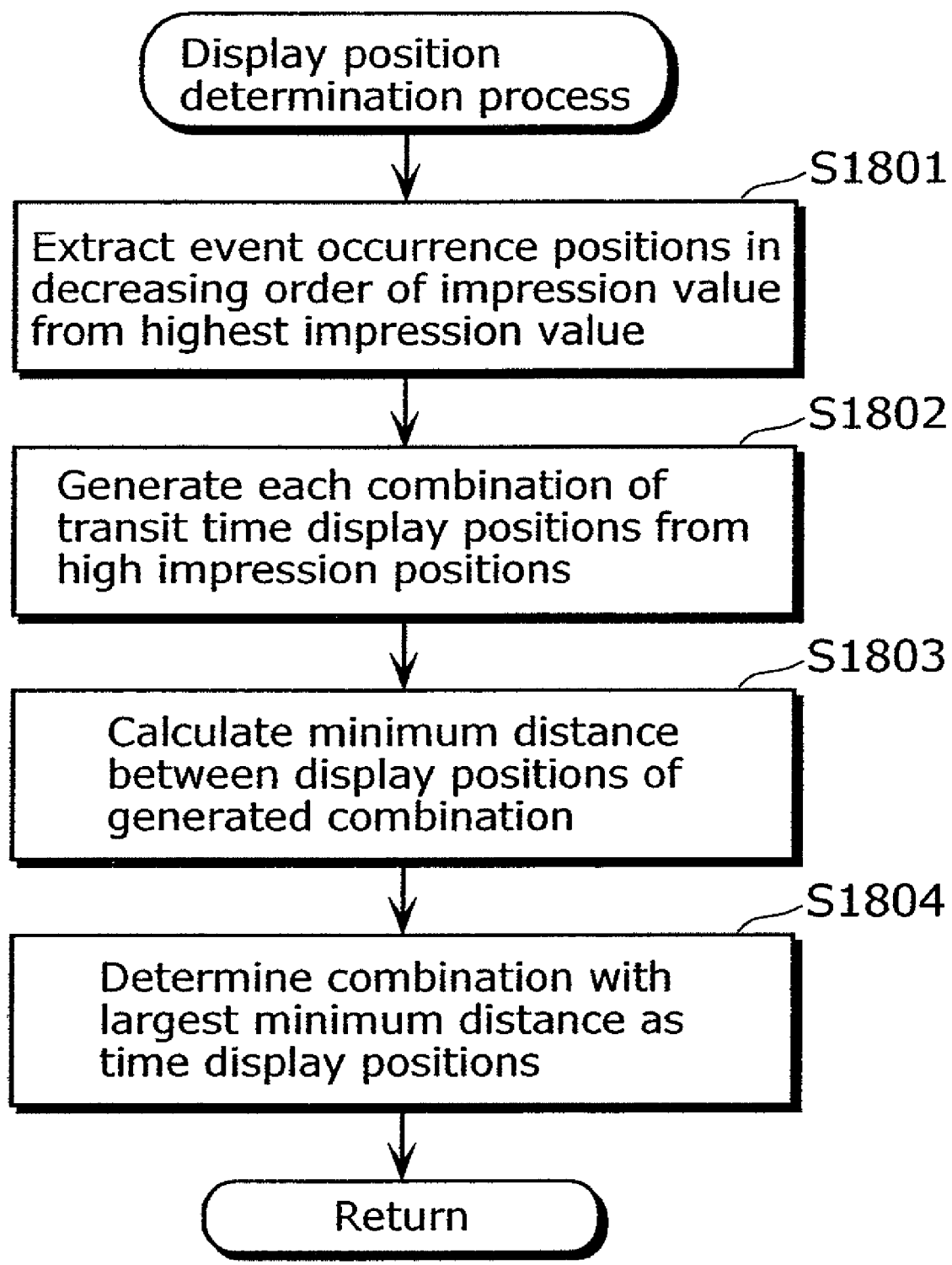
FIG. 37 is a flowchart showing an example of a time display position determination process executed by the map information display apparatus in variation 10 of the present invention.

A flowchart of this example is described below, with reference to FIG. 37. FIG. 37 is a flowchart showing an example of a time display position determination process executed by the map information display apparatus in variation 10 of the present invention. The flowchart of FIG. 37 relates to the process executed by the map information display apparatus of this variation instead of the grouping process (Step S1310) and the display position determination process (Step S1311) executed by the map information display apparatus of the above embodiment shown in FIG. 13. The other processes (Steps S1301 to S1309 and Steps S1312 to S1314) shown in FIG. 13 also apply to this variation, and so an explanation of these same processes has been omitted here.

After the impression value is calculated as in the above embodiment (Step S1309), the rare position obtainment unit 1717 extracts a predetermined number of event occurrence positions in decreasing order of impression value, from event occurrence positions whose impression values are calculated by the impression value calculation unit 112 and which are included in the display screen area obtained by the screen area obtainment unit 109 (Step S1801).

The combination generation unit 1718 generates all combinations of a predetermined number of high impression positions, using all high impression positions extracted by the rare position obtainment unit 1717 (Step S1802).

The minimum distance calculation unit 1719 calculates a minimum distance between high impression positions, for each high impression position combination generated by the combination generation unit 1718 (Step S1803).

The combination determination unit 1713 determines all high impression positions included in a combination whose minimum distance calculated by the minimum distance calculation unit 1719 is largest of the high impression position combinations generated by the combination generation unit 1718, as transit time display positions (Step S1804). Subsequently, the map information display apparatus of this variation executes the processes from the transit time calculation process (Step S1312) onward, in the same manner as in the above embodiment.

(Variation 11)

Figure 39:
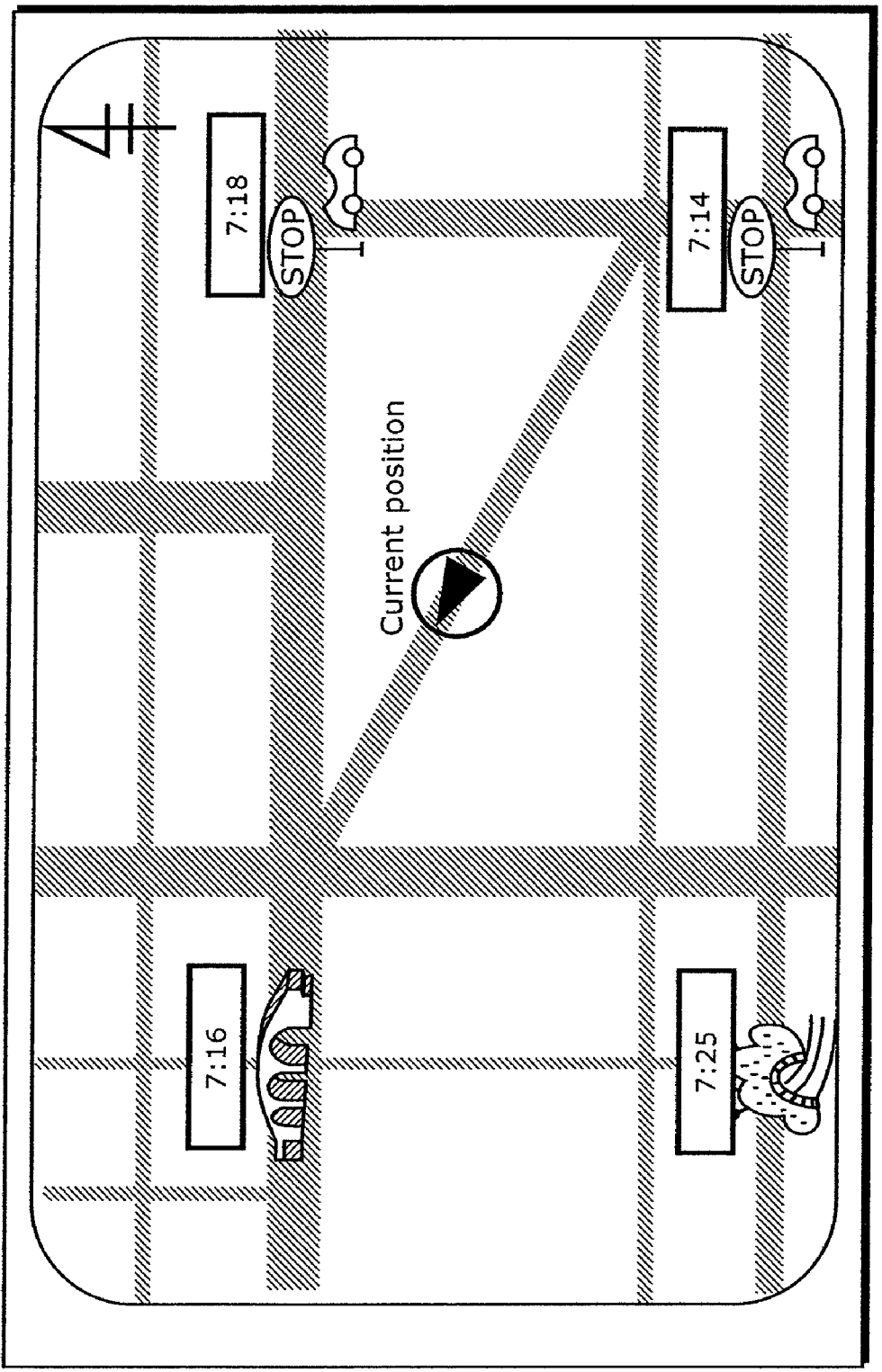
FIG. 39 shows an example of displaying a transit time together with an icon.

The above embodiment describes the case where the transit time is displayed at the transit time display position on the map. However, merely displaying the transit time may not be enough for the user to promptly recognize the correspondence between transit time display position and an actual position, even when the user has a strong impression of the position. In view of this, the transit time may be displayed together with an icon of an event type having a highest impression value in the transit time display position. This enables the user to recognize the transit time display position more quickly. In detail, the rule storage unit 103 stores image data of an icon together with an event type, a detection method, and an event occurrence position, as an event rule as shown in FIG. 38. As one example, the rule storage unit 103 stores image data of an icon representing parking such as the one shown in FIG. 38, for a "parking" event. The map display unit displays, at a transit time display position, a transit time and an icon of an event type which contributes most to an impression value of the transit time display position, as shown in FIG. 39.

(Variation 12)

Variation 11 describes the case where the transit time is displayed at the transit time display position together with the icon. In this case, however, there is a possibility that a same icon is displayed at a plurality of positions on the display screen, as shown in FIG. 39. When this occurs, the user may confuse the positions for which the same icon is displayed, and fail to quickly recognize the correspondence with an actual position. To avoid this, only an event occurrence position of an event whose number of event occurrence positions is 1 in the display screen area may be determined as a transit time display position. In this way, each event type in the display screen area can be limited to a different one of transit time display positions. Hence the user can be kept from confusing a transit time display position with another position of the same type of event.

A method of this variation is described below.

Figure 40:
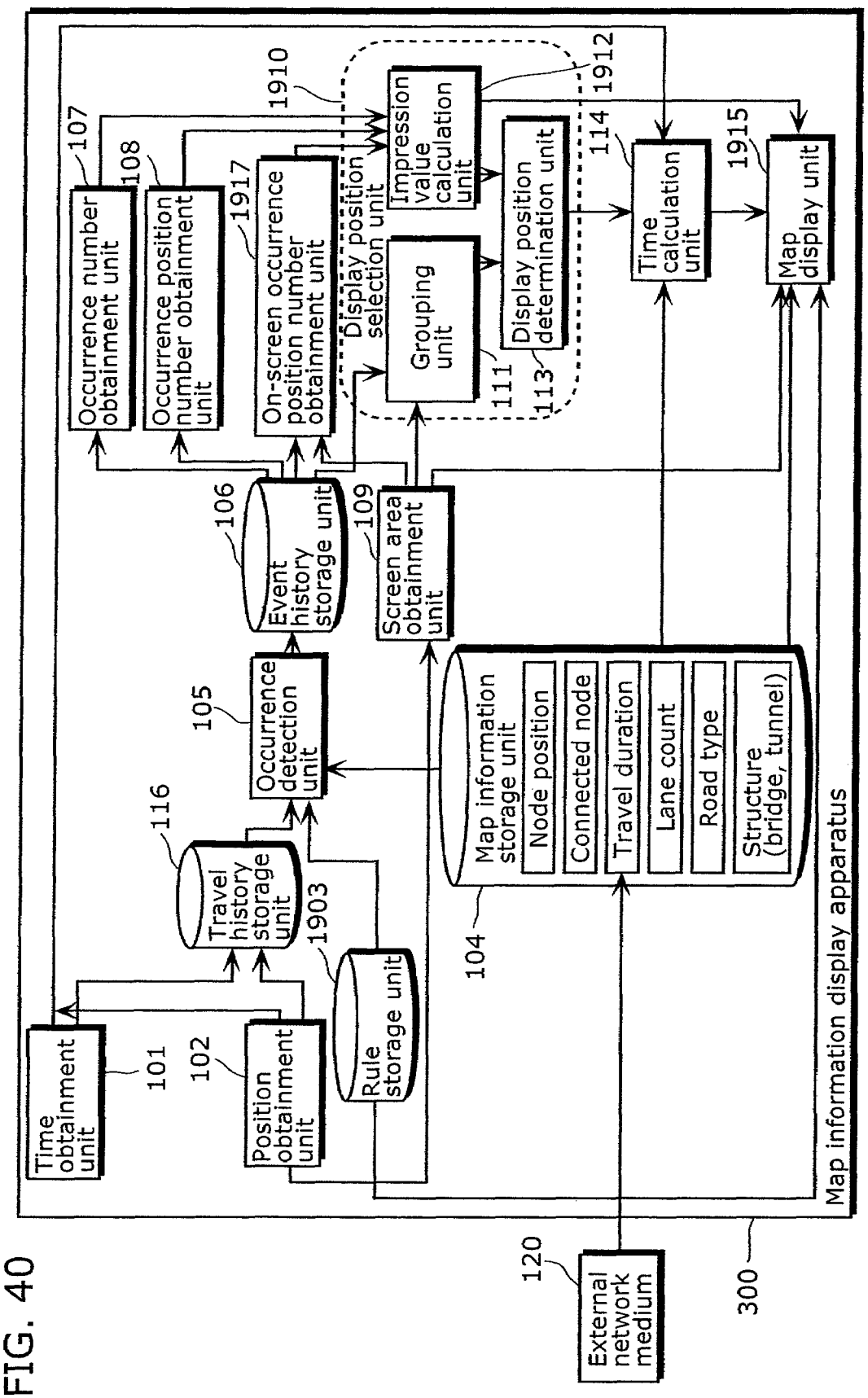
FIG. 40 is a block diagram showing a structure of a map information display apparatus in variation 12 of the present invention.

FIG. 40 is a block diagram showing a structure of a map information display apparatus in variation 12 of the present invention. Components which have the same functions as those in the above embodiment have been given the same reference numerals, and their explanation has been omitted here. The following first describes each component with reference to drawings, and then describes an operation of the map information display apparatus.

A map information display apparatus 300 shown in FIG. 40 includes the time obtainment unit 101, the position obtainment unit 102, the travel history storage unit 116, the map information storage unit 104, the occurrence detection unit 105, the event history storage unit 106, the occurrence number obtainment unit 107, the occurrence position number obtainment unit 108, the screen area obtainment unit 109, the grouping unit 111, the display position determination unit 113, the time calculation unit 114, a rule storage unit 1903, a display position selection unit 1910, an impression value calculation unit 1912, an on-screen occurrence position number obtainment unit 1917, and a map display unit 1915.

The rule storage unit 1903 stores an icon together with an event type and a detection method, as an event rule.

The rule storage unit 1903 stores an event rule for detecting an occurrence of an event and a type of the event from the travel history stored in the travel history storage unit 116 and the map information stored in the map information storage unit 104, and an icon corresponding to each type of event.

The on-screen occurrence position number obtainment unit 1917 obtains the number of event occurrence positions of each type of event in the display screen area obtained by the screen area obtainment unit 109, from the event history stored in the event history storage unit 106. For example, when the event history is stored and the display screen area is obtained as shown in FIG. 41, the number of event occurrence positions of a "right turn/left turn" event is calculated as follows. Only a record of an ID "007" in the event history shows an occurrence of the "right turn/left turn" event in the display screen area, which means the number of positions where the "right turn/left turn" event occurred is 1. Accordingly, the number of event occurrence positions is 1.

The impression value calculation unit 1912 calculates an impression value of each event occurrence position obtained by the occurrence number obtainment unit 107. The impression value calculation unit 1912 also outputs an event type that contributes most to the calculated impression value, as an icon display event. The impression value is calculated from the number of event occurrences obtained by the occurrence number obtainment unit 107, the number of event occurrence positions obtained by the occurrence position number obtainment unit 108, and the number of event occurrence positions on the display screen obtained by the on-screen occurrence position number obtainment unit 1917.

In detail, an impression value of a position is a sum of impression values of all types of events occurring at the position. An impression value of an event at a position is calculated from the number of event occurrences of the event at the position and the number of event occurrence positions of the event. An impression value relating to a position is increased when the number of event occurrences of an event at the position is larger, because the event has high repetitiveness. Moreover, an impression value relating to a position is increased when the number of event occurrence positions of an event is smaller, because the event has high rarity. Furthermore, an impression value of an event is set to 0 when the number of event occurrence positions on the display screen is larger than 1, because the same type of event exists at another position on the display screen. For example, an impression value relating to a position is shown by the following expression.

[Expression 6]

$$\begin{pmatrix} \text{Impression} \\ \text{value} \\ \text{of position } x \end{pmatrix} = \sum_{\substack{\text{type } e(\text{number of} \\ \text{event occurrence} \\ \text{positions of} \\ \text{type } e \text{ on display} \\ \text{screen}=1)}} \frac{\begin{pmatrix} \text{number of} \\ \text{event occurrences} \\ \text{of type } e \text{ at position } x \end{pmatrix}}{\begin{pmatrix} \text{number of event} \\ \text{occurrence positions of type } e \end{pmatrix}} \quad (6)$$

For example, when the number of event occurrences is calculated for each event occurrence position as shown in FIG. 42(*a*) and the number of on-screen event occurrence positions and the number of event occurrence positions are calculated as shown in FIG. 42(*b*), an impression value of a position of east longitude "134. 3. 0. 9" and north latitude "34. 6. 3. 6" is calculated as follows. Types of events occurring at east longitude "134. 3. 0. 9" and north latitude "34. 6. 3. 6" are "stop" and "right turn/left turn". Accordingly, "(number of event occurrences)/(number of event occurrence positions)" is calculated for each of these events and the calculation results are added together. However, since the number of on-screen event occurrence positions of the "stop" event is "2", an impression value of the "stop" event is set to 0. The number of event occurrence positions of the "right turn/left turn" event is "2" and the number of event occurrences of the "right turn/left turn" event is "1", so that the impression value of the position is (1/2=) "0.5", as shown in FIG. 42(*c*). Here, the type of event that contributes most to the calculation of the impression value is "right turn/left turn", so that the "right turn/left turn" event is determined as an icon display event.

Figure 43:
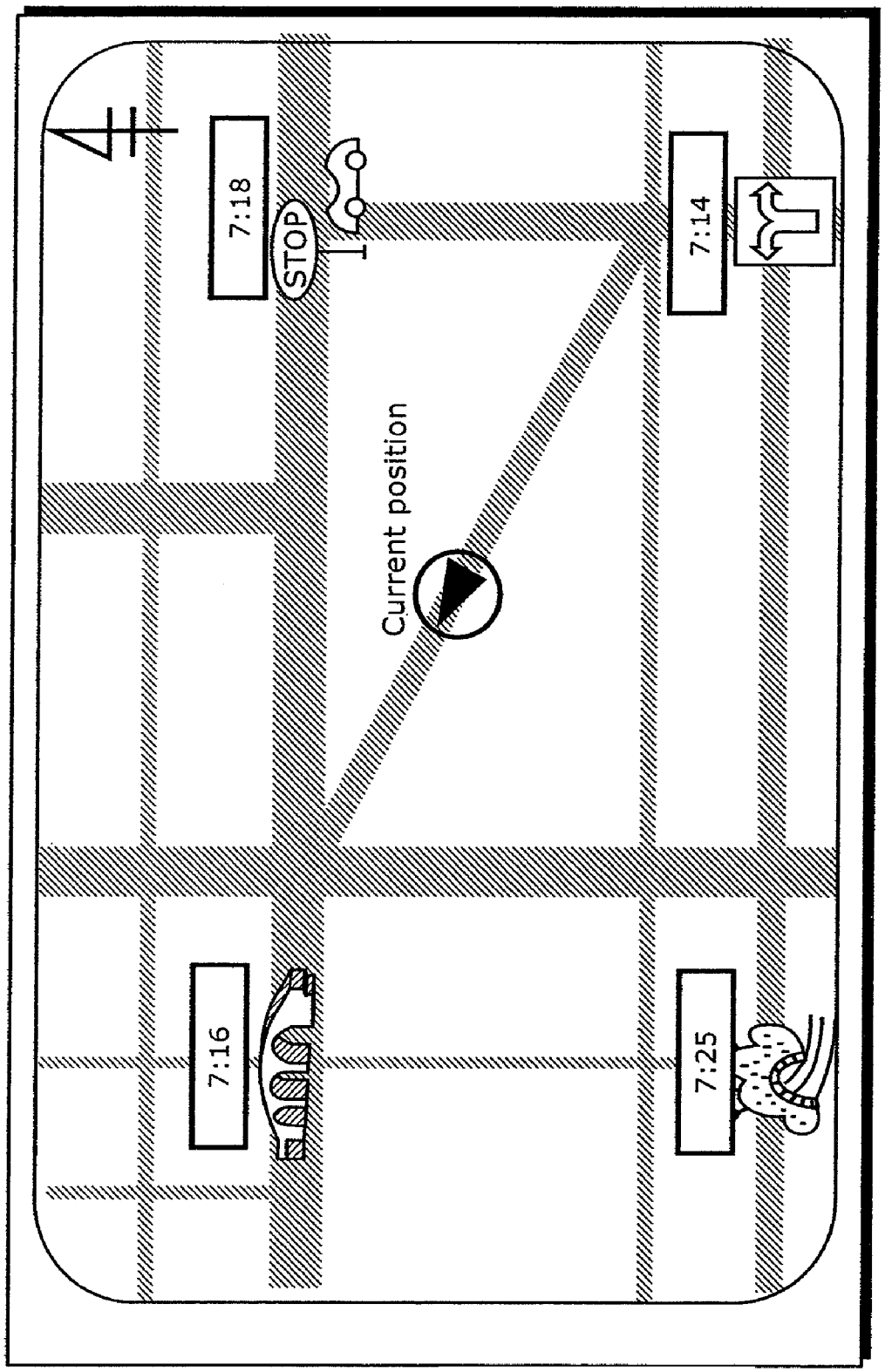
FIG. 43 shows an example of displaying a transit time together with one kind of icon on a display screen.

The map display unit 1915 displays the map information stored in the map information storage unit 104, for the screen area obtained by the screen area obtainment unit 109. When doing so, the map display unit 1915 also displays, on the map, a transit time calculated by the time calculation unit 114 at a position corresponding to a transit time display position determined by the display position determination unit 113, together with an icon stored in the rule storage unit 1903 corresponding to the icon display event determined by the impression value calculation unit 1912. As one example, the transit time and the icon of the transit time display position are displayed on the map as shown in FIG. 43.

Figure 44:
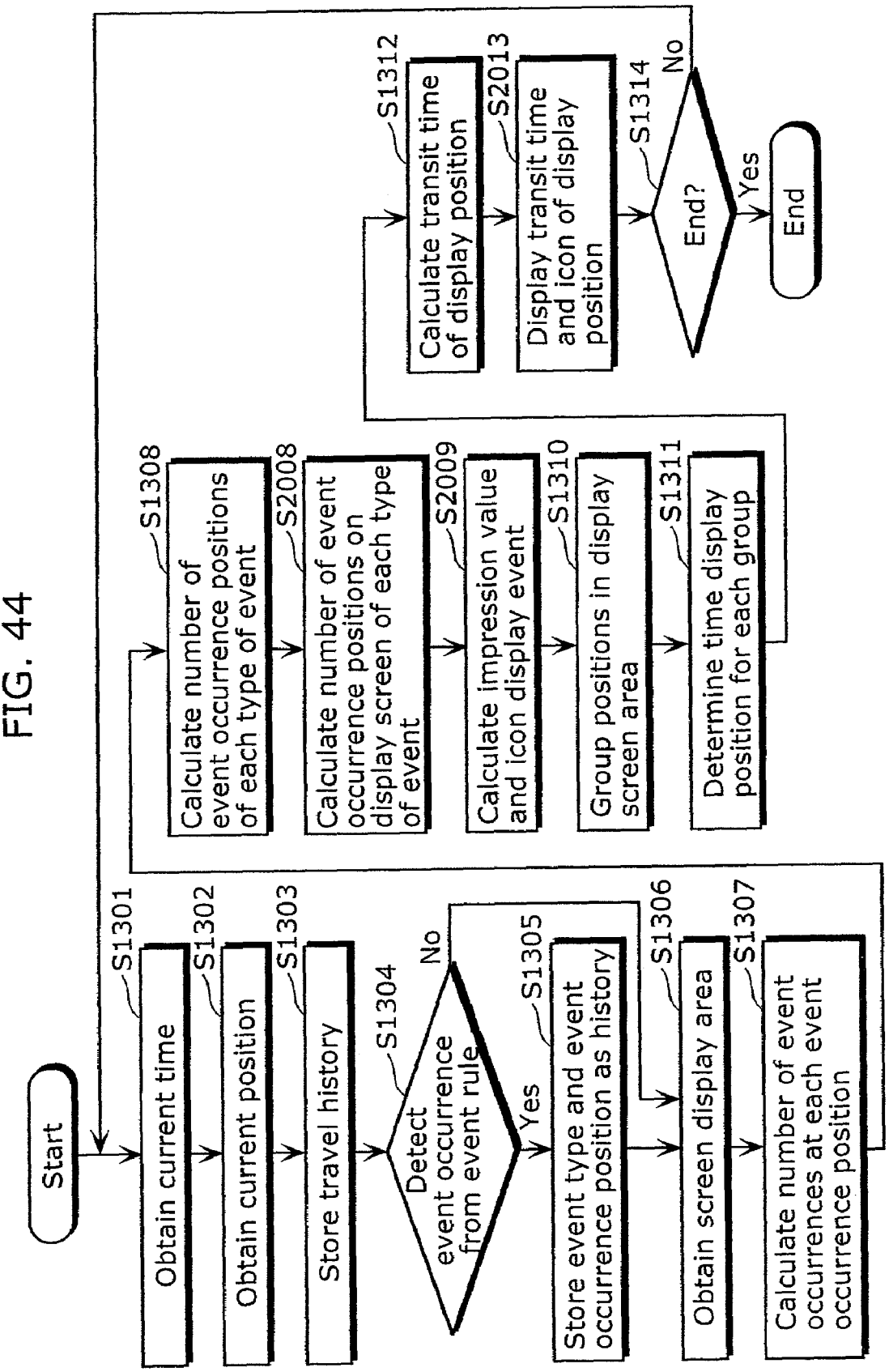
FIG. 44 is a flowchart showing an example operation of the map information display apparatus in variation 12 of the present invention.

A flowchart of variation 12 is described below, with reference to FIG. 44. FIG. 44 is a flowchart showing an example operation of the map information display apparatus 300 in variation 12 of the present invention. In FIG. 44, processes which are the same as those executed by the map information display apparatus of the above embodiment shown in FIG. 13 have been given the same reference numerals, and their explanation has been omitted here.

After the number of event occurrence positions is calculated as in the above embodiment (Step S1308), the on-screen occurrence position number obtainment unit 1917 obtains the number of event occurrence positions of each type of event in the display screen area obtained by the screen area obtainment unit 109, from the event history stored in the event history storage unit 106 (Step S2008).

The impression value calculation unit 1912 calculates an impression value of each event occurrence position obtained by the occurrence number obtainment unit 107, from the number of event occurrences obtained by the occurrence number obtainment unit 107, the number of event occurrence positions obtained by the occurrence position number obtainment unit 108, and the number of on-screen event occurrence positions obtained by the on-screen occurrence position number obtainment unit 1917. The impression value calculation unit 1912 also determines a type of event that contributes most to the calculated impression value, as an icon display event (Step S2009).

The grouping unit 111 groups event occurrence positions in the event history, using the display screen area obtained by the screen area obtainment unit 109 (Step S1310).

The display position determination unit 113 determines, from among the event occurrence positions grouped by the grouping unit 111, a position whose impression value calculated by the impression value calculation unit 1912 is highest in each group, as a transit time display position (Step S1311).

The time calculation unit 114 calculates a transit time of each transit time display position determined by the display position determination unit, using the current time obtained by the time obtainment unit 101, the current position obtained by the position obtainment unit 102, and the map information stored in the map information storage unit (Step S1312).

The map display unit 1915 displays the map information stored in the map information storage unit 104, on a monitor apparatus. When doing so, the map display unit 1915 also displays the transit time calculated by the time calculation unit 114 at the corresponding transit time display position on the map, together with an icon stored in the rule storage unit 1903 corresponding to the icon display event determined by the impression value calculation unit 1912 (Step S2013).

After this, the judgment as to whether or not to end the flow is made (Step S1314). When the flow is to end, the flow ends (S1314: Yes). Otherwise, the flow returns to Step S1301 (S1314: No).

Figure 45:
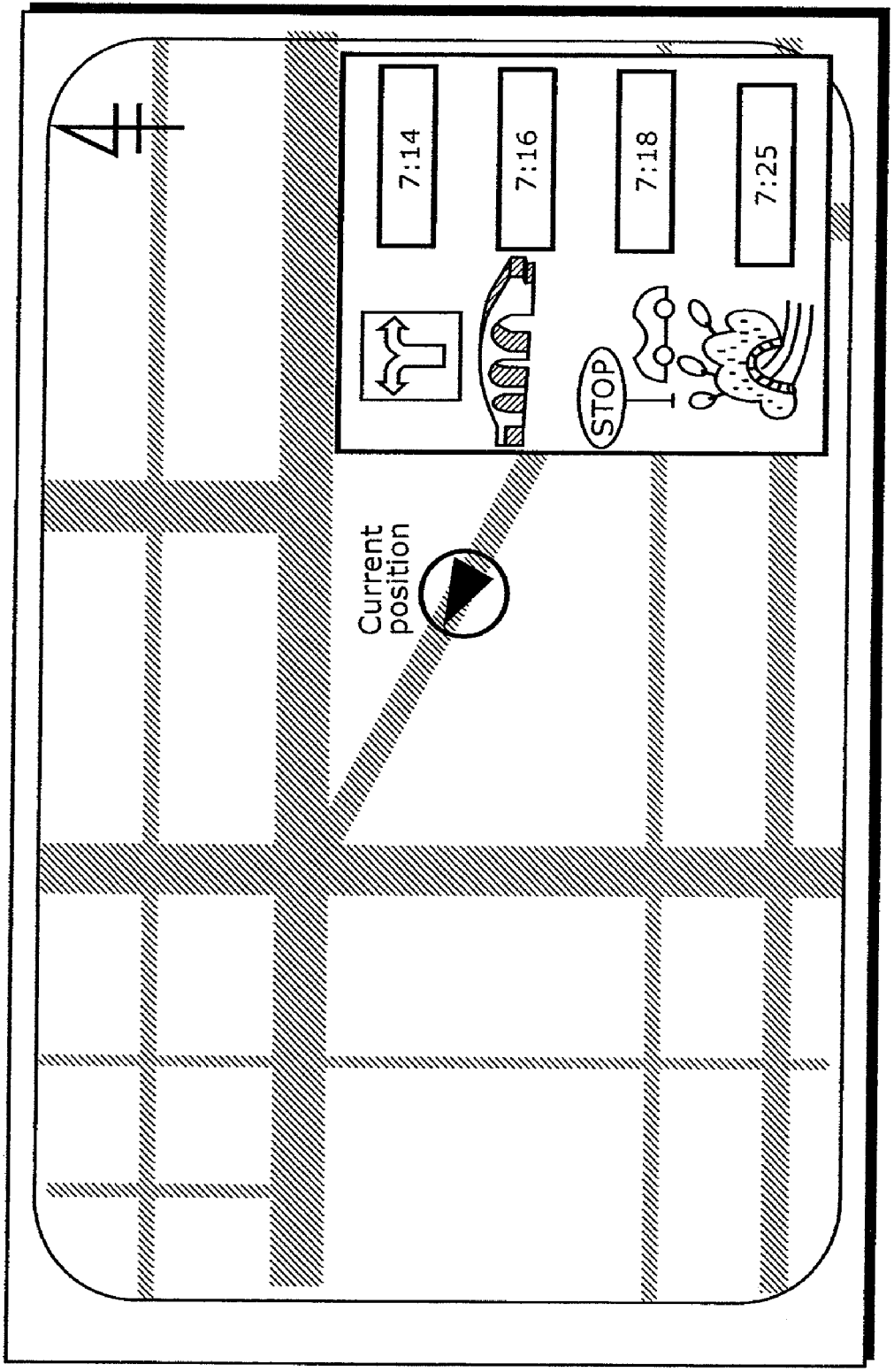
FIG. 45 shows an example of displaying an icon and a transit time, in an area different from a transit time display position.

Note here that the position at which the map display unit 1915 displays the icon and the transit time may not be the transit time display position determined by the display position determination unit 113. Since the event corresponding to the display icon occurs only at one point on the display screen, the user can easily guess, from the icon, the position for which the transit time is calculated, even when the icon is not displayed at the transit time display position on the map. Especially, some users may find it easier to view and preferable when transit times are displayed together within a certain area on the screen such as a subwindow, rather than when the transit times are displayed scatteredly on the map. In view of this, by displaying transit times and icons all within the subwindow as shown in FIG. 45, the transit times can be displayed in an easily viewable manner for such users. In particular, sorting the information in order of transit time as shown in FIG. 45 facilitates the user's understanding. This is because the user tends to recognize places in increasing or decreasing order of transit time. Moreover, to meet the preference of any user, the user may be allowed to switch between a mode of displaying the transit times in the subwindow and a mode of displaying the transit times on the map.

(Variation 13)

Figure 46:
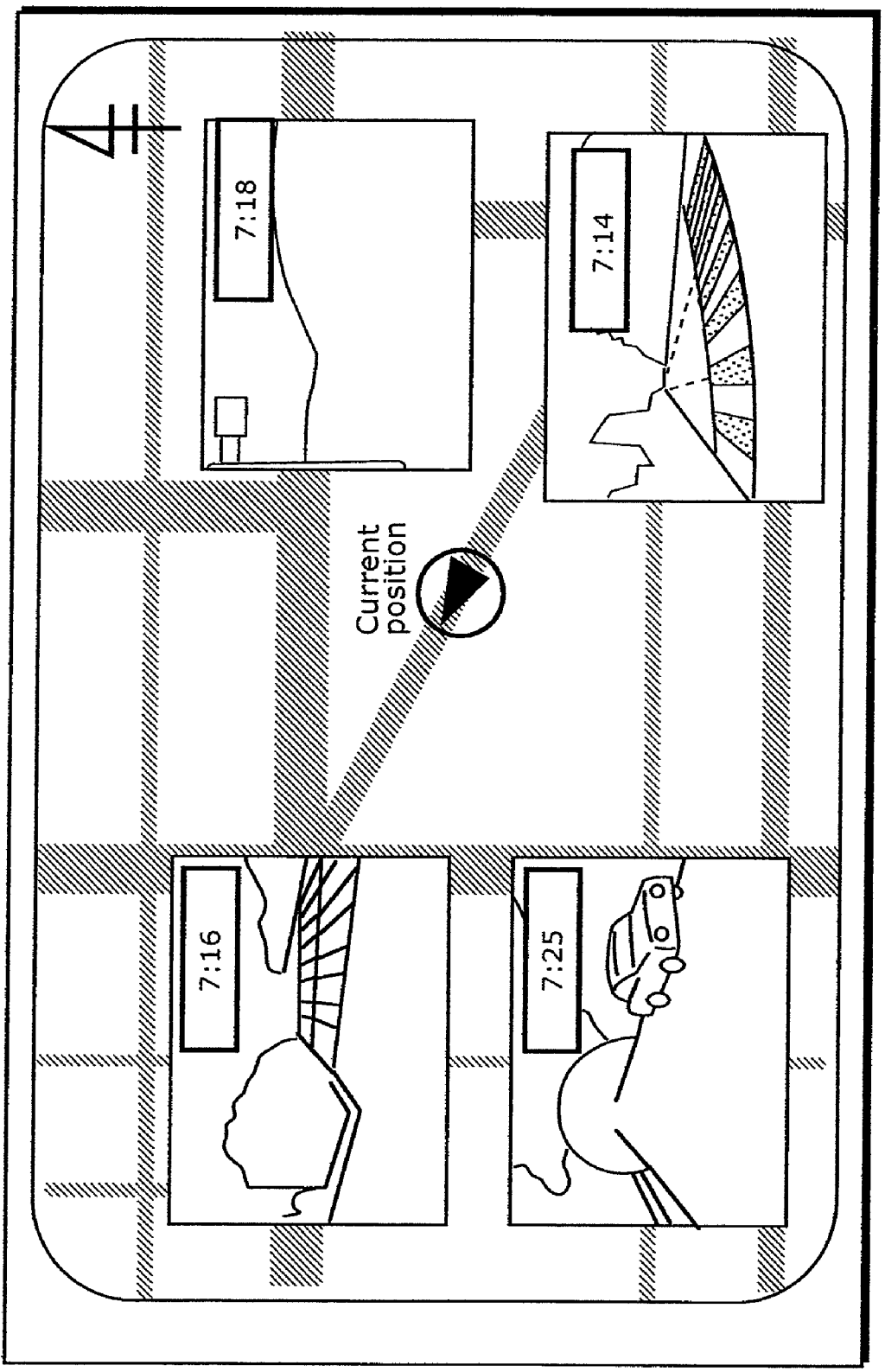
FIG. 46 shows an example of a transit time display that uses a front photograph.

Variation 11 describes the case where the transit time is displayed together with the icon at the transit time display position. However, if the user has just started using the map information display apparatus, the user may not be able to understand the meaning of the icon. In such a case, the user cannot recognize the transit time display position promptly. In view of this, a photograph may be used instead of the icon. Basically, the user tends to remember the current position by a scenery of a front vision. Accordingly, a variation may be applied so that a front camera provided in the map information display apparatus takes a front photograph at the time of event occurrence, and the front photograph is displayed together with the transit time as shown in FIG. 46. This enables even the user who does not understand the meaning of the icon, to recognize the transit time display position more promptly.

Figure 47:
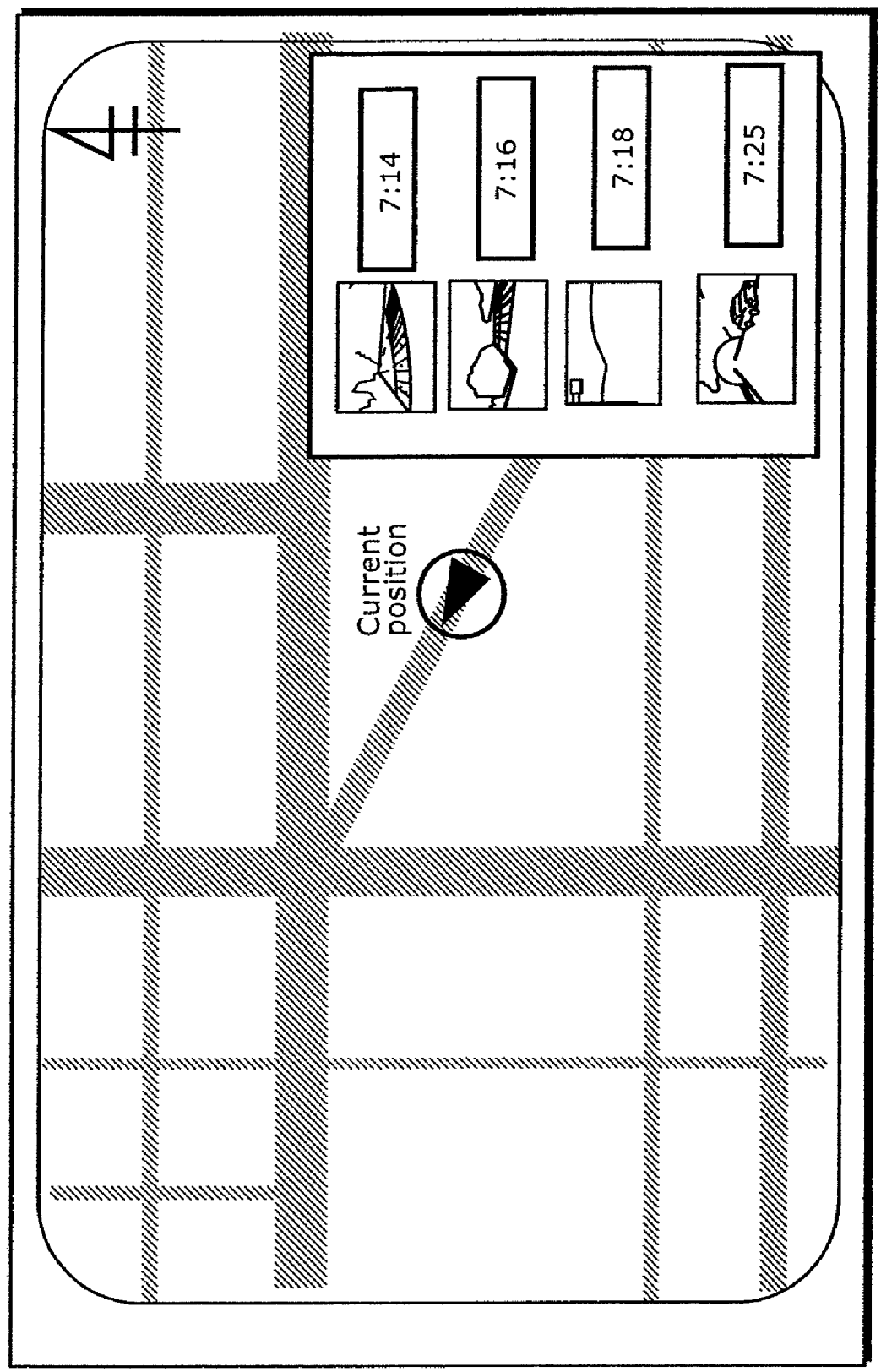
FIG. 47 shows an example of displaying a front photograph and a transit time, in an area different from a transit time display position.

Note that the position at which the map display unit 115 displays the front photograph and the transit time may not be the transit time display position determined by the display position determination unit 113. Even when the front photograph is not displayed at the transit time display position on the map, the user can easily guess the position for which the transit time is calculated, from the front photograph. As one example, the transit time may be displayed together with the front photograph in a subwindow, as shown in FIG. 47.

(Variation 14)

The above embodiment describes the case where the transit time is displayed regardless of the place to which the mobile object travels. However, the user may want to know a transit time of a destination or a transit time of a position on a travel route. Accordingly, a variation may be applied to predict the travel route of the user, and display only a transit time on the predicted travel route.

Moreover, a variation may be applied to prompt the user to set a final destination, and display only a transit time on a route to the final destination.

(Variation 15)

The above embodiment describes the case where the event history is stored and the transit time display position is determined based on the stored event history, regardless of a departure position or final destination position of the mobile object. However, even at a same position on a same route between home and work, different events may occur to and from work. For example, there is a possibility that the number of lanes changes from 2 to 1 at one position on the way to work but changes from 1 to 2 at the same position on the way from work. Therefore, there is a possibility that a position which makes a strong impression on the user on the way to work makes only a weak impression on the user on the way from work. A direction such as to and from somewhere tends to be dependent on the departure position of the mobile object. Accordingly, the departure position of the mobile object is detected, and the event history is stored according to the departure position. By so doing, a position with a strong impression can be appropriately extracted as a transit time display position according to the circumstance.

A method of this variation is described below.

Figure 48:
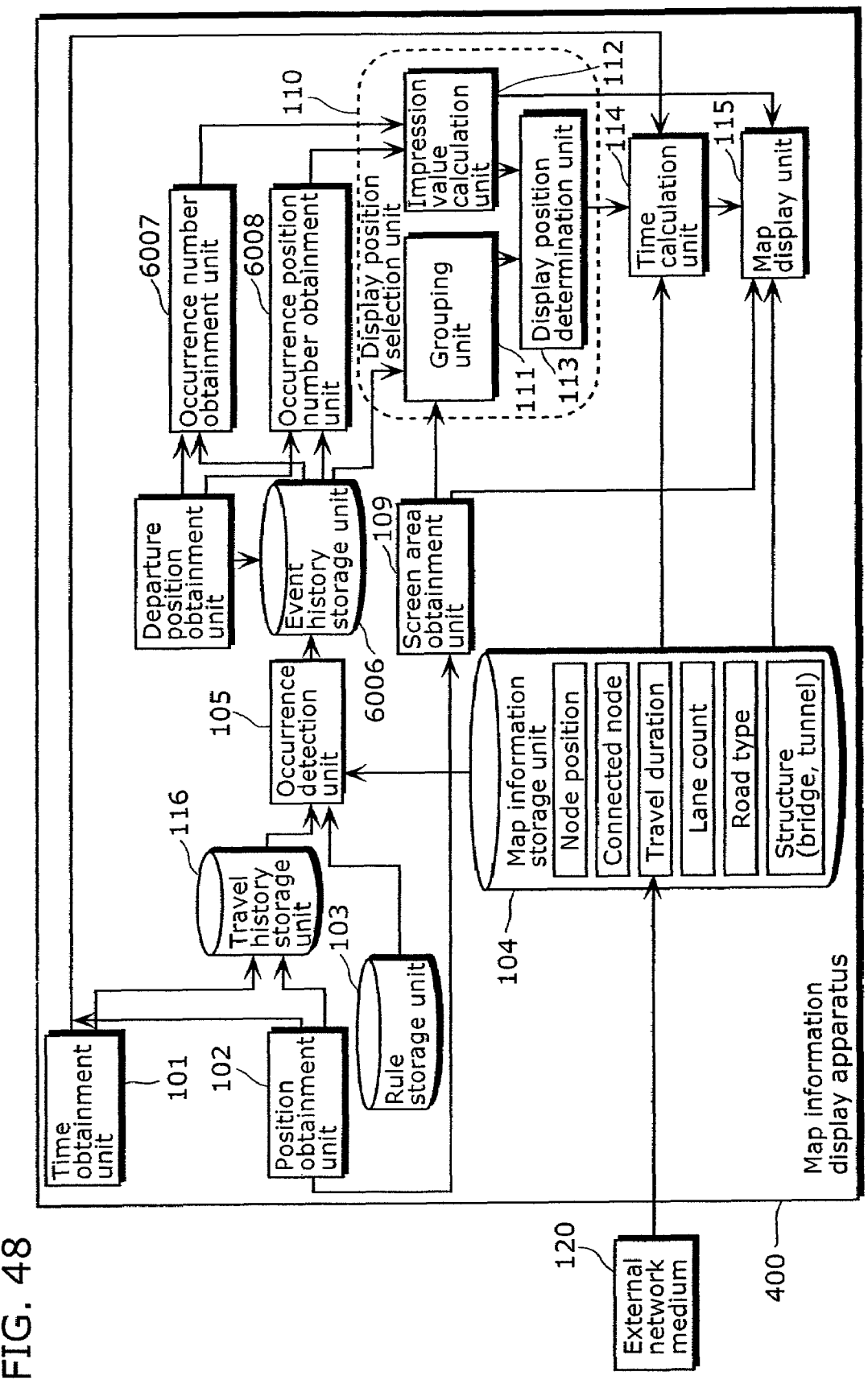
FIG. 48 is a block diagram showing a structure of a map information display apparatus in variation 15 of the present invention.

FIG. 48 is a block diagram showing a structure of a map information display apparatus 400 in variation 15 of the present invention. Components which have the same functions as those in the above embodiment have been given the same reference numerals and their explanation has been omitted here. The following first describes each component with reference to drawings, and then describes an operation of the map information display apparatus.

The map information display apparatus 400 in this variation includes the time obtainment unit 101, the position obtainment unit 102, the rule storage unit 103, the travel history storage unit 116, the map information storage unit 104, the occurrence detection unit 105, the screen area obtainment unit 109, the display position selection unit 110, the grouping unit 111, the impression value calculation unit 112, the display position determination unit 113, the time calculation unit 114, the map display unit 115, an event history storage unit 6006, an occurrence number obtainment unit 6007, an occurrence position number obtainment unit 6008, and a departure position obtainment unit 6017. The departure position obtainment unit 6017 obtains a departure position at which the mobile object started travel. For example, from among positions at which the mobile object did not move for no less than a predetermined duration, a position that is closest to the current time is set as the departure position. Information about a longitude and a latitude of the departure position, such as east longitude "134. 5. 59. 9" and north latitude "34. 5. 15. 6", is detected as position information. Note here that the departure position may be a landmark or a building such as a shop in which the mobile object was located last time. In the case where the mobile object is a car, the ON/OFF of the engine may be detected, so that a position at which the engine was started last time is set as the departure position. Alternatively, the number of persons in the car may be recognized by a camera or a sensor, so that a position at which the number of persons in the car changed last time is set as the departure position.

The event history storage unit 6006 stores the departure position obtained by the departure position obtainment unit 6017 and an event occurrence position of an event detected by the occurrence detection unit 105 and a type of the event, as a history. For instance, an event history that associates an event occurrence position of an event with a type of the event is stored for each departure position, as shown in FIG. 49 where event histories 6006*a* to 6006*c* are illustrated. As one example, the event history 6006*a* in FIG. 49 includes event occurrence positions and event types of events that occurred in the case where the departure position is east longitude "134. 3. 0. 9" and north latitude "34. 6. 3. 6", and a record of an ID "03001" in the event history 6006*a* indicates that a "stop" event occurred once at the position of longitude "134. 3. 0. 9" and latitude "34. 6. 3. 6".

The occurrence number obtainment unit 6007 obtains, for each event occurrence position, the number of event occurrences of each type of event, from an event history that corresponds to the departure position obtained by the departure position obtainment unit 6017 from among the event histories stored in the event history storage unit 106.

The occurrence position number obtainment unit 108 obtains, for each type of event, the number of event occurrence positions of the event, from the event history that corresponds to the departure position obtained by the departure position obtainment unit 6017 from among the event histories stored in the event history storage unit 106. For example, when the event history is stored as shown in FIG. 8, the number of event occurrence positions of a "stop" event is calculated as follows. Records of IDs "001", "003", and "004" in the event history show the occurrence of the "stop" event at two positions, i.e., the position of longitude "134. 3. 0. 9" and latitude "34. 6. 3. 6" and the position of longitude "134. 3. 0. 9" and latitude "34. 5. 30. 0", so that the number of event occurrence positions of the "stop" event is 2.

Figure 50:
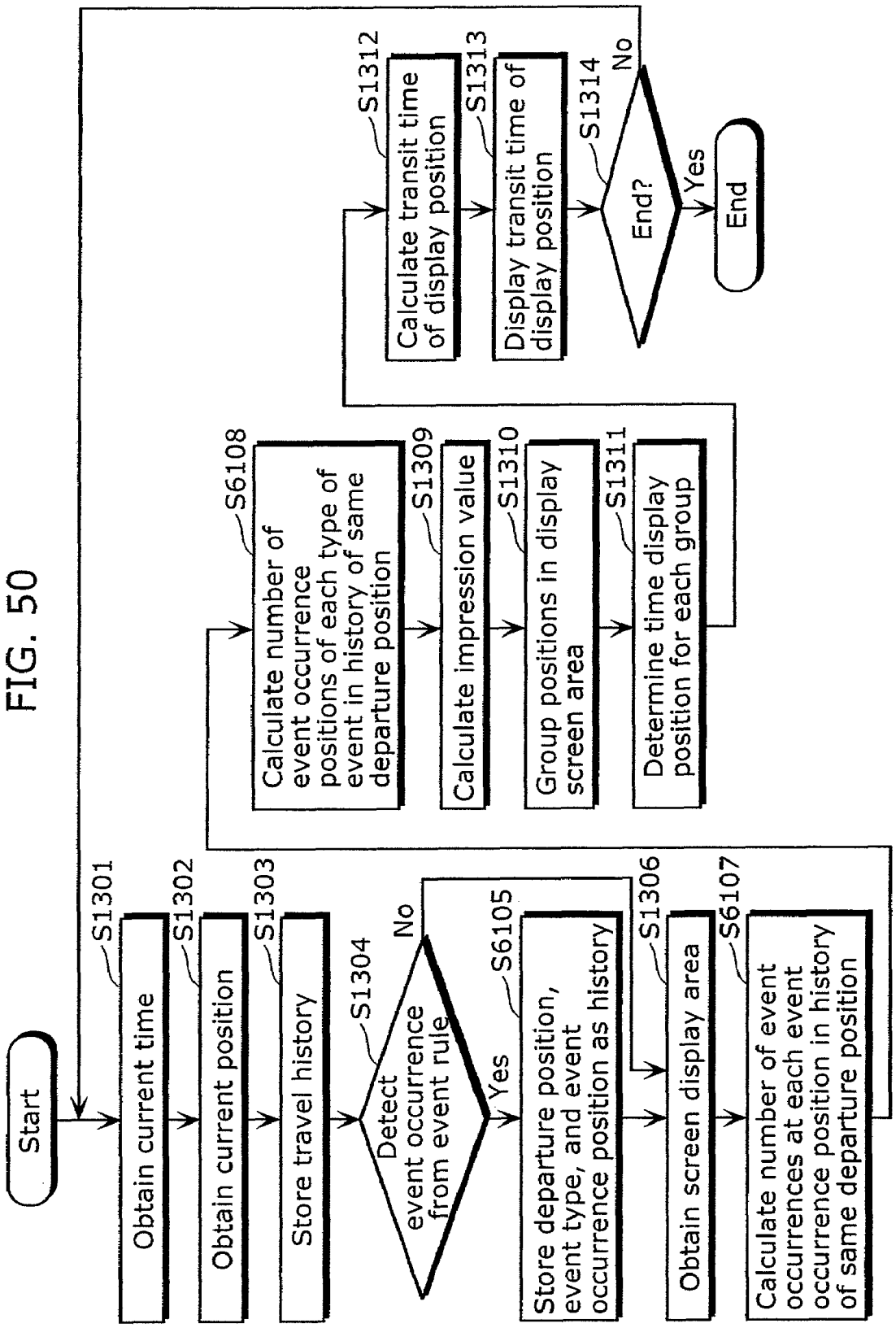
FIG. 50 is a flowchart showing an example operation of the map information display apparatus in variation 15 of the present invention.

A flowchart of variation 15 is described below, with reference to FIG. 50. FIG. 50 is a flowchart showing an example operation of the map information display apparatus 400 in variation 15 of the present invention. In FIG. 50, processes which are the same as those executed by the map information display apparatus of the above embodiment shown in FIG. 13 have been given the same reference numerals, and their explanation has been omitted here.

The departure position obtainment unit 6017 obtains the departure position at which the mobile object started travel (Step S6101). The time obtainment unit 101 obtains the current time (Step S1301). The position obtainment unit 102 obtains the current position (Step S1302). The travel history storage unit 116 stores the current time obtained by the time obtainment unit 101 and the current position obtained by the position obtainment unit 102, as a travel history (Step S1303).

The occurrence detection unit 105 judges whether or not an event occurred, using the travel history stored in the travel history storage unit 116, the map information stored in the map information storage unit 104, and the event rule stored in the rule storage unit (Step S1304). When an event occurrence is detected (S1304: Yes), the flow proceeds to Step S1305. When an event occurrence is not detected (S1304: No), the flow proceeds to Step S1306.

When an event occurrence is detected, the departure position obtained by the departure position obtainment unit 6017 and a type and occurrence position of the detected event are stored in the event history storage unit 106 (Step S6105).

The screen area obtainment unit 109 obtains the display screen area on the map, from the current position obtained by the position obtainment unit 102 (Step S1306).

The occurrence number obtainment unit 107 obtains, for each event occurrence position, the number of event occurrences of each type of event, from an event history that corresponds to the departure position obtained by the departure position obtainment unit 6017 from among the event histories stored in the event history storage unit 106 (Step S6107).

The occurrence position number obtainment unit 108 obtains, for each type of event, the number of event occurrence positions of the event, from the event history that corresponds to the departure position obtained by the departure position obtainment unit 6017 from among the event histories stored in the event history storage unit 106 (Step S6108). The subsequent processes are the same as those in the above embodiment. As in the above embodiment, the map information display apparatus of this variation subsequently executes the processes from the impression value calculation process (Step S1309) onward. Thus, the departure position of the mobile object is detected and the transit time display position is determined based on the event history corresponding to the departure position, with it being possible to appropriately extract a position with a strong impression as a transit time display position according to the circumstance.

(Variation 16)

Figure 51:
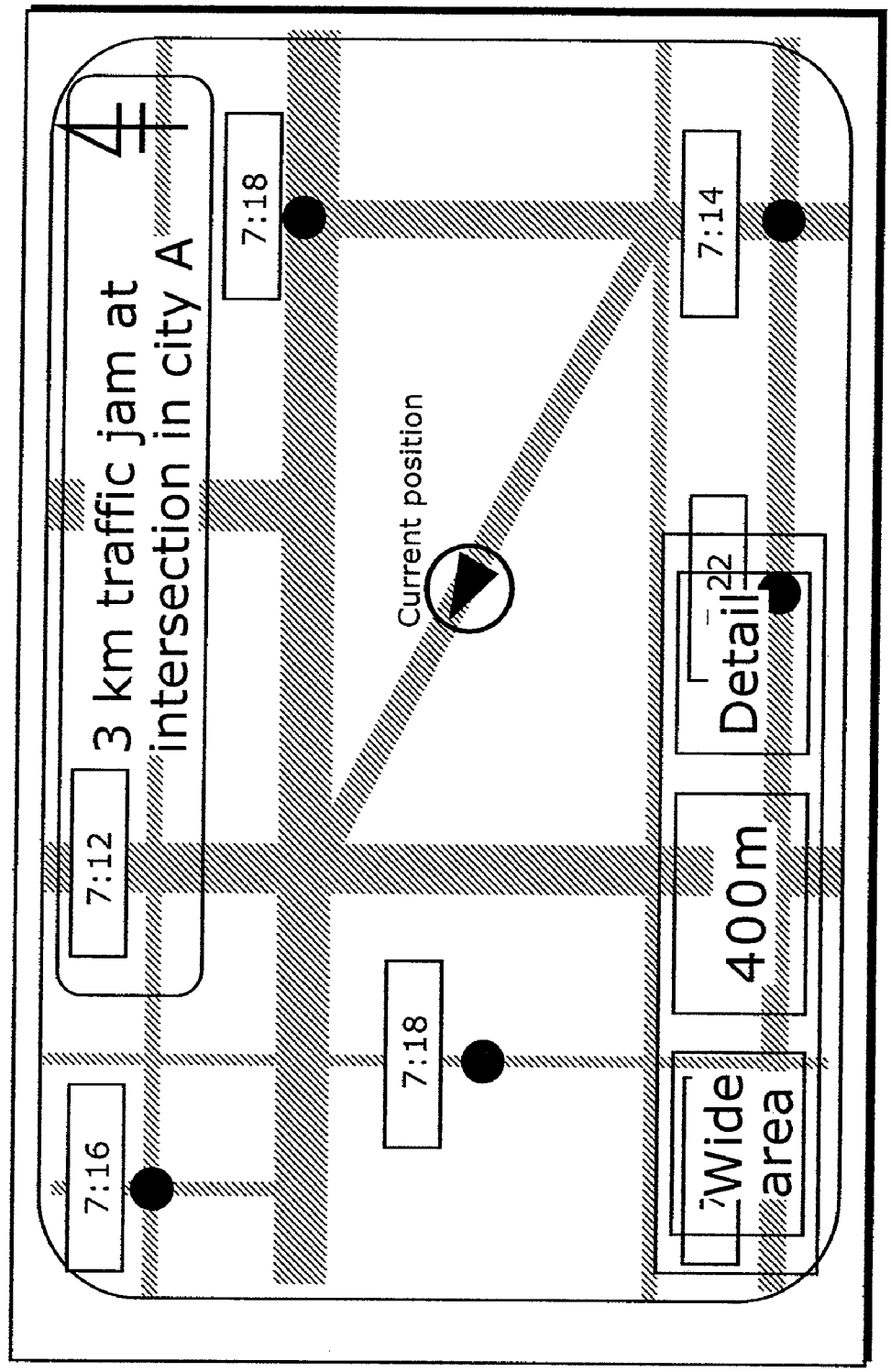
FIG. 51 shows an example of displaying a transit time at a same position as another image displayed on a map.

The above embodiment describes the case where the grouping unit 111 generates the group areas by dividing the display screen area. On a screen of a map information display apparatus such as a car navigation apparatus, images other than a transit time, such as windows of a touch panel button, a map scale, a current time, and VICS text information, are often displayed together with a map. This being so, when a display position of a transit time overlaps a display position of another image as shown in FIG. 51, such as in the case where the other image is displayed in a higher layer than the transit time, the transit time is difficult to view as it is hidden below the other image. Though the other image may be semitransparent, in either case the transit time is not easily viewable. Conversely, in the case where the other image is displayed in a lower layer than the transit time, the other image is difficult to view.

Figure 52:
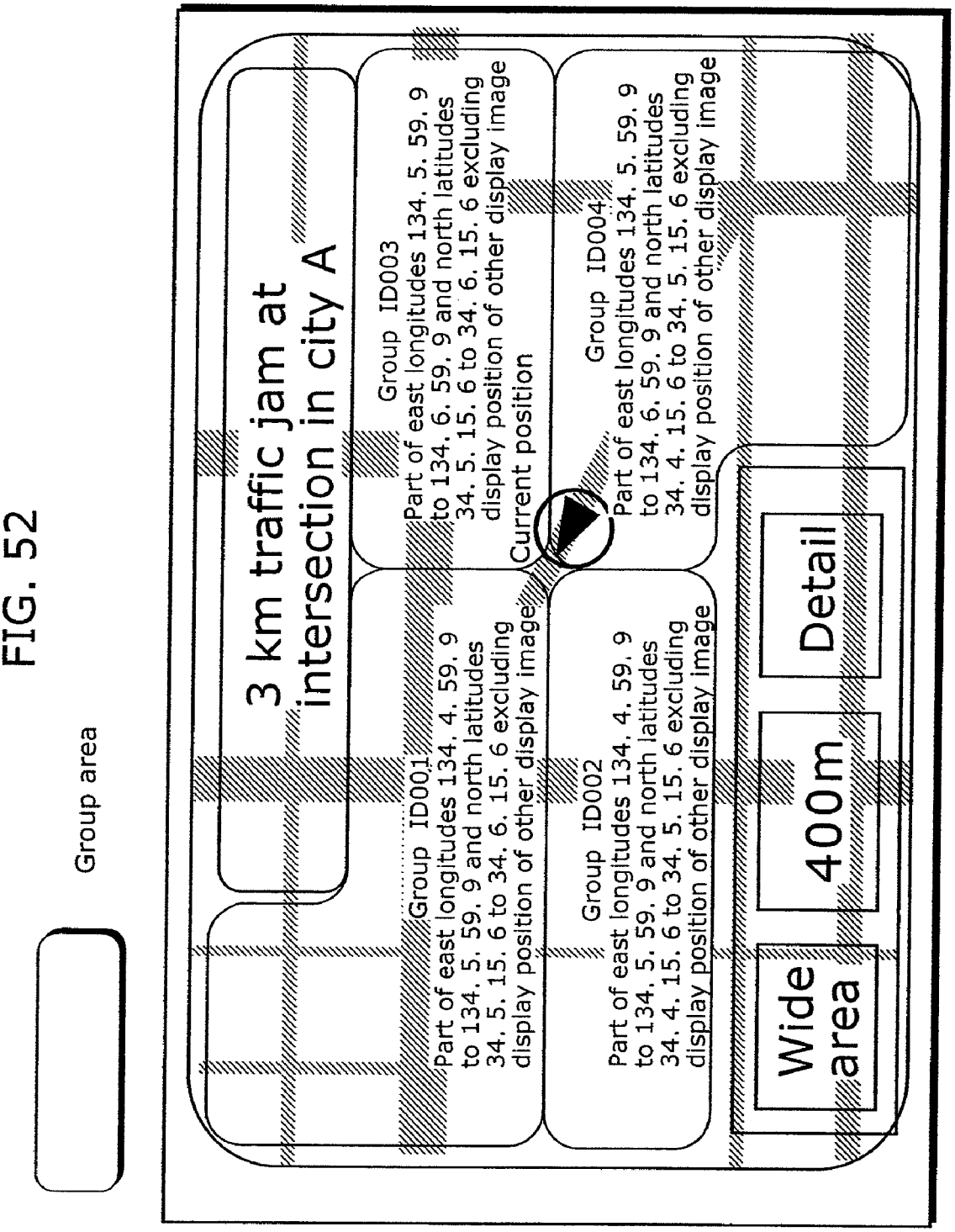
FIG. 52 shows an example of performing grouping so as to avoid a display position of another image displayed on a map.

Accordingly, a variation may be applied to generate the group areas so that the display position of the other image is not included in any group area, as shown in FIG. 52.

A method of this variation is described below.

Figure 53:
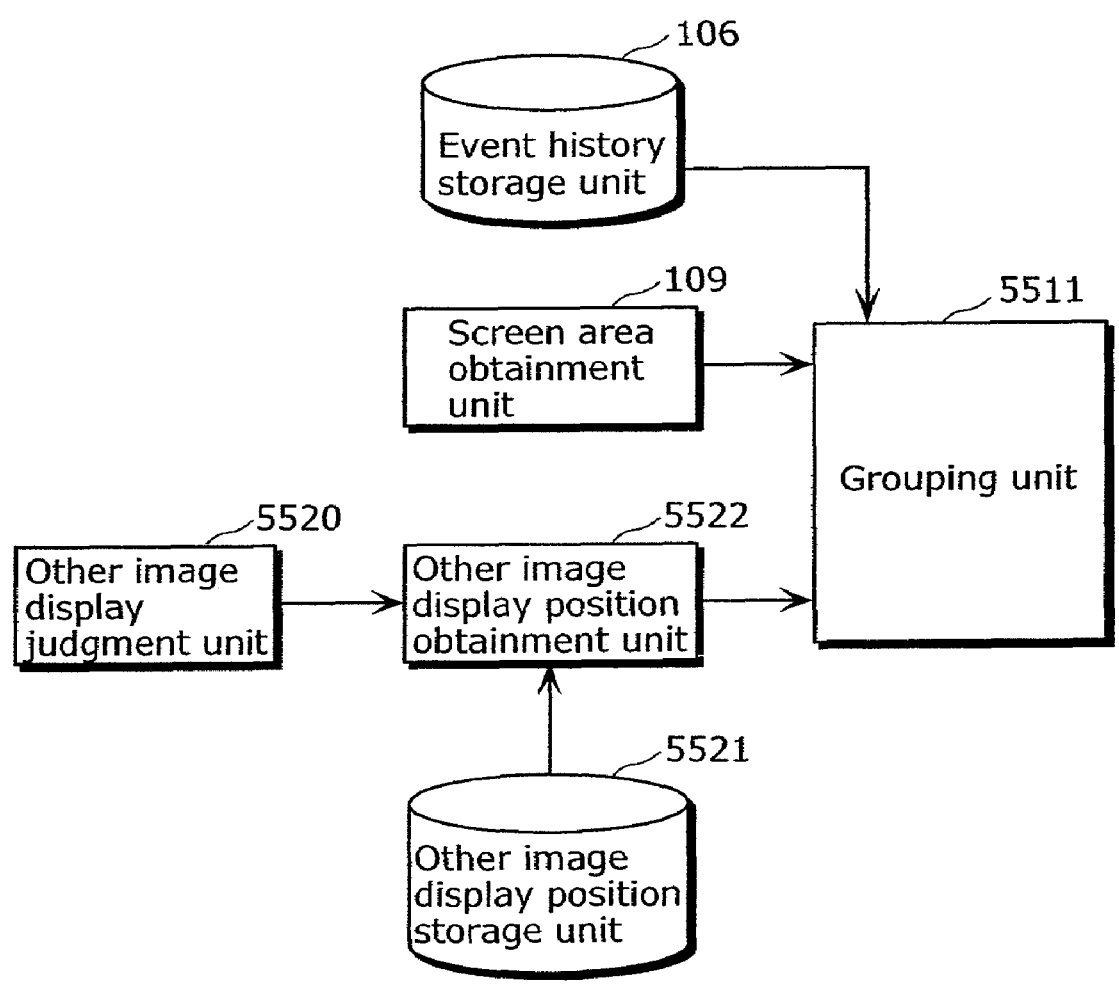
FIG. 53 is a block diagram showing a part of a structure of a map information display apparatus in variation 16 of the present invention.

This example is realized by adding a structure shown in FIG. 53 to the structure of the above embodiment. FIG. 53 is a block diagram showing a part of a structure of a map information display apparatus in variation 16 of the present invention. Components which have the same functions as those in the above embodiment have been given the same reference numerals, and their explanation has been omitted here. The following first describes each component with reference to drawings, and then describes an operation of the map information display apparatus.

An other image display judgment unit 5520 judges whether or not an image that has a possibility of being displayed on a map other than the map and a transit time is currently displayed on the map screen. For example, when there are a VICS text display window, a scale display window, and a tourist spot information display window as images having a possibility of being displayed, the other image display judgment unit 5520 judges that the VICS text display window and the scale display window are currently displayed.

An other image display position storage unit 5521 stores a display position, on the screen, of each image having a possibility of being displayed other than the map and the transit time. As one example, the other image display position storage unit 5521 stores a display position of the VICS text display window, such as a pixel position "X=30 to 640, Y=0 to 30" on the screen of the map information display apparatus.

An other image display position obtainment unit 5522 calculates, for each image which is judged as being displayed by the other image display judgment unit 5520, a display position of the image on the map from a display position of the image on the screen stored in the other image display position storage unit 5521. For instance, when the other images which are currently displayed are the VICS text display window and the scale display window, the other image display position obtainment unit 5522 calculates a display position of each image on the map. As one example, when the display position of the VICS text display window on the monitor apparatus screen is "X=30 to 640, Y=0 to 30", a position of a map area displayed in this part is calculated. In the case when the position of the map area displayed in the display area "X=30 to 640, Y=0 to 30" is east longitude "134. 5. 10. 0" to east longitude "134. 6. 59. 9" and north latitude "34. 6. 0. 0" to north latitude "34. 6. 15. 6", the other image display position obtainment unit 5522 obtains this position area.

Further, in the case when the display position of the scale display window on the monitor apparatus screen is "X=0 to 640, Y=270 to 300", the other image display position obtainment unit 5522 calculates a position of a map area displayed in this part, as east longitude "134. 4. 59. 9" to east longitude "134. 6. 59. 9" and north latitude "34. 4. 15. 6" to north latitude "34. 5. 30. 0".

A grouping unit 5511 groups event occurrence positions stored in the event history storage unit 106 using the screen area obtained by the screen area obtainment unit 109, so as to avoid the display position area of the other display image obtained by the other image display position obtainment unit 5522. Suppose the display screen area of the map is east longitude "134. 4. 59. 9" to east longitude "134. 6. 59. 9" and north latitude "34. 4. 15. 6" to north latitude "34. 6. 15. 6", and the area of east longitude "134. 5. 10. 0" to east longitude "134. 6. 59. 9" and north latitude "34. 6. 0. 0" to north latitude "34. 6. 15. 6" and the area of east longitude "134. 4. 59. 9" to east longitude "134. 6. 59. 9" and north latitude "34. 4. 15. 6" to north latitude "34. 5. 30. 0" in the map display screen are display positions of other display images, as shown in FIG. 52. In such a case, the grouping unit 5511 performs grouping so as to avoid the display positions of these areas. For example, the grouping unit 5511 generates group areas by dividing the screen in quarters and excluding the display areas of the other images from the division areas. In detail, a group area of a group ID "001" is a rectangular area of east longitude "134. 4. 59. 9" to east longitude "134. 5. 59. 9" and north latitude "34. 5. 15. 6" to north latitude "34. 6. 15. 6" excluding a rectangular area of east longitude "134. 5. 10. 0" to east longitude "134. 5. 59. 9" and north latitude "34. 6. 0. 0" to north latitude "34. 6. 15. 6". A group area of a group ID "002" is a rectangular area of east longitude "134. 4. 59. 9" to east longitude "134. 5. 59. 9" and north latitude "34. 5. 30. 0" to north latitude 34. 5. 15. 6". A group area of a group ID "003" is a rectangular area of east longitude "134. 5. 59. 9" to east longitude "134. 6. 59. 9" and north latitude "34. 5. 15. 6" to north latitude 34. 6. 0. 0". A group area of a group ID "004" is a rectangular area of east longitude "134. 5. 59. 9" to east longitude "134. 6. 59. 9" and north latitude "34. 5. 30. 0" to north latitude "34. 5. 15. 6". Each event occurrence position belongs to a group of a group area in which the event occurrence position is included.

Figure 54:
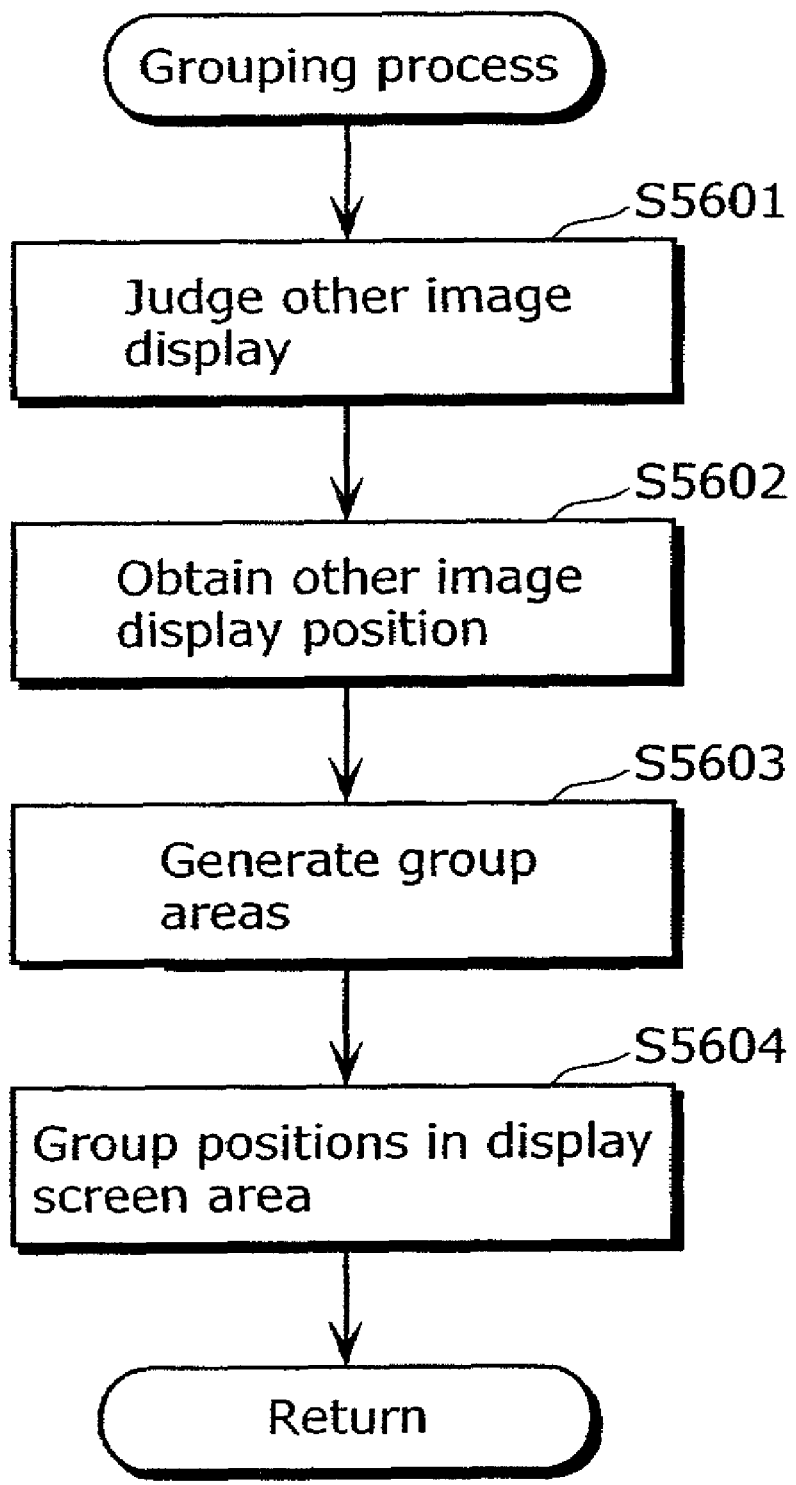
FIG. 54 is a part of a flowchart showing an example operation of the map information display apparatus in variation 16 of the present invention.

A flowchart of variation 16 is described below, with reference to FIG. 54. FIG. 54 is a flowchart showing an example of a grouping process executed by the map information display apparatus in variation 16 of the present invention. The flowchart of FIG. 54 relates to the process which is executed by the map information display apparatus of this variation instead of the grouping process (Step S1310) executed by the map information display apparatus of the above embodiment shown in FIG. 13. The other processes (Steps S1301 to S1309 and Steps S1311 to S1314) shown in FIG. 13 also apply to this variation, and so an explanation of these same processes has been omitted here.

After the impression value calculation unit 112 calculates the impression value of each event occurrence position as in the above embodiment (Step S1309), the other image display judgment unit 5520 judges whether or not an image having a possibility of being displayed on the map other than the map and the transit time is currently displayed on the map screen (Step S5601).

The other image display position obtainment unit 5522 calculates, for the image which is judged as being displayed by the other image display judgment unit 5520, a display position on the map from a display position on the screen stored in the other image display position storage unit 5521 (Step S5602).

The grouping unit 5511 generates group areas using the screen area obtained by the screen area obtainment unit 109, so as to avoid the display position of the other display image obtained by the other image display position obtainment unit 5522 (Step S5603).

The grouping unit 5511 groups event occurrence positions in the event history, based on the generated group areas (Step S5604). The subsequent processes are the same as those in the above embodiment.

The above embodiment describes the case where the display position determination unit determines the impression value from the number of event occurrences and the number of event occurrence positions. The user has a strong impression of the place to which the mobile object is currently traveling. In addition, it is effective to display a transit time for the place to which the mobile object is currently traveling. In view of this, a variation may be applied to predict a transit place, and set a place which also has a high transit possibility as a place with a high impression value. For example, when there is an event of transiting an intersection, it is predicted from the past event history corresponding to the same departure point that an intersection with a largest number of times of transit has a highest transit possibility. Hence the number of times of transit can be used as an impression value for an intersection.

The above embodiment describes the case where the display position determination unit determines the impression value from the number of event occurrences and the number of event occurrence positions. The user has a strong impression of the final destination of the mobile object. In addition, it is effective to display a transit time for the final destination of the mobile object. Accordingly, a variation may be applied to predict a final destination, and set a place which also has a high possibility of being a final destination as a place with a high impression value. For example, when there is an event of parking, it is predicted from the past event history corresponding to the same departure point that a place with a largest number of times of parking has a highest transit possibility. Hence the number of times of parking can be used as an impression value. As one example, in the case of a car, a parking event is detected when the engine of the car is stopped for no less than a predetermined duration.

(Variation 17)

The above embodiment describes the case where the display position selection unit 110 generates the group areas by dividing the display screen area and selects the point for displaying the transit time from each group area, thereby displaying estimated transit times on the map scatteredly in an appropriately distributed manner.

However, when it is desirable to display a transit time at a fixed position on the display screen in order to make the display easier to view for the user, a variation may be applied to set a representative point at a position on the screen where a designer wants to display a transit time, and display a transit time of a high impression point that is closest to the representative point. In this way, the position on the screen where the transit time is displayed is fixed approximately to the display position intended by the designer, which contributes to enhanced viewability.

A method of this variation is described below.

Figure 55:
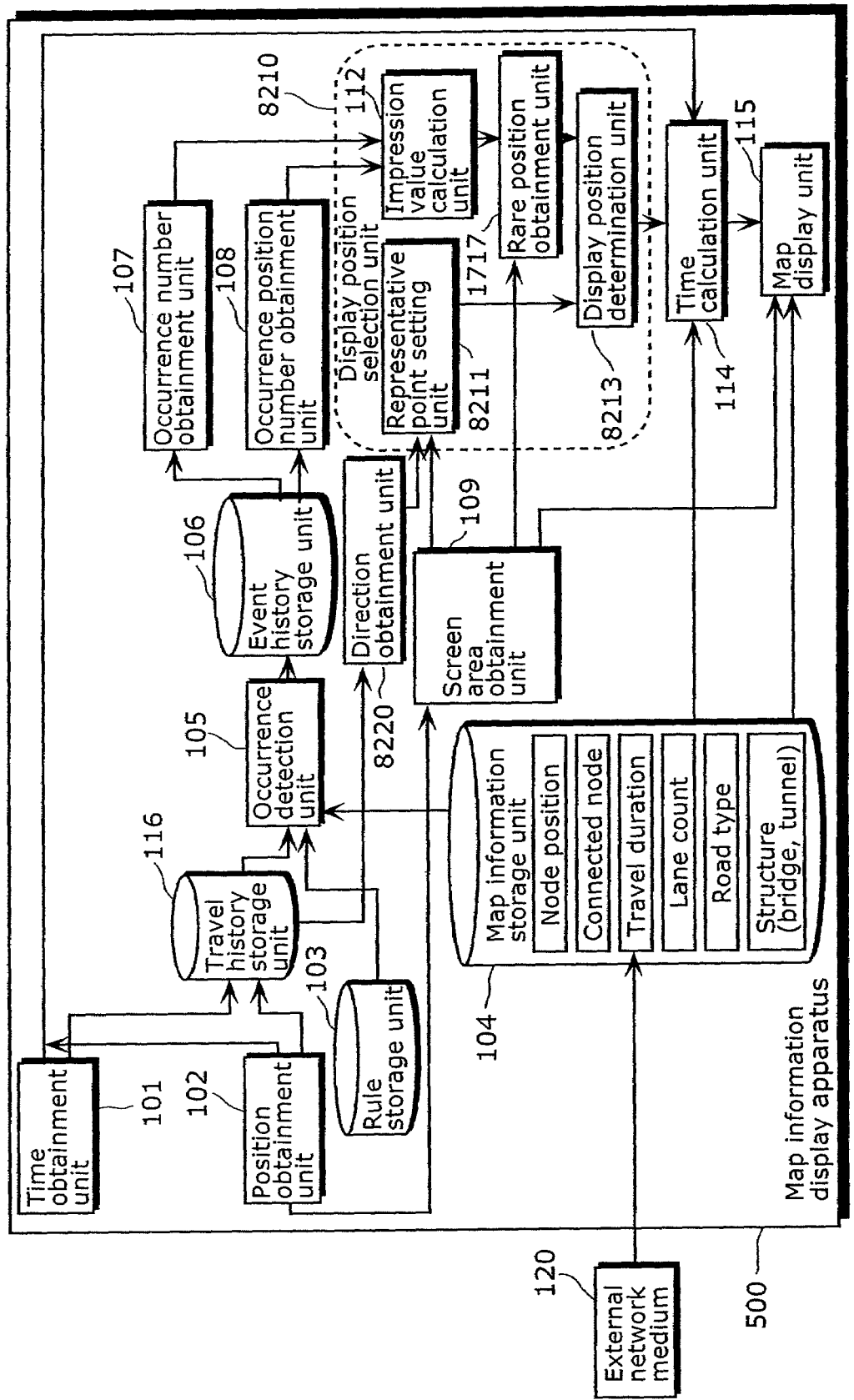
FIG. 55 is a block diagram showing a structure of a map information display apparatus in variation 17 of the present invention.

FIG. 55 shows a structure of a map information display apparatus 500 in this variation. Components which have the same functions as those in the above embodiment have been given the same reference numerals, and their explanation has been omitted here. The following first describes each component with reference to drawings, and then describes an operation of the map information display apparatus.

A direction obtainment unit 8220 obtains a travel direction of the mobile object, from the travel history stored in the travel history storage unit 116. As one example, a directly north direction of the current position is set to 0 degree, and a direction angle which is positive in a clockwise direction from the directly north direction is obtained.

A representative point setting unit 8211 sets, in the display screen area obtained by the screen area obtainment unit 109, each ideal transit time display position on the screen intended by a system designer, as a representative point. To enhance viewability, these representative points are set so as to be separated from each other by at least a predetermined distance. As one example, for enhanced viewability, the representative points are set to be apart from each other by at least 1/10 of a distance of one side of the display screen area so that transit times are displayed on the display screen in a sufficiently separated manner.

Here, it is further preferable to set, as in variation 9, the representative points more densely in the travel direction of the mobile object obtained by the direction obtainment unit 8220 so that more transit times are displayed in a part to which the mobile object is likely to travel. In detail, the distance between representative points which are in a range of ±45 degrees from the travel direction of the mobile object centering on the current position of the mobile object is set to be smaller than the distance between representative points which are not in the range of ±45 degrees from the travel direction of the mobile object.

Figure 56:
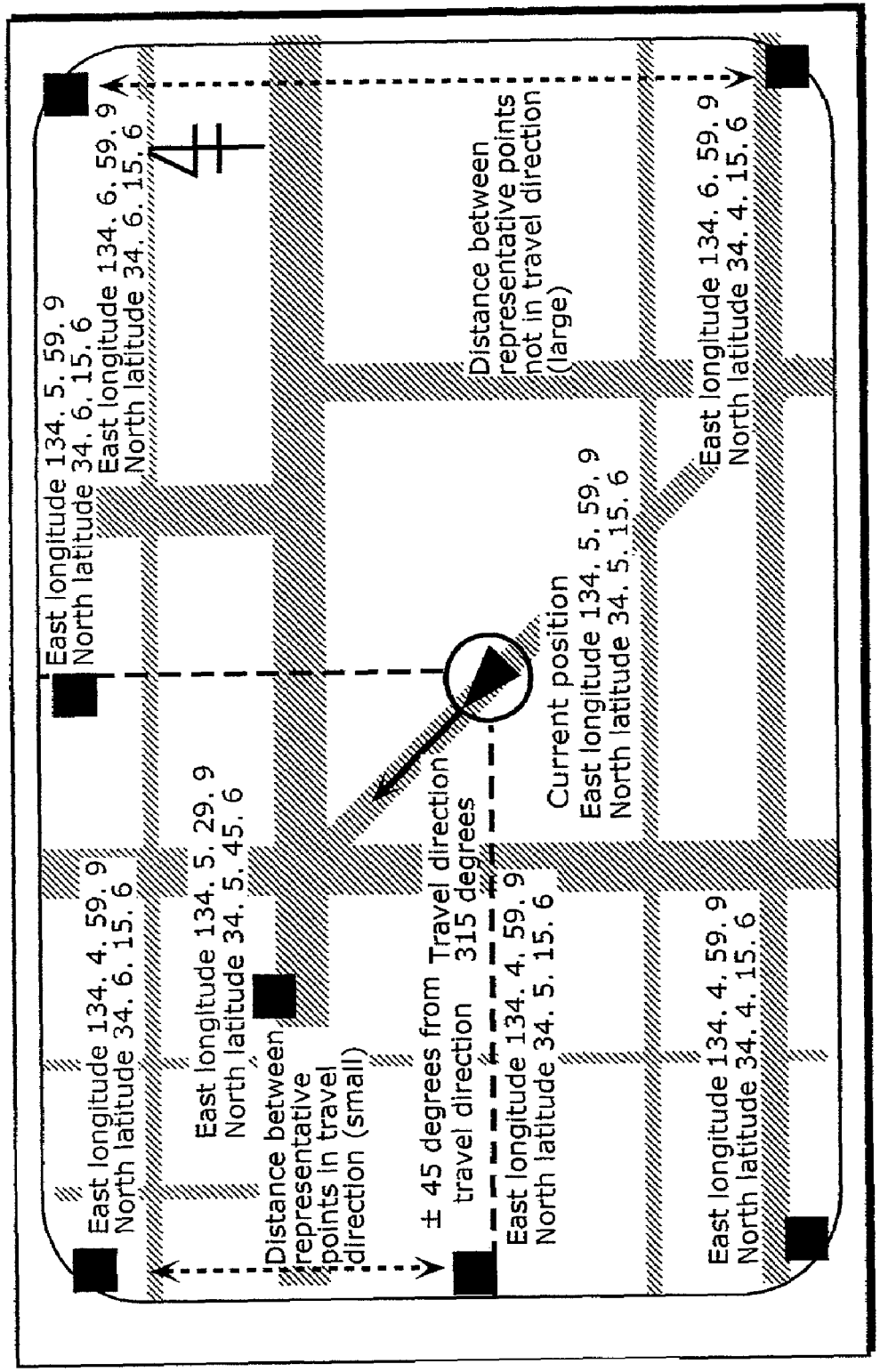
FIG. 56 shows an example where a representative point setting unit sets representative points.

Suppose the display screen area is east longitude "134. 4. 59. 9" to east longitude "134. 6. 59. 9" and north latitude "34. 4. 15. 6" to north latitude "34. 6. 15. 6". As shown in FIG. 56, representative points are set at the four corners (east longitude "134. 4. 59. 9" and north latitude "34. 4. 15. 6") (east longitude "134. 4. 59. 9" and north latitude "34. 6. 15. 6") (east longitude "134. 6. 59. 9" and north latitude "34. 4. 15. 6") (east longitude "134. 6. 59. 9" and north latitude "34. 6. 15. 6") of the display screen area, and additionally representative points are set in the range of ±45 degrees from the travel direction of the mobile object.

For example, in the case where the current position in the travel direction is east longitude "134. 5. 59. 9" and north latitude "34. 5. 15. 6" and the direction angle of the travel direction is 315 degrees as shown in FIG. 56, representative points are set at the corners (east longitude "134. 5. 59. 9" and north latitude "34. 6. 15. 6") (east longitude "134. 4. 59. 9" and north latitude "34. 5. 15. 6") and the center (east longitude "134. 5. 29. 9" and north latitude "34. 5. 45. 6") of the area in the range of ±45 degrees from the travel direction. Here, the distance between any two representative points is no less than 1/10 of the distance of one side of the display screen area.

A display position determination unit 8213 determines, for each representative point set by the representative point setting unit 8211, a candidate position for a transit time display that is closest to the representative point, as a transit time display position. A candidate position for a transit time display is an event occurrence position with a high impression value (high impression position) extracted by the rare position obtainment unit 1717. In detail, the display position determination unit 8213 calculates a distance from the representative point to each high impression position.

Figure 57:
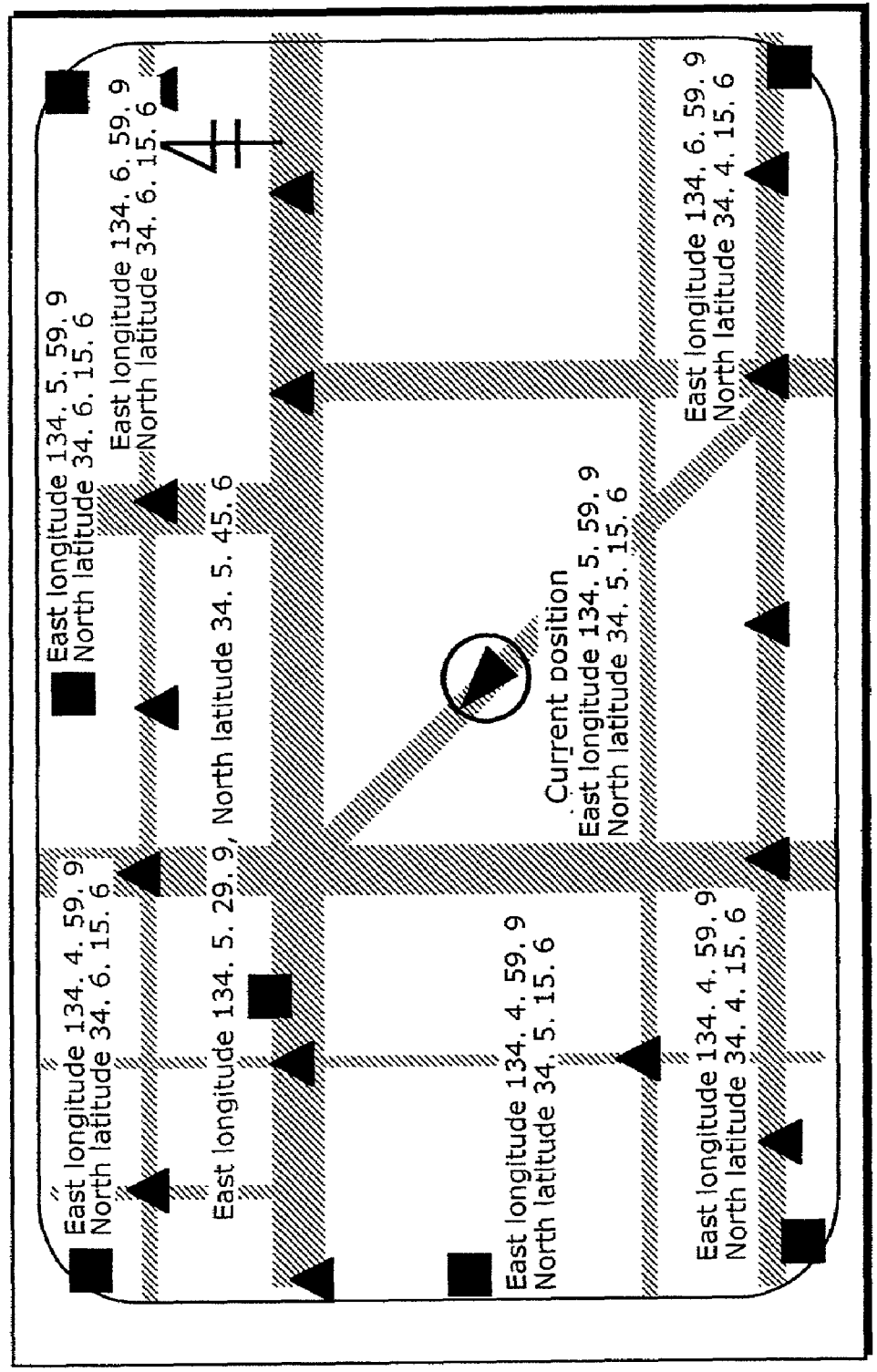
FIG. 57 shows an example distribution of representative points and high impression points.
Figure 58:
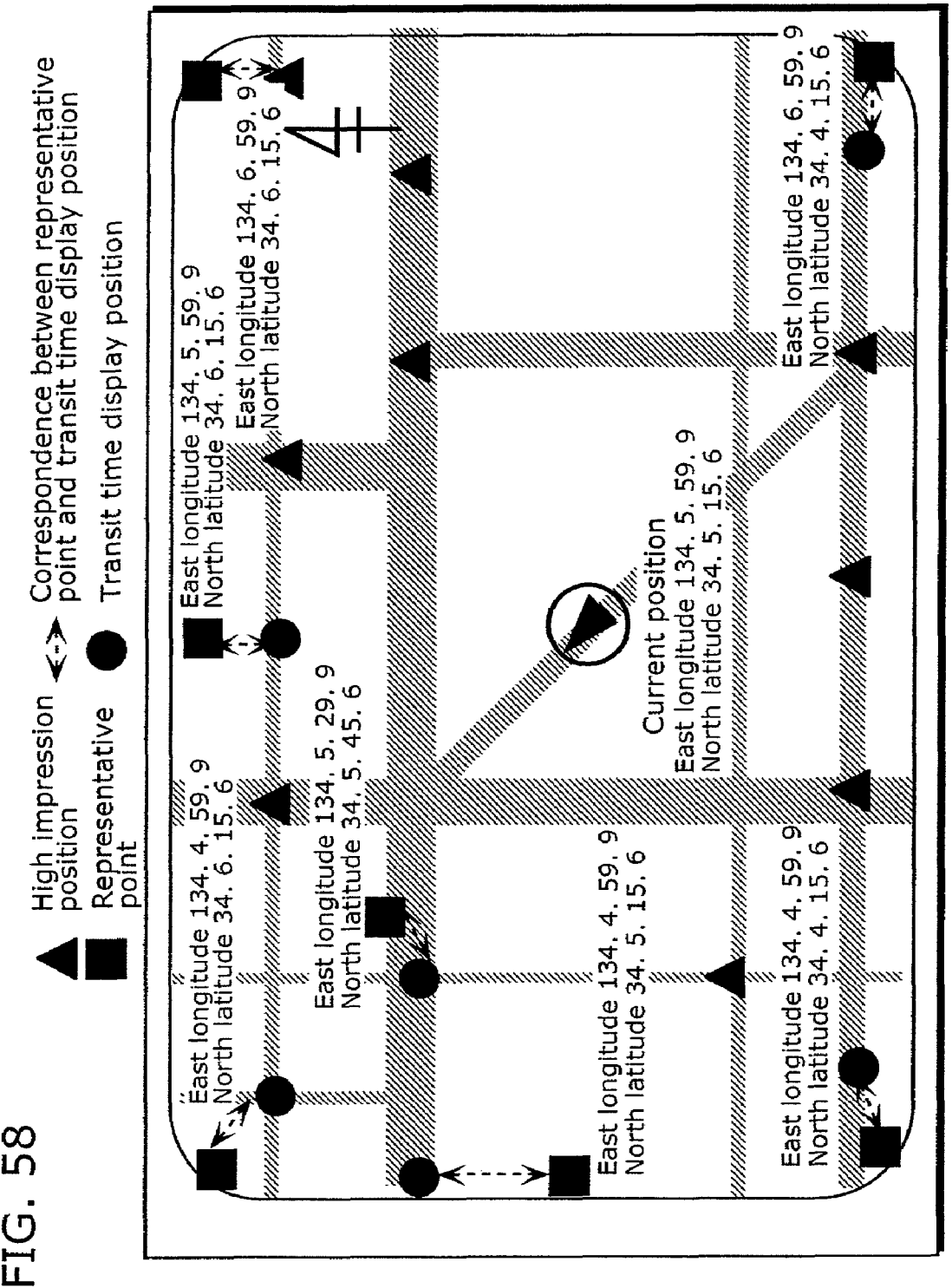
FIG. 58 shows an example where a display position determination unit determines a transit time display position.

The display position determination unit 8213 then selects a high impression position closest to the representative point, as a transit time display position. Suppose representative points are set and high impression positions are extracted as shown in FIG. 57. In such a case, a high impression position closest to each representative point is determined as a transit time display position, as shown in FIG. 58.

Figure 59:
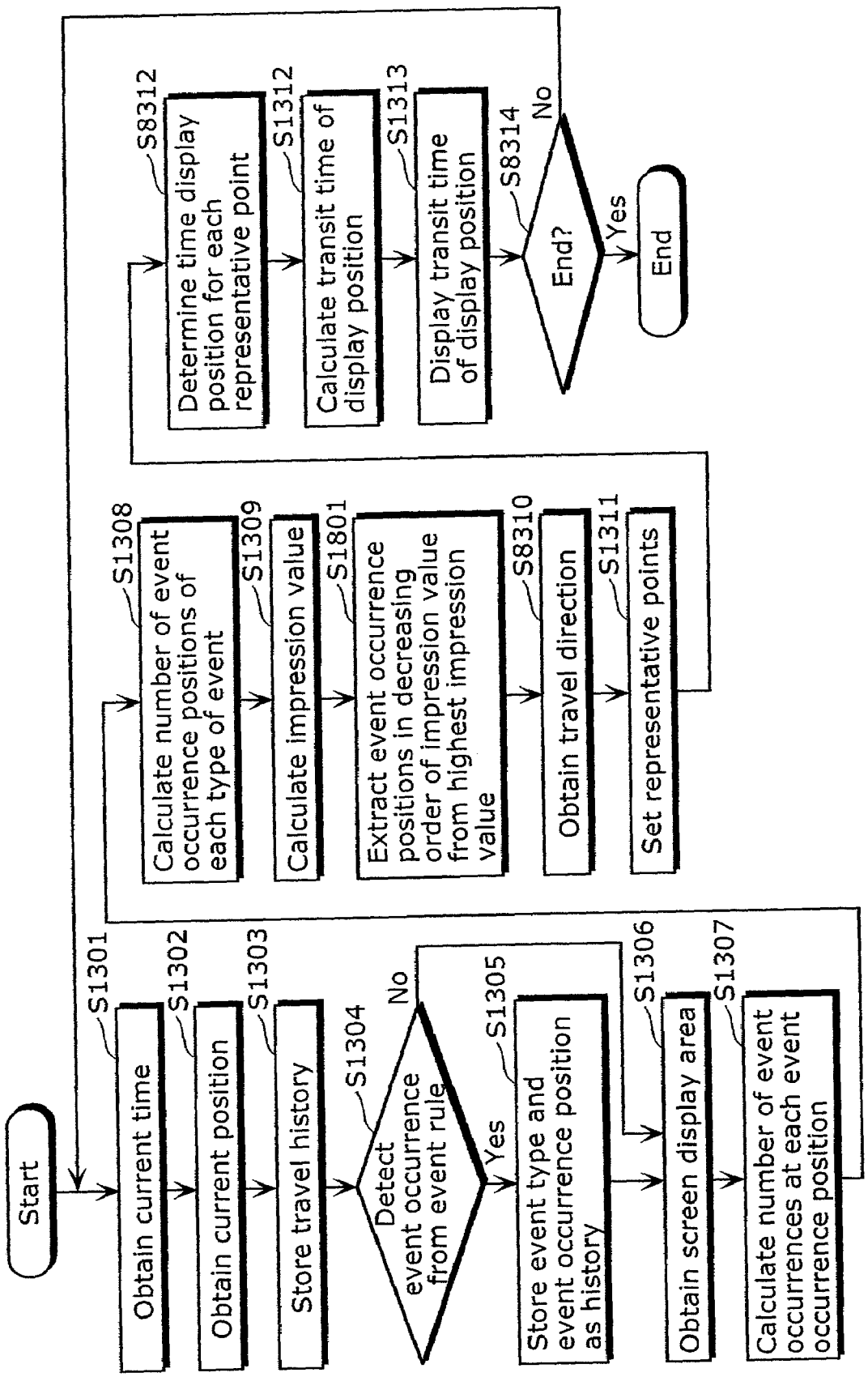
FIG. 59 is a flowchart showing an example operation of the map information display apparatus in variation 17 of the present invention.

A flowchart of this variation is described below, with reference to FIG. 59. An explanation of processes already explained in the above embodiment has been omitted here. After the impression value is calculated as in the above embodiment (Step S1309), the rare position obtainment unit 1717 extracts a predetermined number of event occurrence positions in decreasing order of impression value, from event occurrence positions whose impression values are calculated by the impression value calculation unit 112 and which are included in the display screen area obtained by the screen area obtainment unit 109 (Step S1801).

The direction obtainment unit 8220 obtains the travel direction of the mobile object, from the travel history stored in the travel history storage unit 116 (Step S8310). The representative point setting unit 8211 sets, in the display screen area obtained by the screen area obtainment unit 109, ideal transit time display positions as representative points, using the direction obtained by the direction obtainment unit 8220 (Step S8311). The display position determination unit 8213 determines, for each representative point set by the representative point setting unit 8211, a high impression position obtained by the rare position obtainment unit 1717 that is closest to the representative point, as a transit time display position (Step S8312). The subsequent processes are the same as those in the above embodiment.

Note that the predetermined distance which is a minimum distance between representative points may be a distance that requires at least a smallest unit of time of a displayed transit time to travel. In detail, in the case where the map display unit displays a transit time such as "7:16" (16 minutes past 7 o'clock) as shown in FIG. 12, the smallest unit of time is 1 minute. When a difference between transit times of representative points is less than 1 minute, there is a possibility that transit times displayed at transit time display positions corresponding to the representative points will end up being the same. Such display of the same transit time at a plurality of positions does not provide any useful information to the user, and only worsens the viewability.

Figure 60:
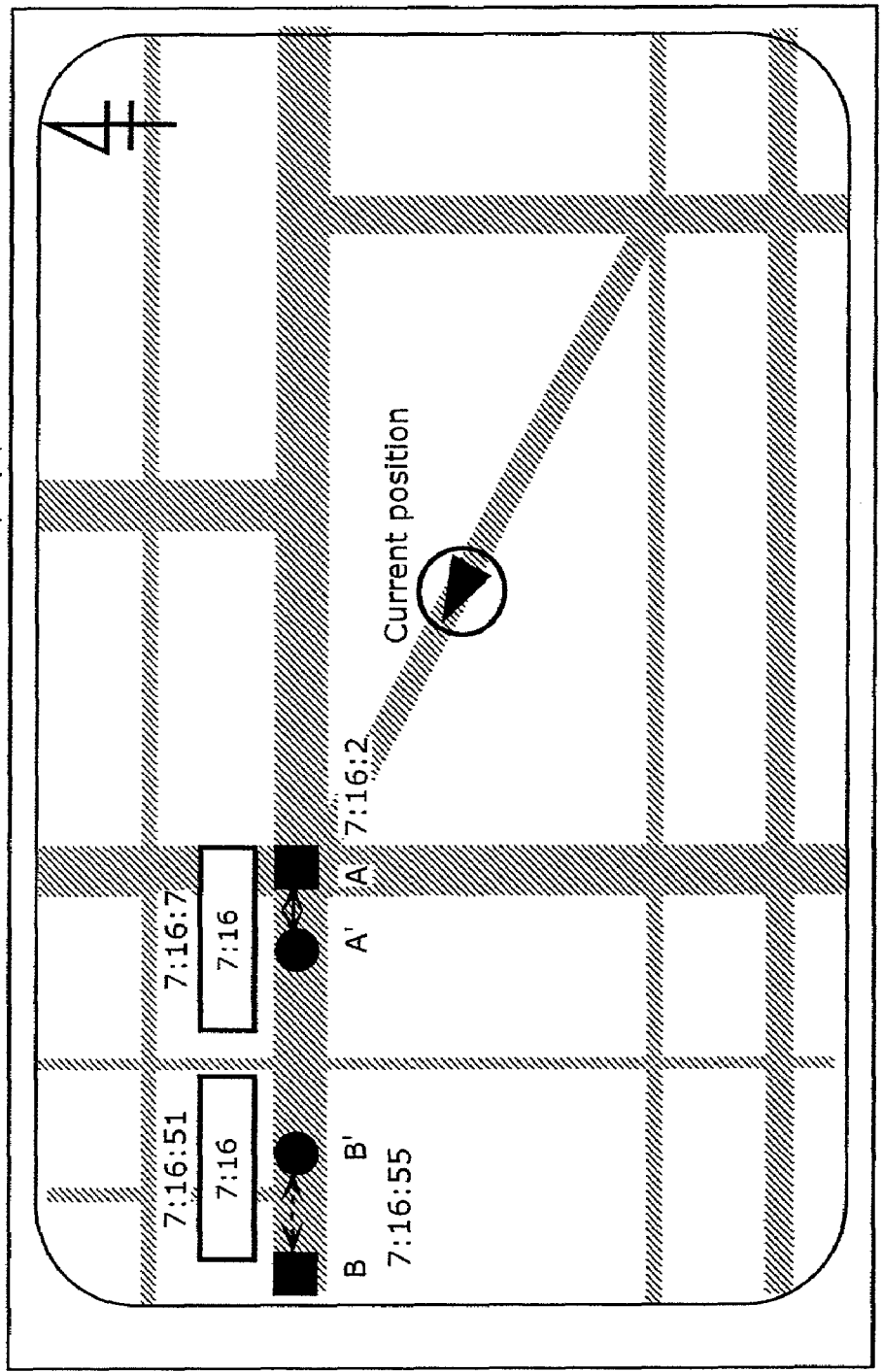
FIG. 60 shows an example of a failure in display position determination by representative point setting.

Suppose a transit time of representative point A is "7:16:2" and a transit time of representative point B is "7:16:55", which have a difference of less than 1 minute, as shown in FIG. 60. This being the case, transit times of transit time display positions A' and B' are respectively close to the transit times of the representative points. For example, the transit time of transit time display position A' is "7:16:7" and the transit time of transit time display position B' is "7:16:51".

In this case, "7:16" (16 minutes past 7 o'clock) is displayed at transit time display position A', and "7:16" (16 minutes past 7 o'clock) is displayed at transit time display position B', as shown in FIG. 60. Especially when transit time display position A' is located on the route from the current position to transit time display position B', displaying these transit times is useless and only worsens the viewability.

Accordingly, it is desirable to set representative points so as to be apart from each other by a distance that requires at least a smallest unit of time of a displayed transit time to travel, that is, a distance whose required time of travel is at least the smallest unit of time. For example, when the smallest unit of time is 1 minute and the maximum speed of the car per hour is 60 km/h, the minimum distance between representative points is 1 km (=60/60). This enables useful information to be provided to the user.

This is particularly effective in cases such as detail display of a map, where merely separating the representative points by at least 1/10 of the distance of one side of the display screen area hardly changes the transit time.

This variation relates to an example of using the representative points instead of setting the group areas as in the above embodiment and other variations. The other variations may equally be modified so that, instead of the grouping unit 111, the representative point setting unit 8211 sets the representative points and the display position determination unit 8213 selects the event occurrence positions closest to the representative points as the transit time display positions.

(Variation 18)

The above embodiment and variation 17 describe the case where the estimated transit times are scatteredly displayed on the map in an appropriately distributed manner by using the group areas and the representative points, respectively.

In addition, a variation may be applied to select, from candidate positions for displaying estimated transit times, a next candidate position while excluding an already selected candidate position, thereby preventing local concentration of estimated transit times on the map.

A method of this variation is described below.

Figure 61:
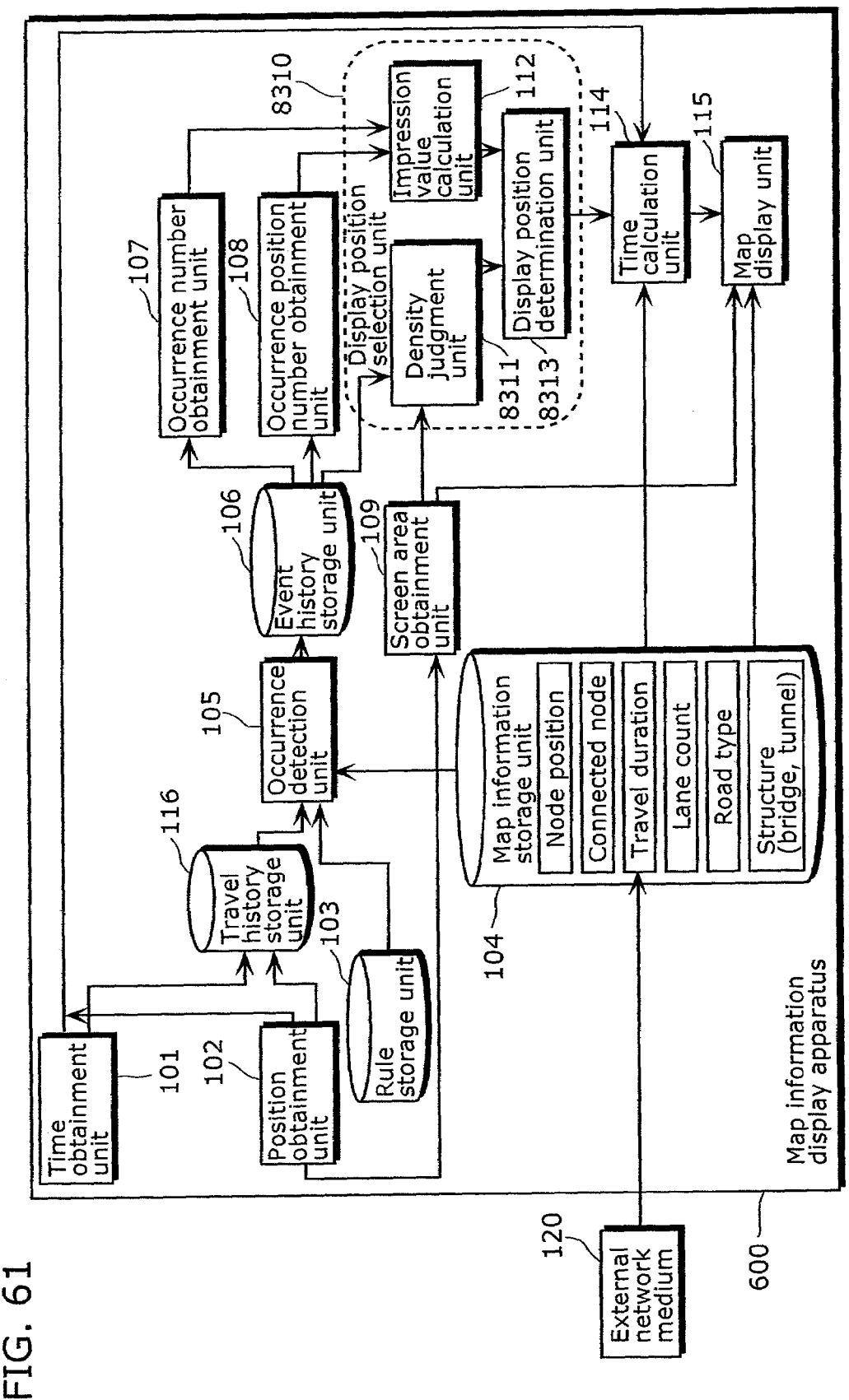
FIG. 61 is a block diagram showing a structure of a map information display apparatus in variation 18 of the present invention.
Figure 62:
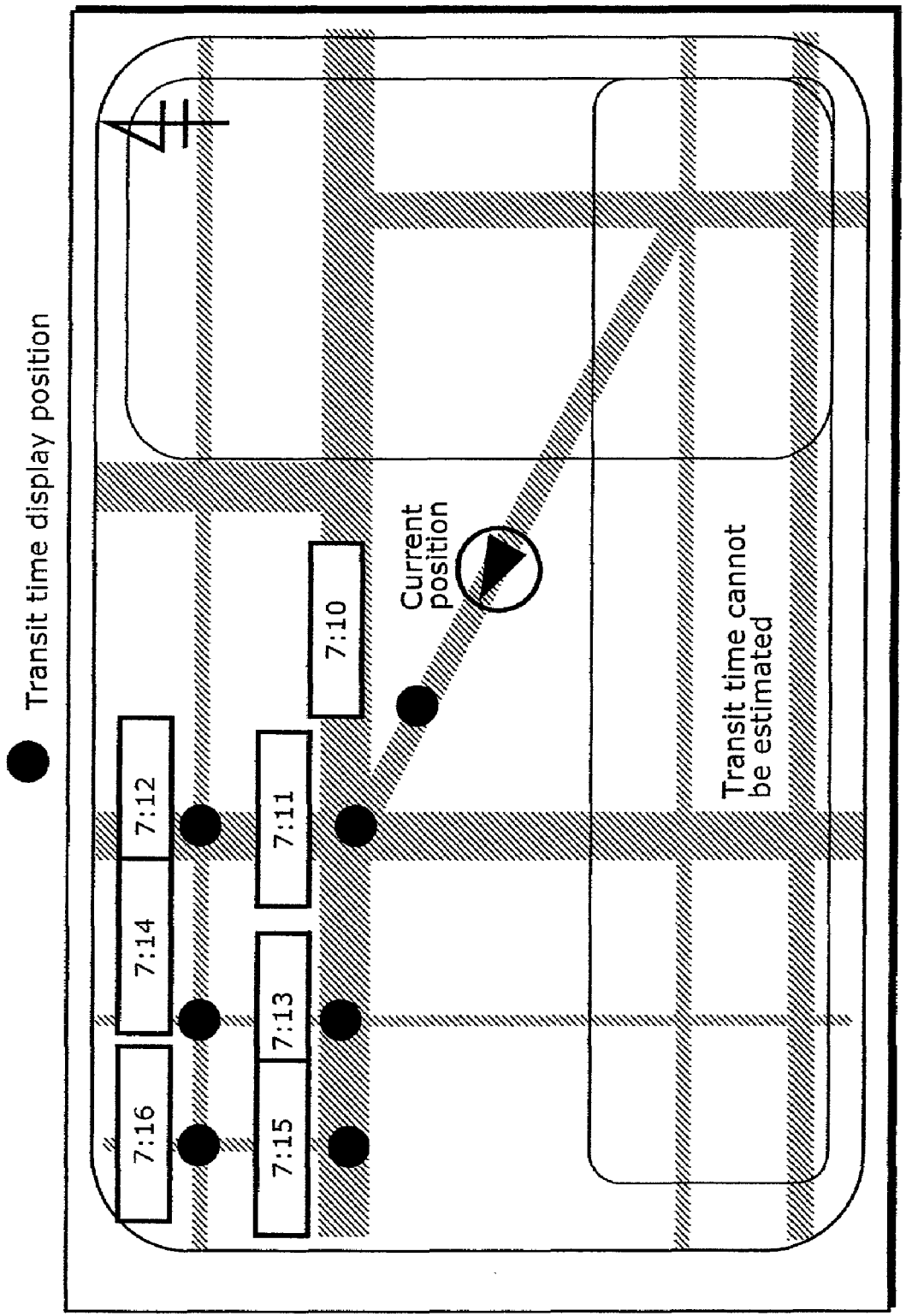
FIG. 62 shows an example where transit time display positions densely concentrate on a map.
Figure 63:
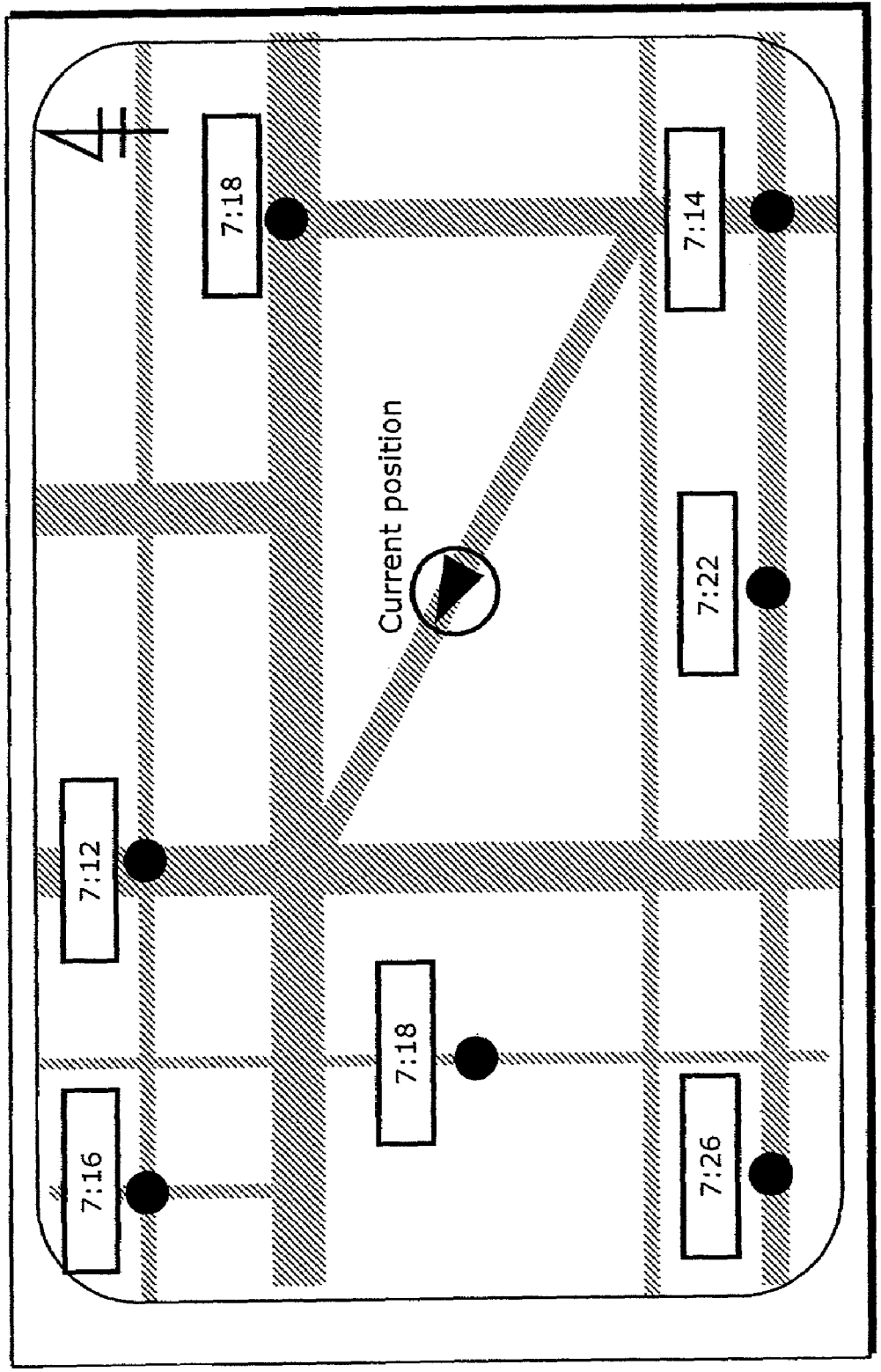
FIG. 63 shows an example where transit time display positions are scattered on a map.

FIG. 61 shows a structure of a map information display apparatus 600 in this variation. Components which are the same as those in the above embodiment have been given the same references, and their explanation has been omitted here. The following first describes each component with reference to drawings, and then describes an operation of the map information display apparatus.

A display position selection unit 8310 in the map information display apparatus 600 has a structure in which the grouping unit 111 and the display position determination unit 113 in the display position selection unit 110 in the map information display apparatus 100 of the above embodiment (see FIG. 1) are replaced respectively with a density judgment unit 8311 and a display position determination unit 8313.

In the display position selection unit 8310, the display position determination unit 8313 selects, for example, one candidate position at an approximate center of the map area which is subjected to display using the display screen area obtained by the screen area obtainment unit 109, from among candidate positions for displaying estimated transit times. The display position determination unit 8313 determines the selected candidate position as a transit time display position. Here, the display position determination unit 8313 may use all event occurrence positions stored in the event history storage unit 106 as candidate positions, or prioritize event occurrence positions with high impression values calculated by the impression value calculation unit 112 as mentioned above, as candidate positions.

The density judgment unit 8311 judges, each time one display position is determined by the display position determination unit 8313, an other candidate position located in an area of a predetermined size that includes the determined display position, as being closely spaced. For example, the area of the predetermined size may be a circle whose diameter is 1/10 of a distance of one side of the map area, or a circle whose diameter is a distance that requires, for the mobile object to travel, a smallest unit of time of a displayed estimated transit time.

The display position determination unit 8313 selects a new candidate position from candidate positions which have not been selected yet, excluding the candidate position which is judged as being closely spaced by the density judgment unit 8311.

By the display position selection unit 8310 repeating a process of selecting a next candidate position while excluding any candidate position which is judged as being closely spaced in a neighborhood of an already selected candidate position, the map information display apparatus 600 can display estimated transit times on the map scatteredly in an appropriately distributed manner.

(Variation 19)

The above embodiment and variations describe the case where estimated transit times can be displayed scatteredly in an appropriately distributed manner by limiting the number of candidate positions selected for each group area or each representative point or by excluding, from new selection, an unselected candidate position judged as being closely spaced.

In addition to such a structure, a variation may be applied to judge, in the map display unit 115, whether or not display areas of estimated transit times of selected candidate positions overlap each other on the display screen, and display an image including only one of the estimated transit times on the display screen when the display areas are judged as overlapping.

By doing so, even when the display areas of the estimated transit times of the selected candidate positions overlap each other, such as when two candidate positions which are included in adjacent group areas and are in a neighborhood of their boundary lines are selected, the number of estimated transit times actually displayed can be limited to 1. As a result, a decrease in viewability can be prevented.

It should be noted that the map information display apparatus according to the present invention may also be a map information display apparatus that includes any combination of the functions of the map information display apparatuses described in the above embodiment and variations, so long as these functions are not mutually contradictory.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The map information display apparatus according to the present invention can be applied to an apparatus that obtains position information of a mobile object and provides map information, in a car navigation apparatus, GPS, a map mobile phone, and the like.

What is claimed is:

1. A map information display apparatus that displays a map for a mobile object, said map information display apparatus comprising:

a display unit configured to display an image that includes the map and an estimated transit time of a point on the map;

a candidate obtainment unit configured to obtain a plurality of candidate points each of which is a candidate for displaying an estimated transit time;

a grouping unit configured to divide a map area of the map displayed by said display unit into a plurality of group areas each of which is larger than a predetermined size so that a gap having at least a predetermined width is provided between the plurality of group areas and that at least one of the plurality of group areas includes a part of a road on which the mobile object is currently located, the part of the road being located in a travel direction of the mobile object, and to select, for each of the plurality of group areas divided from the map area, at most a predetermined number of candidate points from among the plurality of candidate points included in each of the plurality of group areas;

an estimated time calculation unit configured to calculate an estimated transit time of each of the selected candidate points; and a display control unit configured to cause said display unit to display the image that includes the map, and the each of the selected candidate points and the estimated transit time which is calculated in association with the each of the selected candidate points.

2. A map information display apparatus that displays a map for a mobile object, said map information display apparatus comprising:

a display unit configured to display an image that includes the map and an estimated transit time of a point on the map;

a candidate obtainment unit configured to obtain a plurality of candidate points each of which is a candidate for displaying an estimated transit time;

an other image display position obtainment unit configured to obtain a display area of an image displayed on the map other than the estimated transmit time;

a grouping unit configured to divide an area which excludes the display area obtained by said other image display position obtainment unit from a map area of the map displayed by said display unit, into a plurality of group areas each of which is larger than a predetermined size, and to select, for each of the plurality of group areas divided from the area, at most a predetermined number of candidate points from among the plurality of candidate points included in each of the plurality of group areas;

an estimated time calculation unit configured to calculate an estimated transit time of each of the selected candidate points; and a display control unit configured to cause said display unit to display the image that includes the map, and the each of the selected candidate points and the estimated transit time which is calculated in association with the each of the selected candidate points.

3. A map information display apparatus that displays a map for a mobile object, said map information display apparatus comprising:

a display unit configured to display an image that includes the map and an estimated transit time of a point on the map;

a candidate obtainment unit configured to obtain a plurality of candidate points each of which is a candidate for displaying an estimated transit time;

a grouping unit configured to divide a map area of the map displayed by said display unit into a plurality of group areas each of which is larger than a predetermined size so that a gap having at least a predetermined width is provided between the plurality of group areas, and to select, for each of the plurality of group areas divided from the map area, at most a predetermined number of candidate points from among the plurality of candidate points included in each of the plurality of group areas;

an estimated time calculation unit configured to calculate an estimated transit time of each of the selected candidate points; and a display control unit configured to cause said display unit to display the image that includes the map, and the each of the selected candidate points and the estimated transit time which is calculated in association with the each of the selected candidate points.

4. A map information display method for displaying a map for a mobile object by using a map information display apparatus which includes a display unit, a candidate obtainment unit, a grouping unit, an estimated time calculation unit, and a display control unit, said map information display method comprising:

displaying, by the display unit, an image that includes the map and an estimated transit time of a point on the map;

obtaining, by the candidate obtainment unit, a plurality of candidate points each of which is a candidate for displaying an estimated transit time;

dividing, by the grouping unit, a map area of the map displayed in said displaying into a plurality of group areas each of which is larger than a predetermined size so that a gap having at least a predetermined width is provided between the plurality of group areas and that at least one of the plurality of group areas includes a part of a road on which the mobile object is currently located, the part of the road being located in a travel direction of the mobile object;

selecting, by the grouping unit, for each of the plurality of group areas divided from the map area, at most a predetermined number of candidate points from among the plurality of candidate points included in each of the plurality of group areas;

calculating, by the estimated time calculation unit, an estimated transit time of each of the selected candidate points; and controlling, by the display control unit, the display unit so as to display, in said displaying, the image that includes the map, and the each of the selected candidate points and the estimated transit time which is calculated in associated with the each of the selected candidate points.

5. A map information display method for displaying a map for a mobile object by using a map information display apparatus which includes a display unit, a candidate obtainment unit, a grouping unit, an estimated time calculation unit, a display control unit, and an other image display position obtainment unit, said map information display method comprising:

displaying, by the display unit, an image that includes the map and an estimated transit time of a point on the map;

obtaining, by the candidate obtainment unit, a plurality of candidate points each of which is a candidate for displaying an estimated transit time;

obtaining, by the other image display position obtainment unit, a display area of an image displayed on the map other than the estimated transit time, dividing, by the grouping unit, an area which excludes the display area obtained by the other image display position obtainment unit from a map area of the map displayed in said displaying, into a plurality of group areas each of which is larger than a predetermined size;

selecting, by the grouping unit, for each of the plurality of group areas divided from the area, at most a predetermined number of candidate points from among the plurality of candidate points included in each of the plurality of group areas;

calculating, by the estimated time calculation unit, an estimated transit time of each of the selected candidate points; and controlling, by the display control unit, the display unit so as to display, in said displaying, the image that includes the map, and the each of the selected candidate points and the estimated transit time which is calculated in association with the each of the selected candidate points.

6. A map information display method for displaying a map for a mobile object by using a map information display apparatus which includes a display unit, a candidate obtainment unit, a grouping unit, an estimated time calculation unit, and a display control unit, said map information display method comprising:

displaying, by the display unit, an image that includes the map and an estimated transit time of a point on the map;

obtaining, by the candidate obtainment unit, a plurality of candidate points each of which is a candidate for displaying an estimated transit time;

dividing, by the grouping unit, a map area of the map displayed in said displaying into a plurality of group areas each of which is larger than a predetermined size so that a gap having at least a predetermined width is provided between the plurality of group areas;

selecting, by the grouping unit, for each of the plurality of group areas divided from the map area, at most a predetermined number of candidate points from among the plurality of candidate points included in each of the plurality of group areas;

calculating, by the estimated time calculation unit, an estimated transit time of each of the selected candidate points; and controlling, by the display control unit, the display unit so as to display, in said displaying, the image that includes the map, and the each of the selected candidate points and the estimated transit time which is calculated in association with the each of the selected candidate points.

7. A map information display program embodied on a computer-readable medium for displaying a map for a mobile object, said map information display program causing a computer to execute a method comprising: displaying, by a display unit, an image that includes the map and an estimated transit time of a point on the map;

obtaining a plurality of candidate points each of which is a candidate for displaying an estimated transit time;

dividing a map area of the map displayed in said displaying into a plurality of group areas each of which is larger than a predetermined size so that a gap having at least a predetermined width is provided between the plurality of group areas and that at least one of the plurality of group areas includes a part of a road on which the mobile object is currently located, the part of the road being located in a travel direction of the mobile object;

selecting, for each of the plurality of group areas divided from the map area, at most a predetermined number of candidate points from among the plurality of candidate points included in each of the plurality of group areas;

calculating an estimated transit time of each of the selected candidate points; and controlling the display unit so as to display, in said displaying, the image that includes the map, and the each of the selected candidate points and the estimated transit time which is calculated in association with the each of the selected candidate points.

8. A map information display program embodied on a computer-readable medium for displaying a map for a mobile object, said map information display program causing a computer to execute a method comprising:

displaying, by a display unit, an image that includes the map and an estimated transit time of a point on the map;

obtaining a plurality of candidate points each of which is a candidate for displaying an estimated transit time;

obtaining a display area of an image displayed on the map other than the estimated transit time, dividing an area which excludes the display area obtained in said obtaining from a map area of the map displayed in said displaying, into a plurality of group areas each of which is larger than a predetermined size;

selecting, for each of the plurality of group areas divided from the area, at most a predetermined number of candidate points from among the plurality of candidate points included in each of the plurality of group areas;

calculating an estimated transit time of each of the selected candidate points; and controlling the display unit so as to display, in said displaying, the image that includes the map, and the each of the selected candidate points and the estimated transit time which is calculated in association with the each of the selected candidate points.

9. A map information display program embodied on a computer-readable medium for displaying a map for a mobile object, said map information display program causing a computer to execute a method comprising:

displaying, by a display unit, an image that includes the map and an estimated transit time of a point on the map;

obtaining a plurality of candidate points each of which is a candidate for displaying an estimated transit time; dividing a map area of the map displayed in said displaying into a plurality of group areas each of which is larger than a predetermined size so that a gap having at least a predetermined width is provided between the plurality of group areas;

selecting, for each of the plurality of group areas divided from the map area, at most a predetermined number of candidate points from among the plurality of candidate points included in each of the plurality of group areas;

calculating an estimated transit time of each of the selected candidate points; and controlling the display unit so as to display, in said displaying, the image that includes the map, and the each of the selected candidate points and the estimated transit time which is calculated in association with the each of the selected candidate points.

* * * * *